United States Patent
Nag et al.

(10) Patent No.: US 10,922,092 B2
(45) Date of Patent: Feb. 16, 2021

(54) ADMINISTRATOR-MONITORED REINFORCEMENT-LEARNING-BASED APPLICATION MANAGER

(71) Applicant: VMware, Inc., Palo Alto, CA (US)

(72) Inventors: Dev Nag, Palo Alto, CA (US); Yanislav Yankov, Palo Alto, CA (US); Dongni Wang, Palo Alto, CA (US); Gregory T. Burk, Colorado Springs, CO (US); Nicholas Mark Grant Stephen, Paris (FR)

(73) Assignee: VMware, Inc., Palo Alto, CA (US)

( * ) Notice: Subject to any disclaimer, the term of this patent is extended or adjusted under 35 U.S.C. 154(b) by 21 days.

(21) Appl. No.: 16/518,617

(22) Filed: Jul. 22, 2019

(65) Prior Publication Data
US 2020/0065118 A1 Feb. 27, 2020

Related U.S. Application Data

(63) Continuation-in-part of application No. 16/261,253, filed on Jan. 29, 2019, now Pat. No. 10,802,864.

(60) Provisional application No. 62/723,388, filed on Aug. 27, 2018.

(51) Int. Cl.
| | |
|---|---|
| *G06F 9/445* | (2018.01) |
| *G06F 17/16* | (2006.01) |
| *G06F 9/48* | (2006.01) |
| *G06N 20/00* | (2019.01) |

(52) U.S. Cl.
CPC ........ *G06F 9/44505* (2013.01); *G06F 9/4875* (2013.01); *G06F 17/16* (2013.01); *G06N 20/00* (2019.01)

(58) Field of Classification Search
USPC .......................................................... 718/1
See application file for complete search history.

(56) References Cited

U.S. PATENT DOCUMENTS

| | | | |
|---|---|---|---|
| 2010/0094786 A1* | 4/2010 | Gupta | G06N 7/005 706/12 |
| 2015/0058265 A1* | 2/2015 | Padala | G06N 20/00 706/12 |
| 2018/0121766 A1* | 5/2018 | McCord | G06K 9/6297 |
| 2020/0065128 A1* | 2/2020 | Nag | G06N 3/006 |

* cited by examiner

*Primary Examiner* — John Q Chavis

(57) ABSTRACT

The current document is directed to an administrator-monitored reinforcement-learning-based application manager that can be deployed in various different computational environments to manage the computational environments with respect to one or more reward-specified goals. Certain control actions undertaken by the administrator-monitored reinforcement-learning-based application manager are first proposed, to one or more administrators or other users, who can accept or reject the proposed control actions prior to their execution. The reinforcement-learning-based application manager can therefore continue to explore the state/action space, but the exploration can be parametrically constrained as well as by human-administrator oversight and intervention.

20 Claims, 48 Drawing Sheets

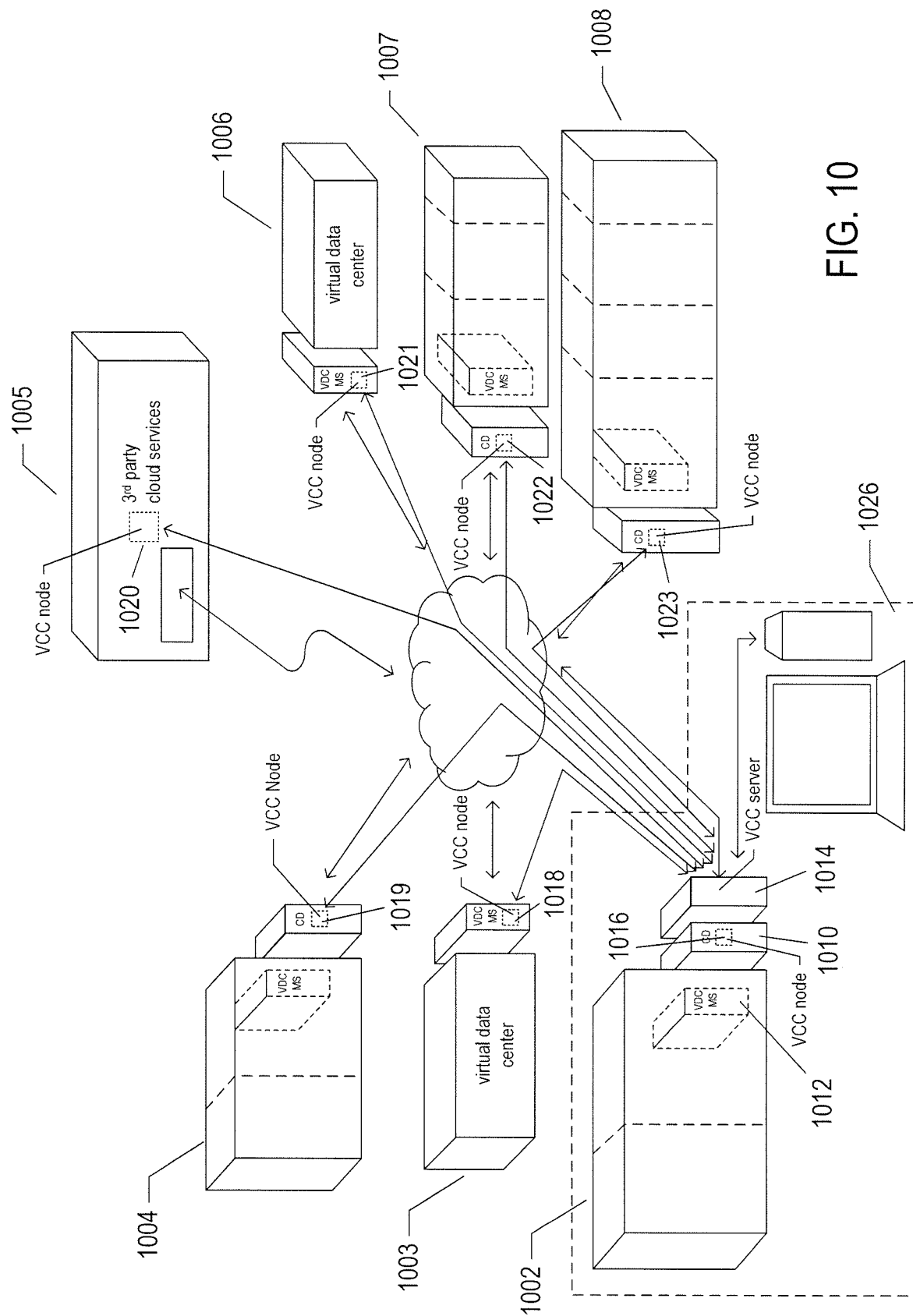

$$R_4 = r_5 + \gamma r_6 + \gamma^2 r_7 + \gamma^3 r_8 \ldots \gamma^{T-5} r_T$$

where $0 \leq \gamma \leq 1$ $$R_t = \sum_{k=0}^{T} \gamma^k r_{t+k+1}$$

$$V^\pi(s) = E\{R_t \mid s_t = s, \pi\}$$

$$Q^\pi(s,a) = E\{R_t \mid s_t = s, a_t = a, \pi\}$$

$\pi^*$ is optimal $\Rightarrow \forall s \in S$ and $\pi \in \Pi$, $V^{\pi^*}(s) \geq V^\pi(s)$

FIG. 17

ADMINISTRATOR-MONITORED REINFORCEMENT-LEARNING-BASED APPLICATION MANAGER

CROSS-REFERENCE TO RELATED APPLICATIONS

This application is a continuation-in-part of application Ser. No. 16/261,253, filed Jan. 29, 2019, which claim the benefit of Provisional Application No. 62/723,388, filed Aug. 27, 2018.

TECHNICAL FIELD

The current document is directed to standalone, networked, and distributed computer systems, to system management and, in particular, to a reinforcement-learning-based application manager that may run within a variety of different environments to safely control the configuration and operational behavior of applications.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management and control systems related to distributed computing systems are seeking alternative design-and-implementation methodologies, including machine-learning-based approaches. The application of machine-learning technologies to the management of complex computational environments is still in early stages, but promises to expand the practically achievable feature sets of automated administration-and-management systems, decrease development costs, and provide a basis for more effective optimization Of course, administration-and-management control systems developed for distributed computer systems can often be applied to administer and manage standalone computer systems and individual, networked computer systems.

SUMMARY

The current document is directed to an administrator-monitored reinforcement-learning-based application manager that can be deployed in various different computational environments to manage the computational environments with respect to one or more reward-specified goals. Certain control actions undertaken by the administrator-monitored reinforcement-learning-based application manager are first proposed, to one or more administrators or other users, who can accept or reject the proposed control actions prior to their execution. The reinforcement-learning-based application manager can therefore continue to explore the state/action space, but the exploration can be parametrically constrained as well as by human-administrator oversight and intervention.

BRIEF DESCRIPTION OF THE DRAWINGS

In FIG. 9, three different physical data centers 902-904 are shown below planes representing the cloud-director layer of abstraction 906-908.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 17 provides additional details about the operation of the manager, environment, and universe.

DETAILED DESCRIPTION

Figure 1:
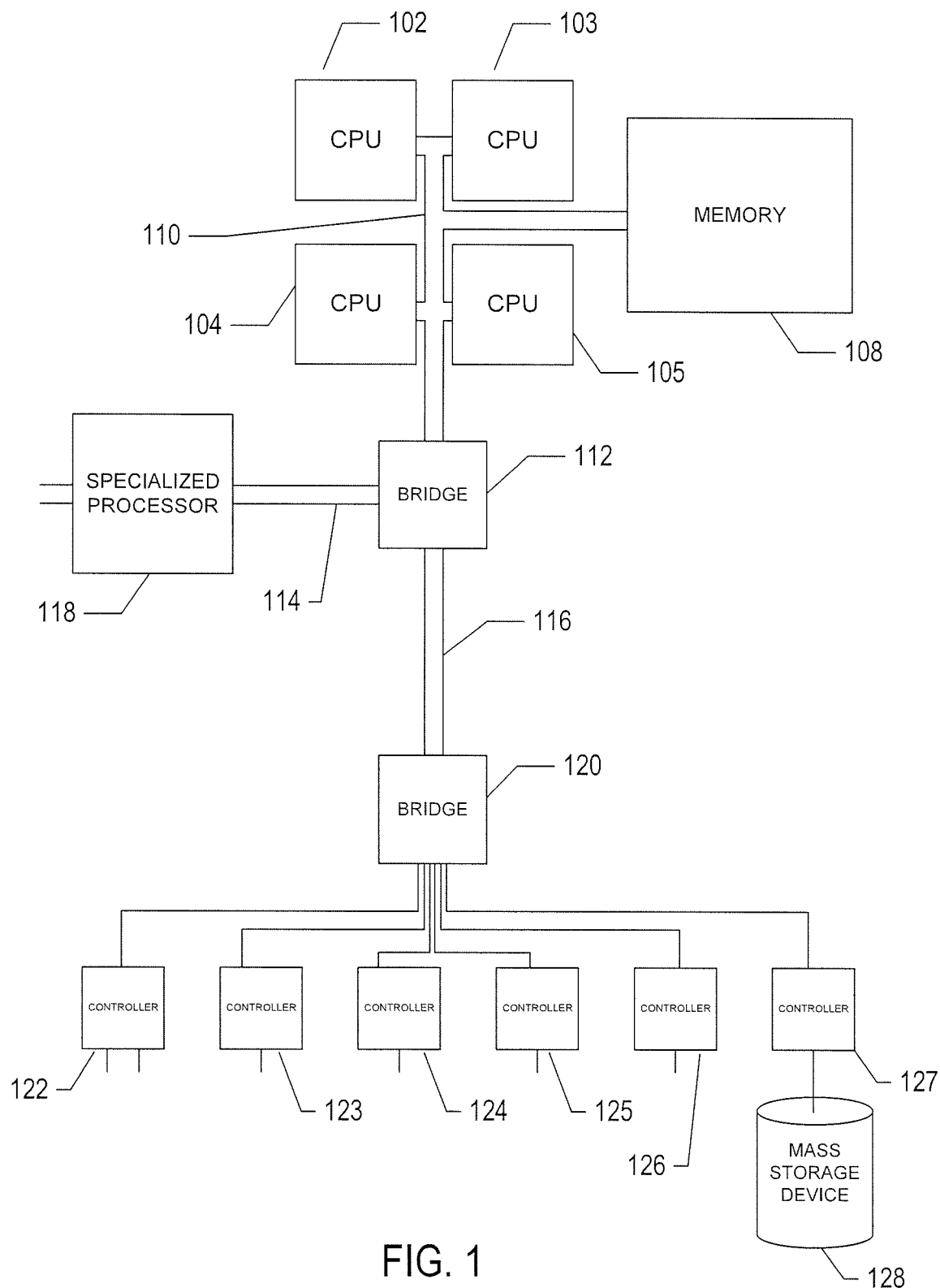
FIG. 1 provides a general architectural diagram for various types of computers.

The current document is directed to an administrator-monitored reinforcement-learning-based application manager. In a first subsection, below, a detailed description of computer hardware, complex computational systems, and virtualization is provided with reference to FIGS. 1-11. In a second subsection, application management and reinforcement learning are discussed with reference to FIGS. 11-25. In a third subsection, implementations of the currently disclosed administrator-monitored reinforcement-learning application manager are introduced and described with reference to FIGS. 26-36C.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
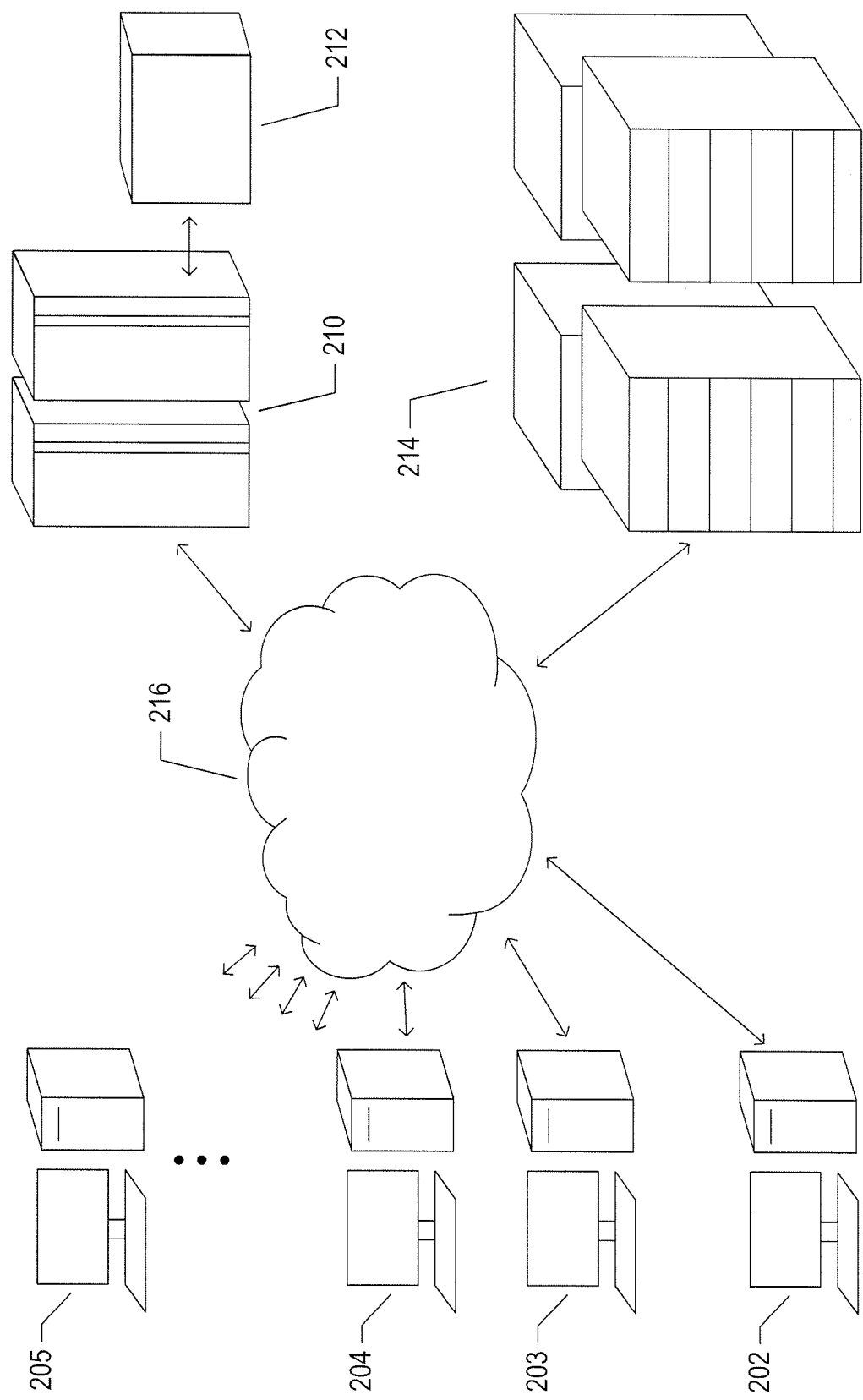
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
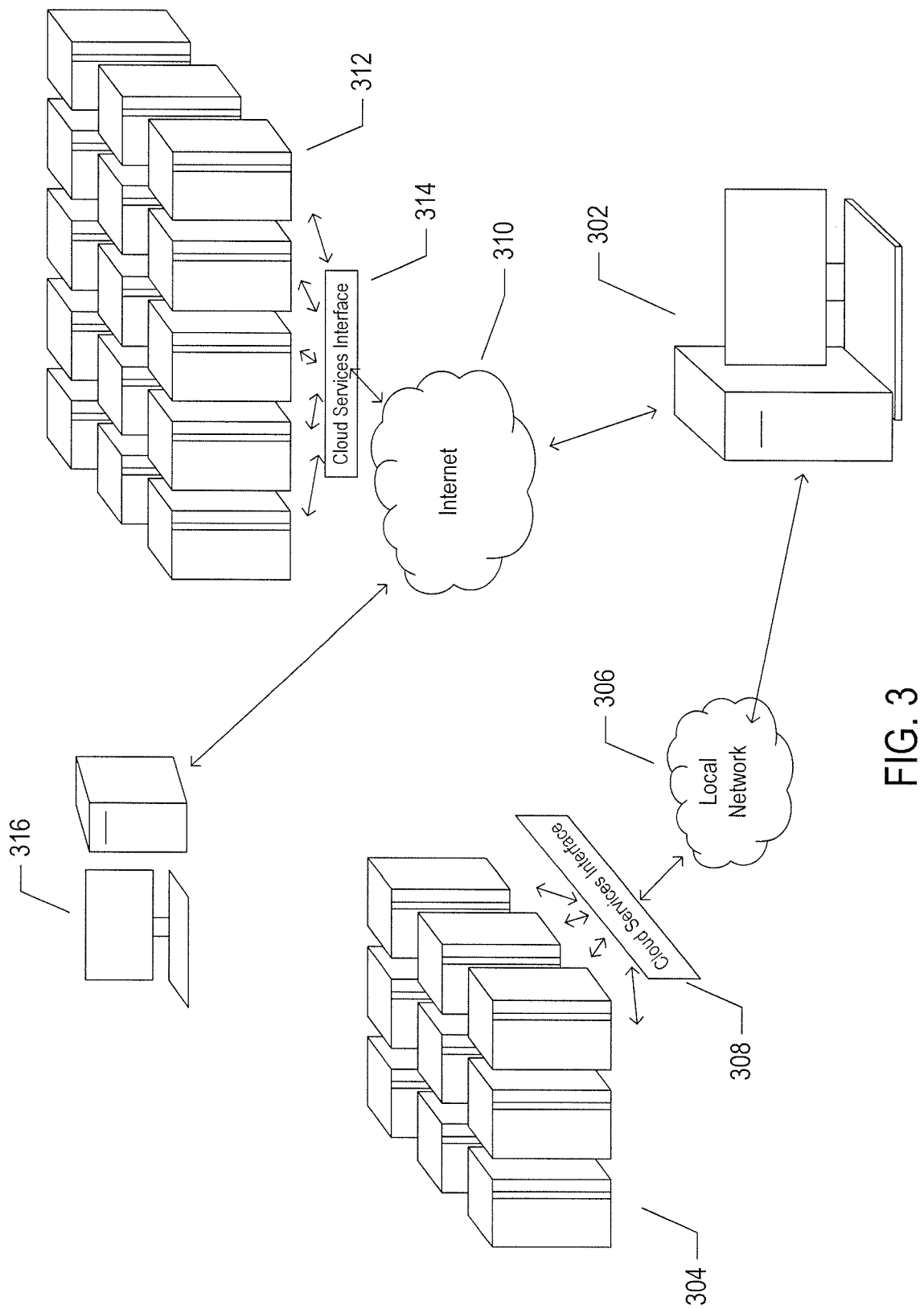
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
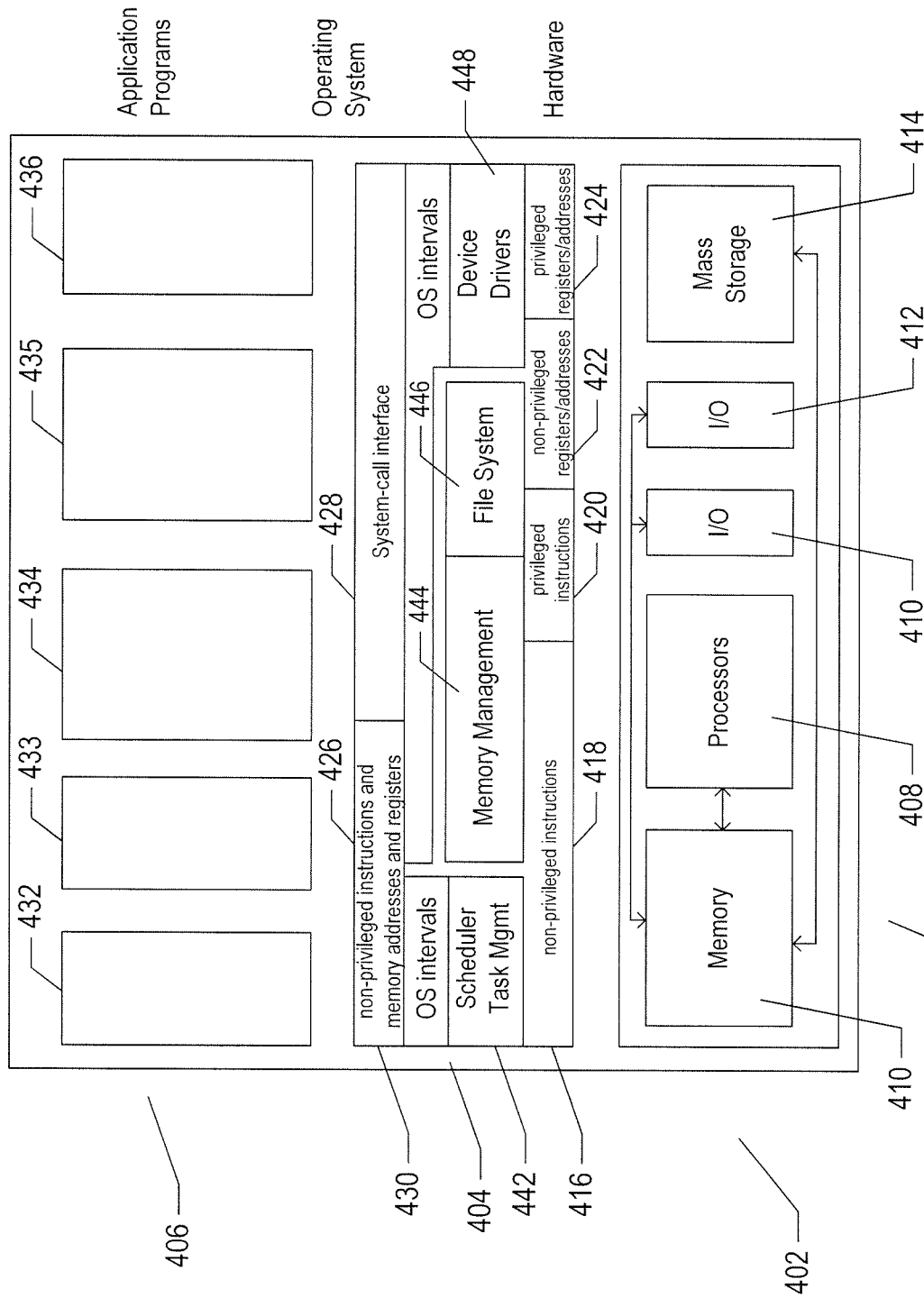
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
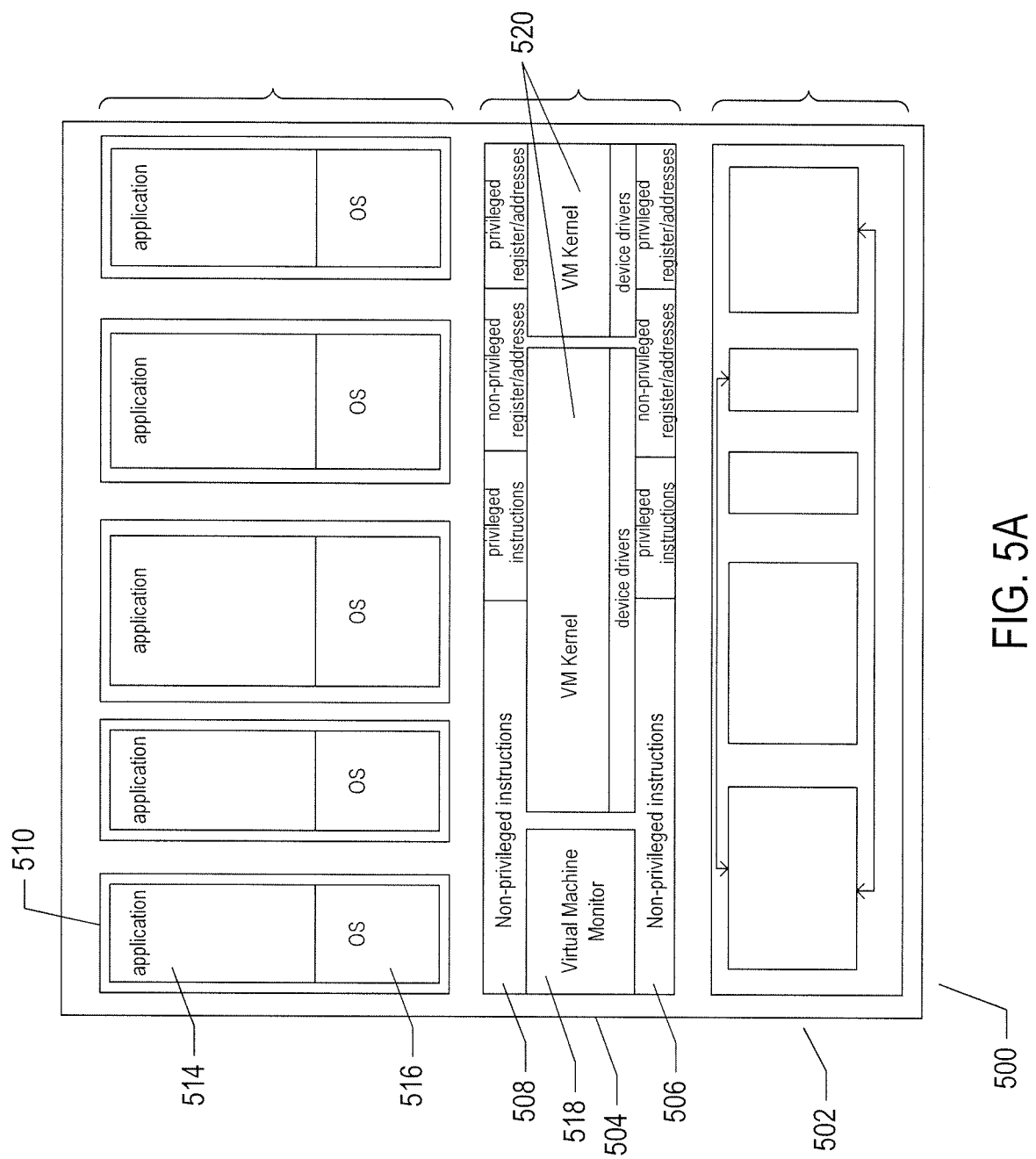
FIGS. 5A-B illustrate two types of virtual machine and virtual-machine execution environments.
Figure 5B:
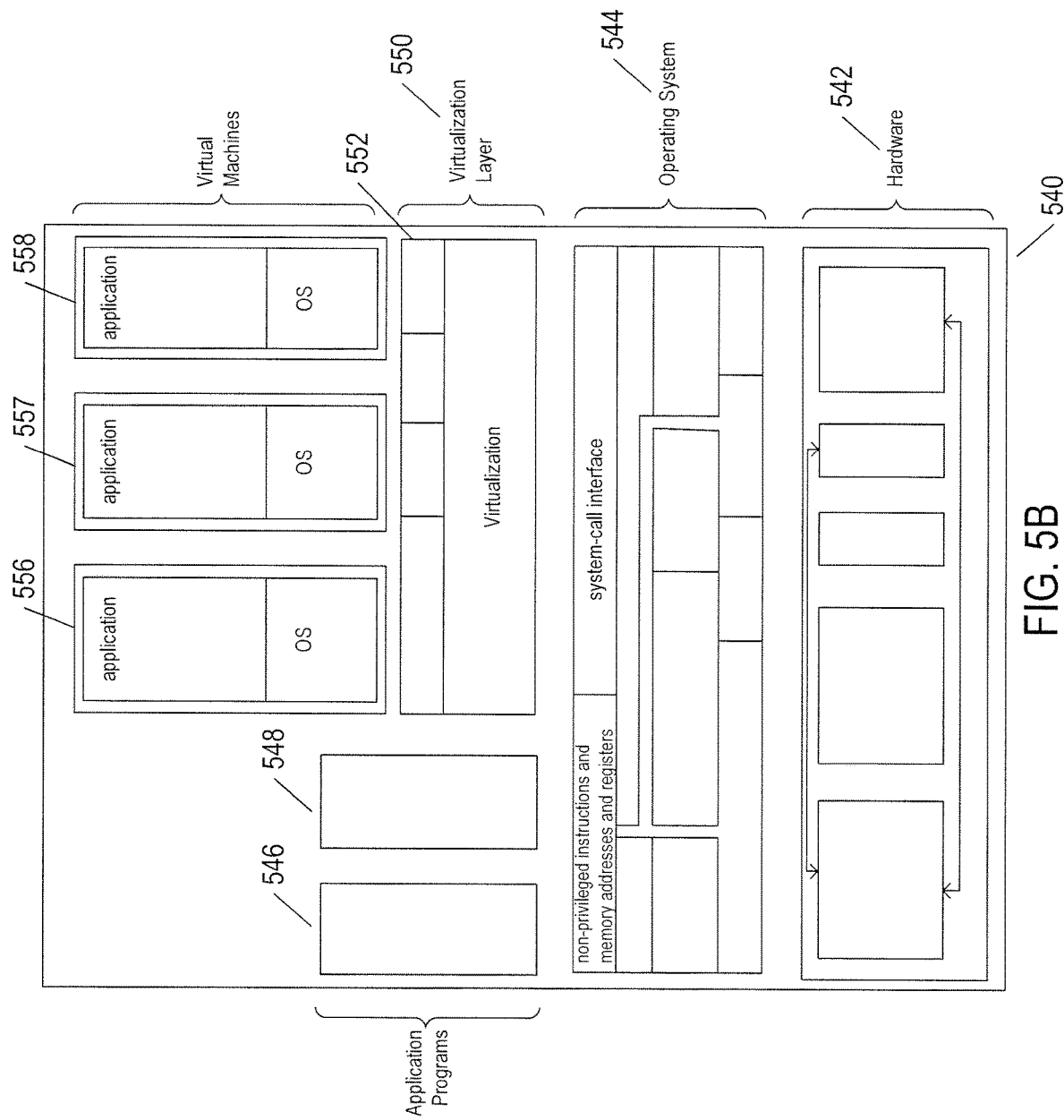

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
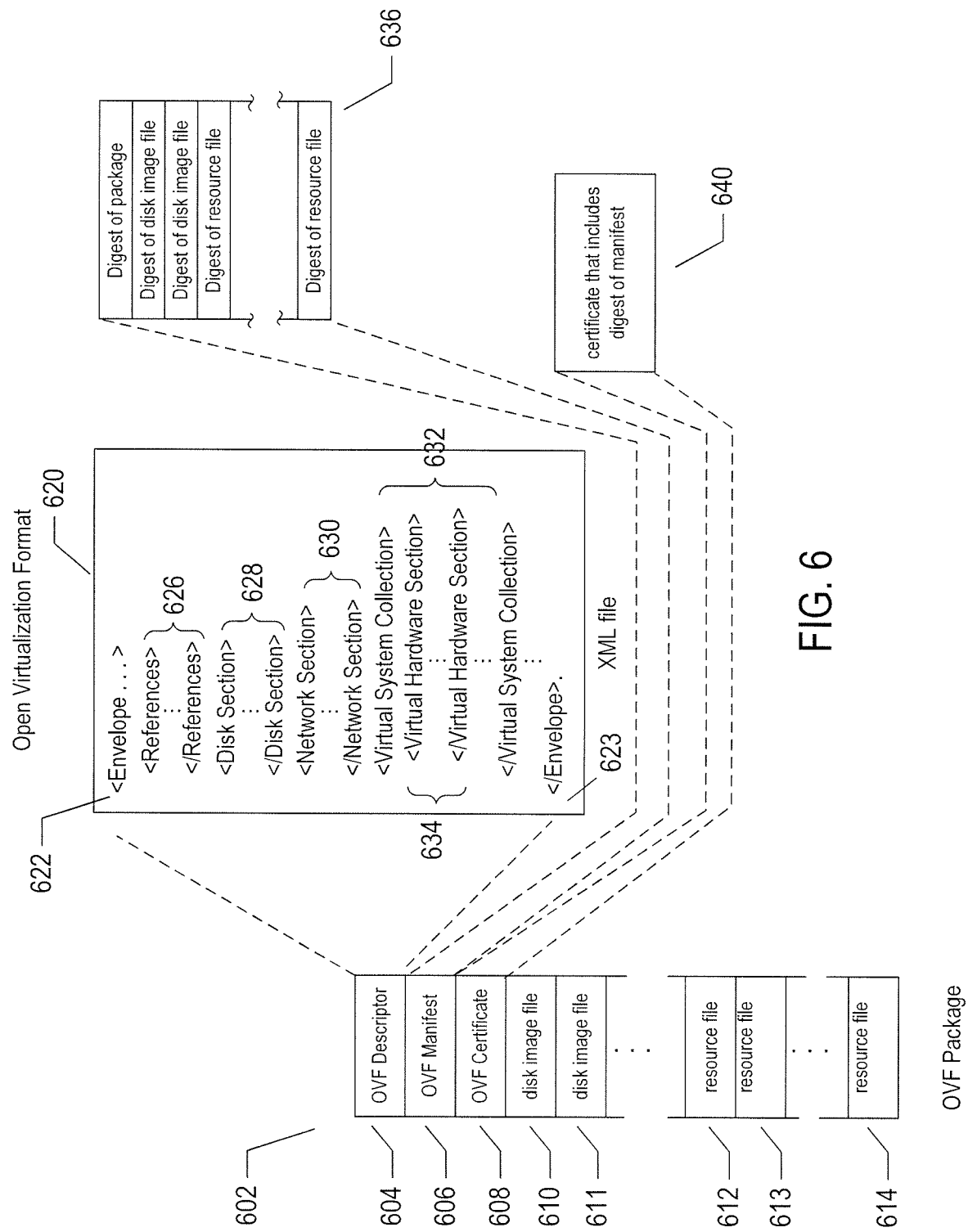
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
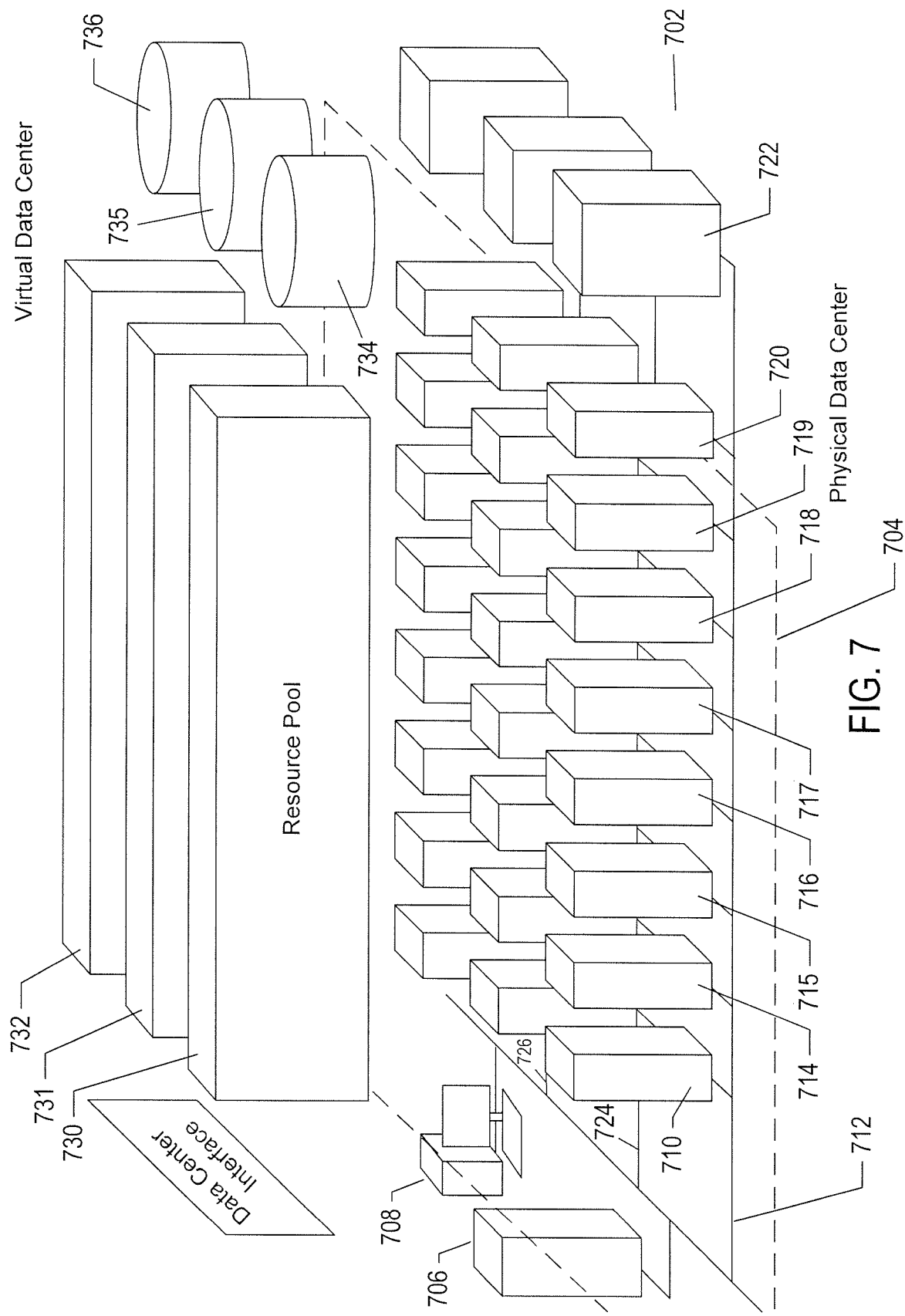
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
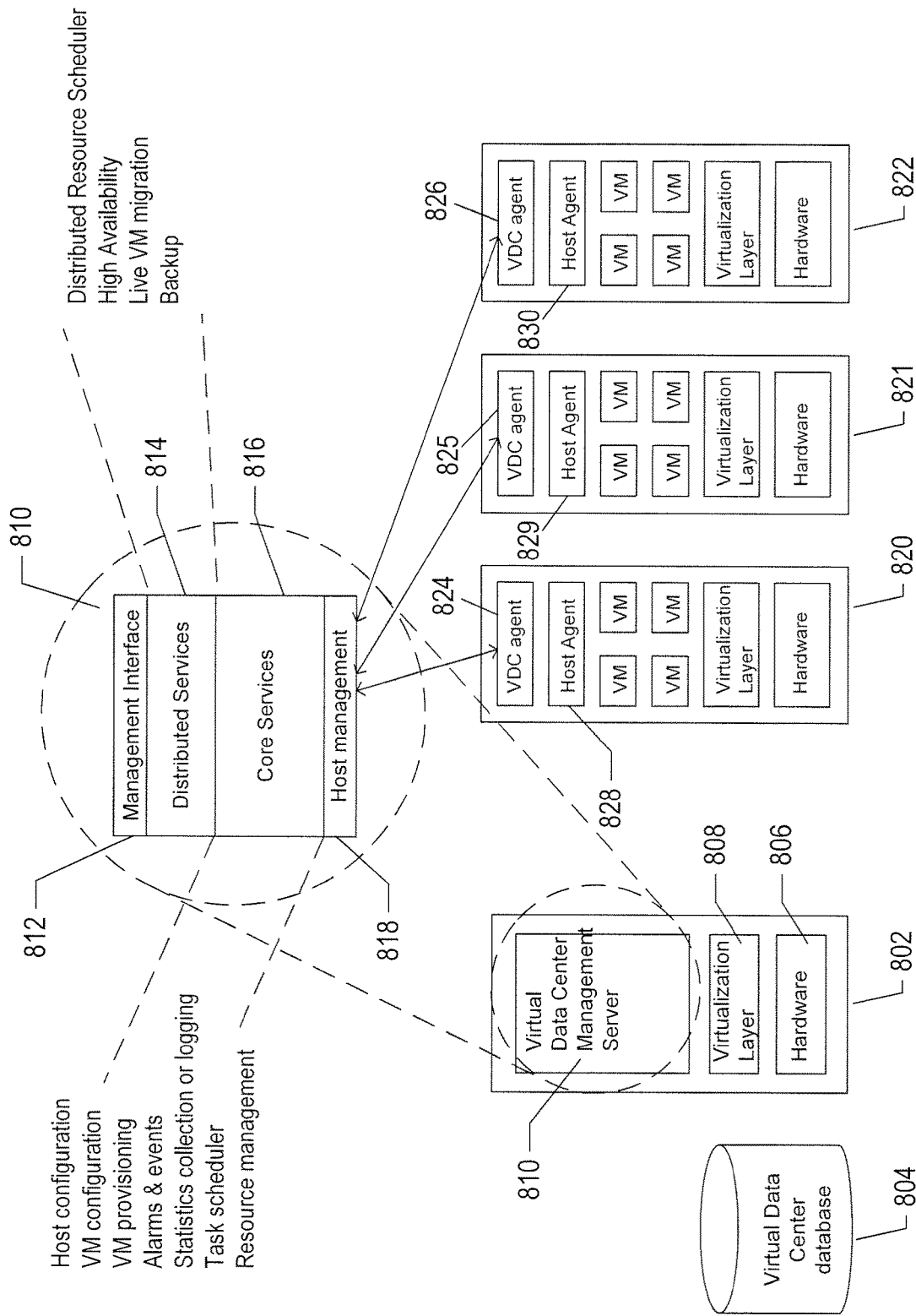
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
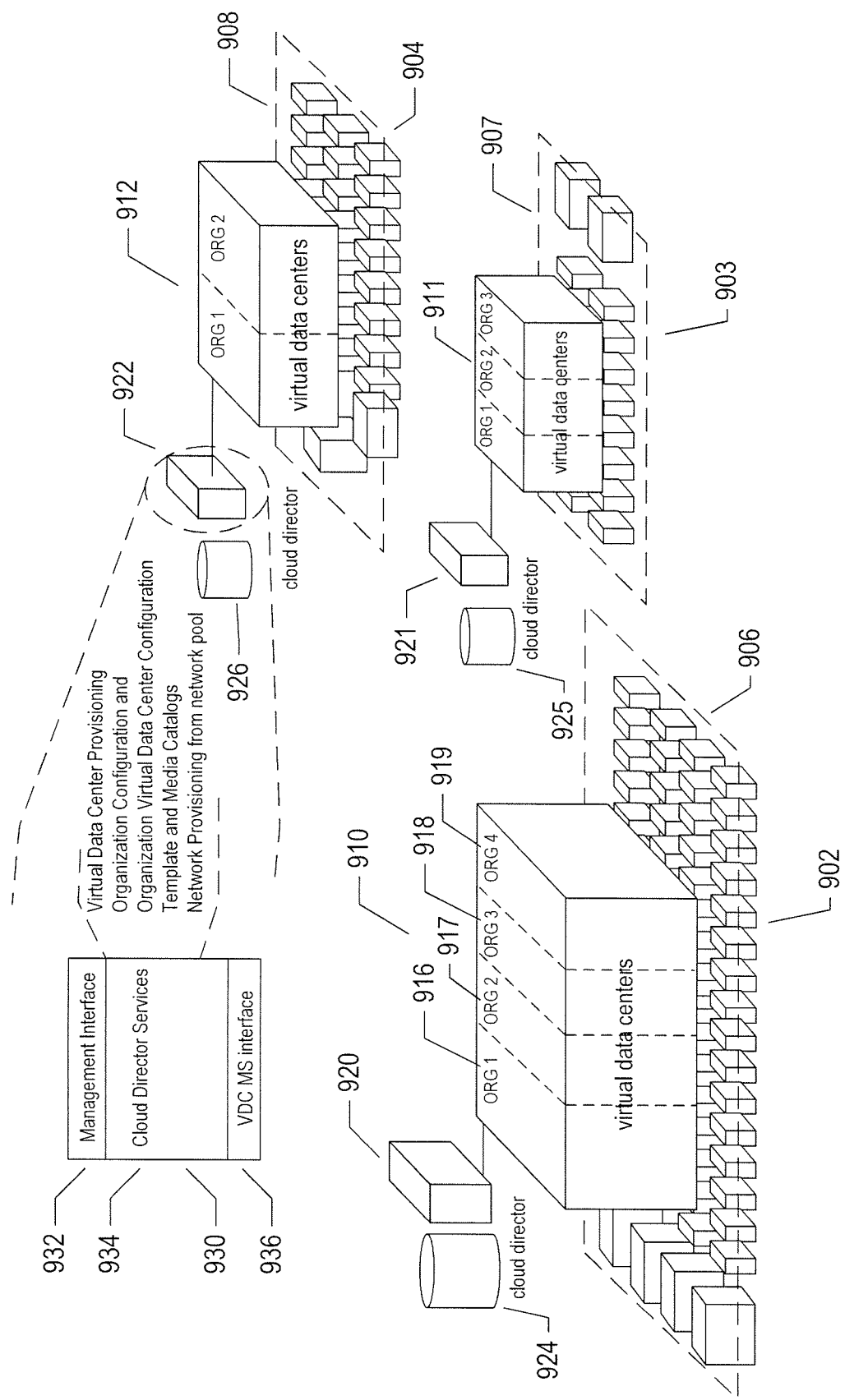
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Application Management and Reinforcement Learning

Figure 11A:
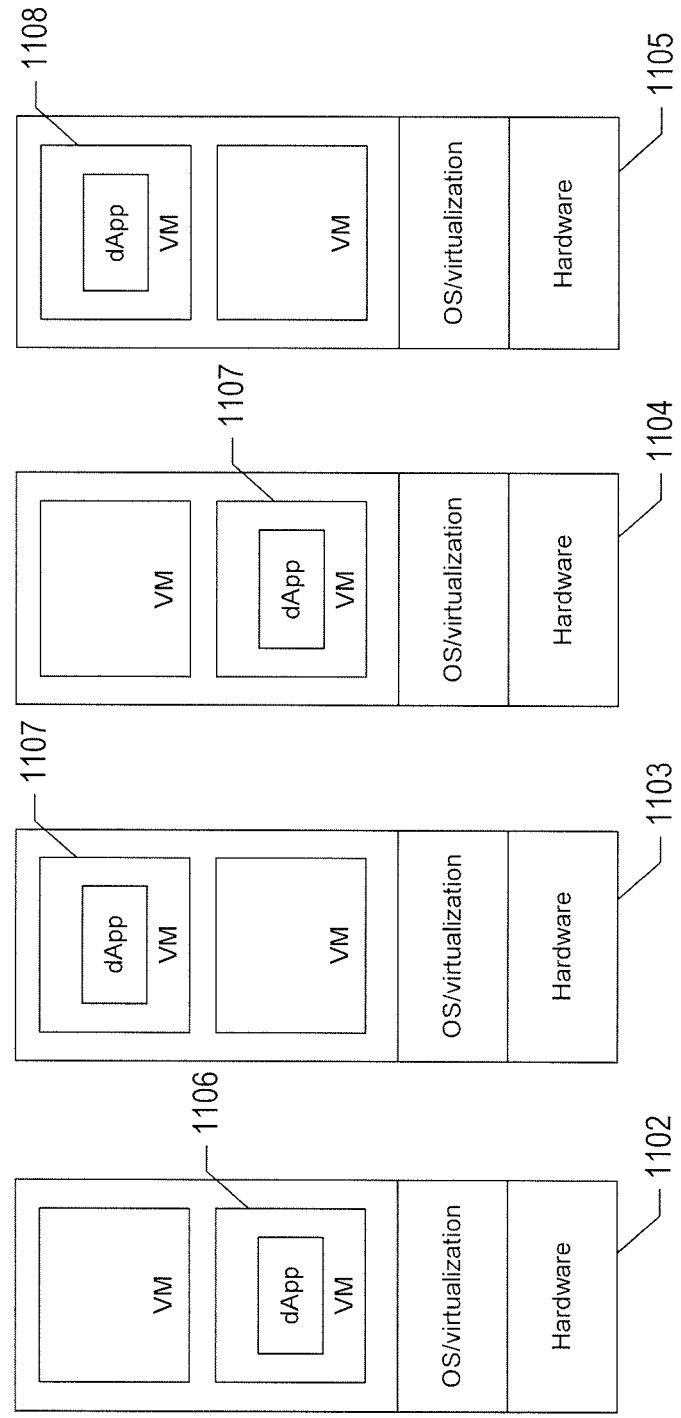
FIGS. 11A-C illustrate an application manager.
Figure 11B:
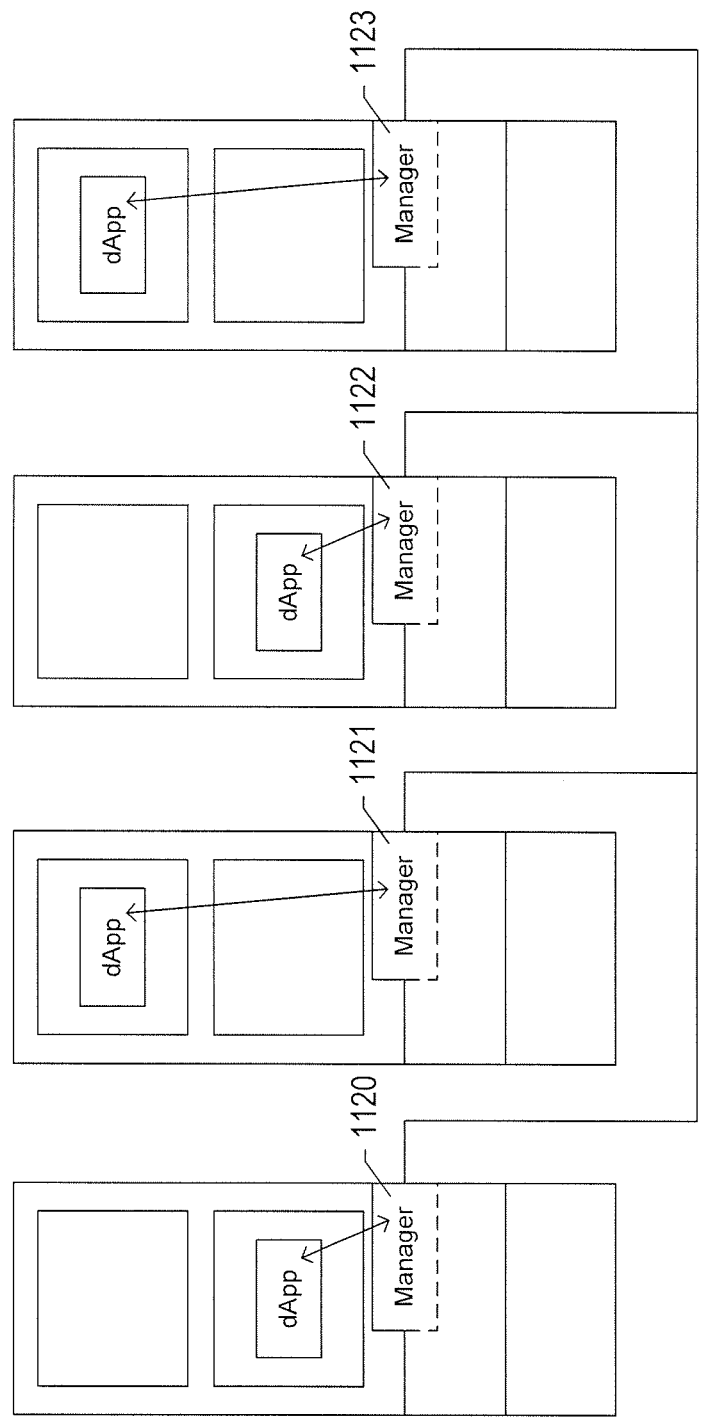
Figure 11C:
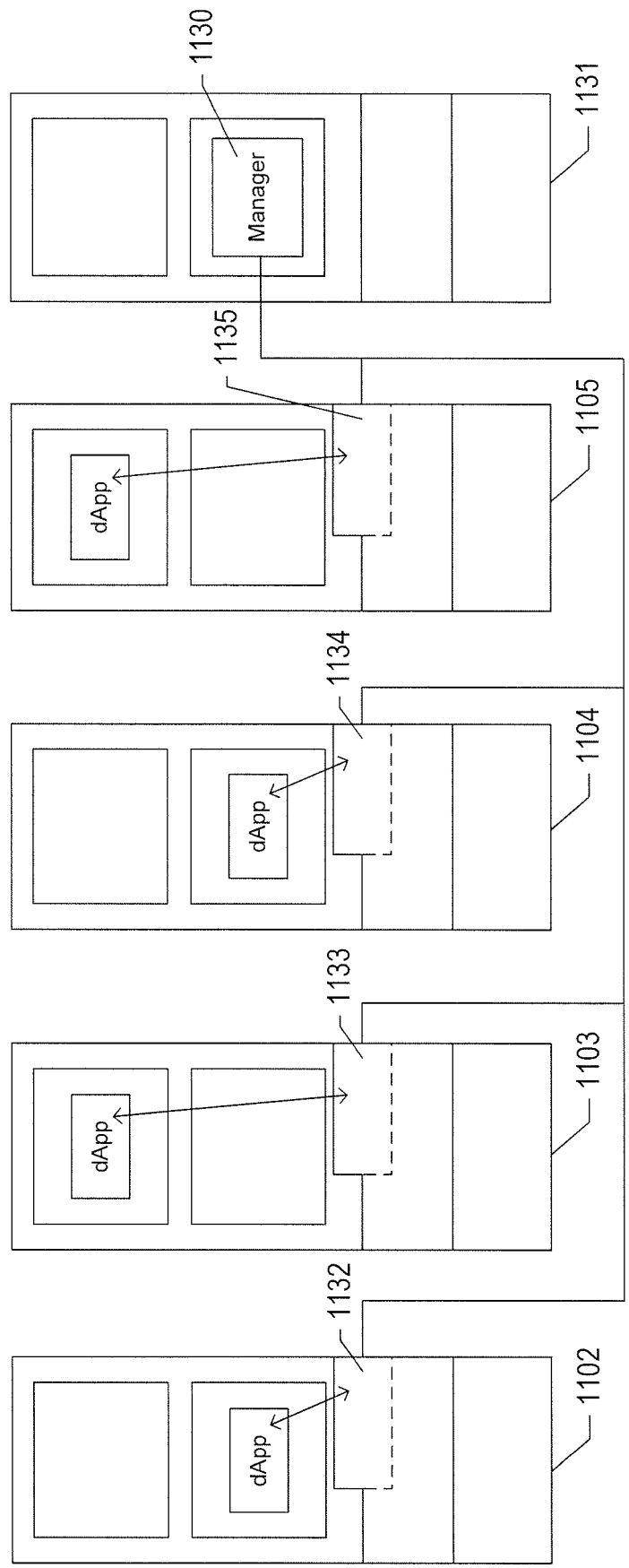

FIGS. 11A-C illustrate an application manager. All three figures use the same illustration conventions, next described with reference to FIG. 11A. The distributed computing system is represented, in FIG. 11A, by four servers 1102-1105 that each support execution of a virtual machine, 1106-1108 respectively, that provides an execution environment for a local instance of the distributed application. Of course, in real-life cloud-computing environments, a particular distributed application may run on many tens to hundreds of individual physical servers. Such distributed applications often require fairly continuous administration and management. For example, instances of the distributed application may need to be launched or terminated, depending on current computational loads, and may be frequently relocated to different physical servers and even to different cloud-computing facilities in order to take advantage of favorable pricing for virtual-machine execution, to obtain necessary computational throughput, and to minimize networking latencies. Initially, management of distributed applications as well as the management of multiple, different applications executing on behalf of a client or client organization of one or more cloud-computing facilities was carried out manually through various management interfaces provided by cloud-computing facilities and distributed-computer data centers. However, as the complexity of distributed-computing environments has increased and as the numbers and complexities of applications concurrently executed by clients and client organizations have increased, efforts have been undertaken to develop automated application managers for automatically monitoring and managing applications on behalf of clients and client organizations of cloud-computing facilities and distributed-computer-system-based data centers.

As shown in FIG. 11B, one approach to automated management of applications within distributed computer systems is to include, in each physical server on which one or more of the managed applications executes, a local instance of the distributed application manager 1120-1123. The local instances of the distributed application manager cooperate, in peer-to-peer fashion, to manage a set of one or more applications, including distributed applications, on behalf of a client or client organization of the data center or cloud-computing facility. Another approach, as shown in FIG. 11C, is to run a centralized or centralized-distributed application manager 1130 on one or more physical servers 1131 that communicates with application-manager agents 1132-1135 on the servers 1102-1105 to support control and management of the managed applications. In certain cases, application-management facilities may be incorporated within the various types of management servers that manage virtual data centers and aggregations of virtual data centers discussed in the previous subsection of the current document. The phrase "application manager" means, in this document, an automated controller than controls and manages applications programs and the computational environment in which they execute. Thus, an application manager may interface to one or more operating systems and virtualization layers, in addition to applications, in various implementations, to control and manage the applications and their computational environments. In certain implementations, an application manager may even control and manage virtual and/or physical components that support the computational environments in which applications execute.

In certain implementations, an application manager is configured to manage applications and their computational environments within one or more distributed computing systems based on a set of one or more policies, each of which may include various rules, parameter values, and other types of specifications of the desired operational characteristics of the applications. As one example, the one or more policies may specify maximum average latencies for responding to user requests, maximum costs for executing virtual machines per hour or per day, and policy-driven approaches to optimizing the cost per transaction and the number of transactions carried out per unit of time. Such overall policies may be implemented by a combination of finer-grain policies, parameterized control programs, and other types of controllers that interface to operating-system and virtualization-layer-management subsystems. However, as the numbers and complexities of applications desired to be managed on behalf of clients and client organizations of data centers and cloud-computing facilities continues to increase, it is becoming increasingly difficult, if not practically impossible, to implement policy-driven application management by manual programming and/or policy construction. As a result, a new approach to application management based on the machine-learning technique referred to as "reinforcement learning" has been undertaken.

Figure 12:
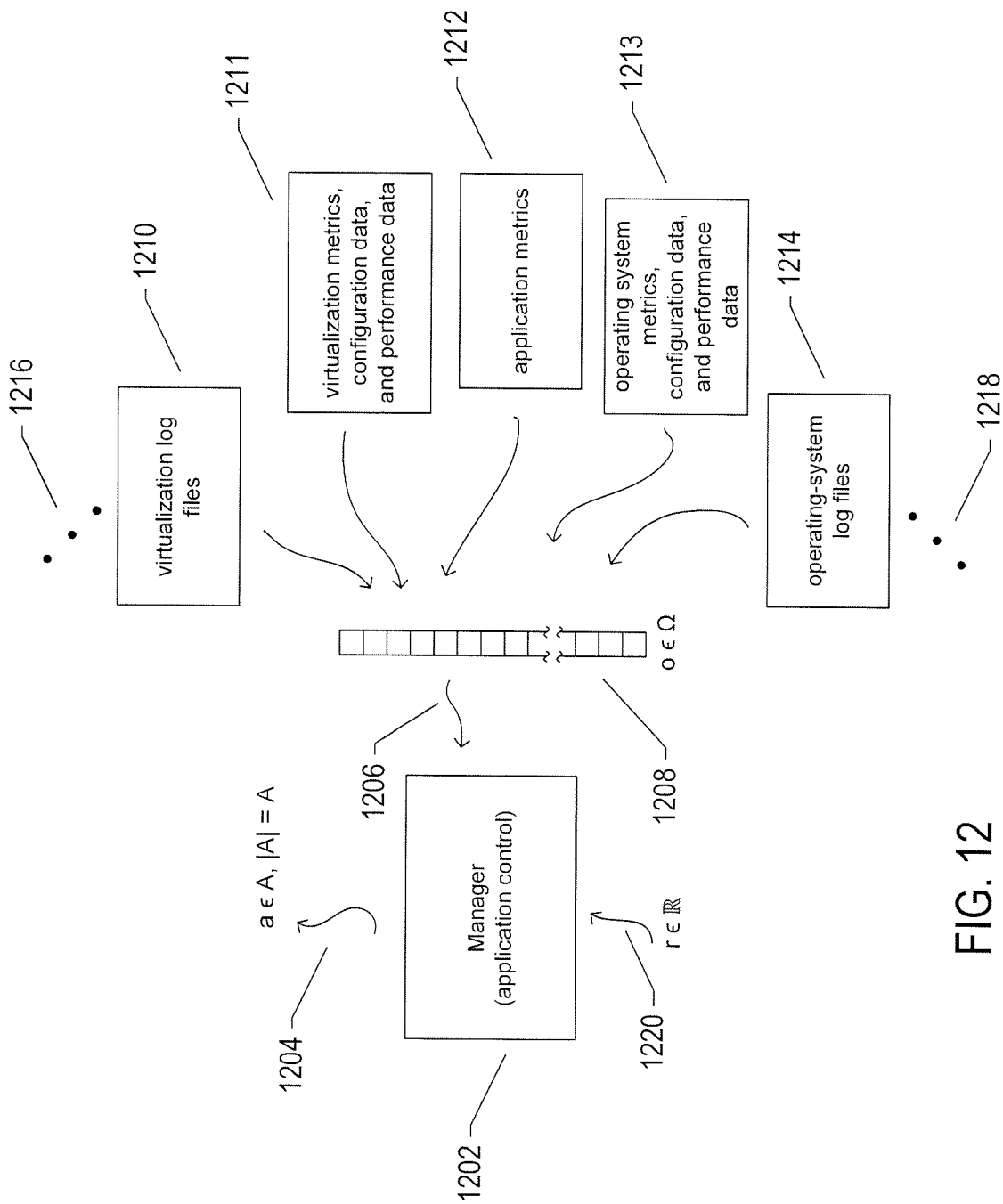
FIG. 12 illustrates, at a high level of abstraction, a reinforcement-learning-based application manager controlling a computational environment, such as a cloud-computing facility.

FIG. 12 illustrates, at a high level of abstraction, a reinforcement-learning-based application manager controlling a computational environment, such as a cloud-computing facility. The reinforcement-learning-based application manager 1202 manages one or more applications by emitting or issuing actions, as indicated by arrow 1204. These actions are selected from a set of actions A of cardinality |A|. Each action a in the set of actions A can be generally thought of as a vector of numeric values that specifies an operation that the manager is directing the environment to carry out. The environment may, in many cases, translate the action into one or more environment-specific operations that can be carried out by the computational environment controlled by the reinforcement-learning-based application manager. It should be noted that the cardinality |A| may be indeterminable, since the numeric values may include real values, and the action space may be therefore effectively continuous or effectively continuous in certain dimensions. The operations represented by actions may be, for example, commands, including command arguments, executed by operating systems, distributed operating systems, virtualization layers, management servers, and other types of control components and subsystems within one or more distributed computing systems or cloud-computing facilities. The reinforcement-learning-based application manager receives observations from the computational environment, as indicated by arrow 1206. Each observation o can be thought of as a vector of numeric values 1208 selected from a set of possible observation vectors $\Omega$. The set $\Omega$ may, of course, be quite large and even practically innumerable. Each element of the observation o represents, in certain implementations, a particular type of metric or observed operational characteristic or parameter, numerically encoded, that is related to the computational environment. The metrics may have discrete values or real values, in various implementations. For example, the metrics or observed operational characteristics may indicate the amount of memory allocated for applications and/or application instances, networking latencies experienced by one or more applications, an indication of the number of instruction-execution cycles carried out on behalf of applications or local-application instances, and many other types of metrics and operational characteristics of the managed applications and the computational environment in which the managed applications run. As shown in FIG. 12, there are many different sources 1210-1214 for the values included in an observation o, including virtualization-layer and operating-system log files 1210 and 1214, virtualization-layer metrics, configuration data, and performance data provided through a virtualization-layer management interface 1211, various types of metrics generated by the managed applications 1212, and operating-system metrics, configuration data, and performance data 1213. Ellipses 1216 and 1218 indicate that there may be many additional sources for observation values. In addition to receiving observation vectors o, the reinforcement-learning-based application manager receives rewards, as indicated by arrow 1220. Each reward is a numeric value that represents the feedback provided by the computational environment to the reinforcement-learning-based application manager after carrying out the most recent action issued by the manager and transitioning to a resultant state, as further discussed below. The reinforcement-learning-based application manager is generally initialized with an initial policy that specifies the actions to be issued in response to received observations and over time, as the application manager interacts with the environment, the application manager adjusts the internally maintained policy according to the rewards received following issuance of each action. In many cases, after a reasonable period of time, a reinforcement-learning-based application manager is able to learn a near-optimal or optimal policy for the environment, such as a set of distributed applications, that it manages. In addition, in the case that the managed environment evolves over time, a reinforcement-learning-based application manager is able to continue to adjust the internally maintained policy in order to track evolution of the managed environment so that, at any given point in time, the internally maintained policy is near-optimal or optimal. In the case of an application manager, the computational environment in which the applications run may evolve through changes to the configuration and components, changes in the computational load experienced by the applications and computational environment, and as a result of many additional changes and forces. The received observations provide the information regarding the managed environment that allows the reinforcement-learning-based application manager to infer the current state of the environment which, in turn, allows the reinforcement-learning-based application manager to issue actions that push the managed environment towards states that, over time, produce the greatest reward feedbacks. Of course, similar reinforcement-learning-based application managers may be employed within standalone computer systems, individual, networked computer systems, various processor-controlled devices, including smart phones, and other devices and systems that run applications.

Figure 13:
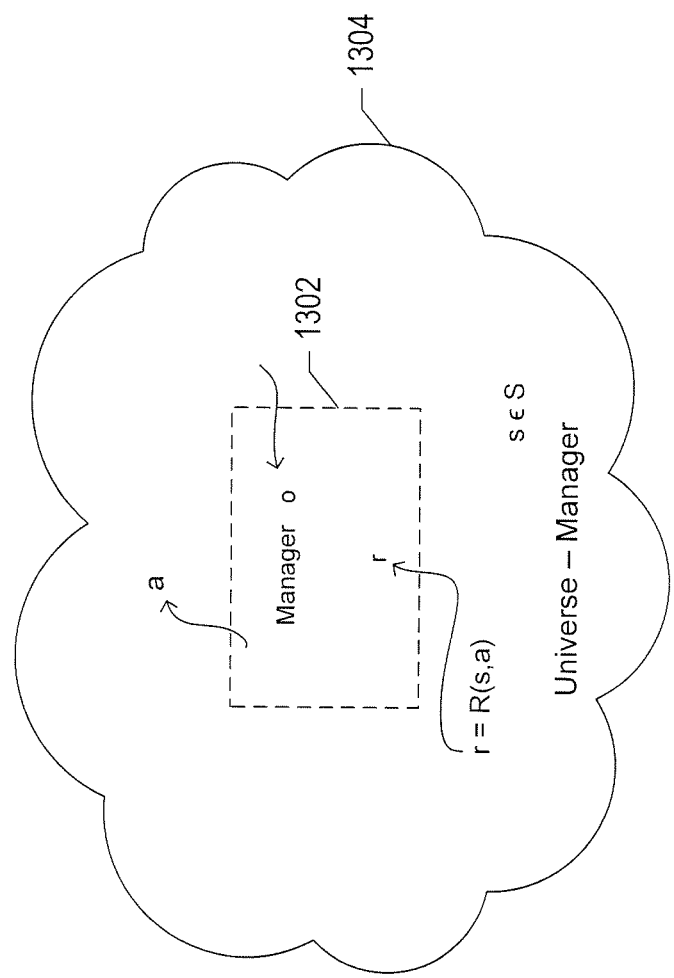
FIG. 13 summarizes the reinforcement-learning-based approach to control.

FIG. 13 summarizes the reinforcement-learning-based approach to control. The manager or controller 1302, referred to as a "reinforcement-learning agent," is contained within, but is distinct and separate from, the universe 1304. Thus, the universe comprises the manager or controller 1302 and the portion of the universe not included in the manager, in set notation referred to as "universe—manager." In the current document, the portion of the universe not included in the manager is referred to as the "environment." In the case of an application manager, the environment includes the managed applications, the physical computational facilities in which they execute, and even generally includes the physical computational facilities in which the manager executes. The rewards are generated by the environment and the reward-generation mechanism cannot be controlled or modified by the manager.

Figure 14A:
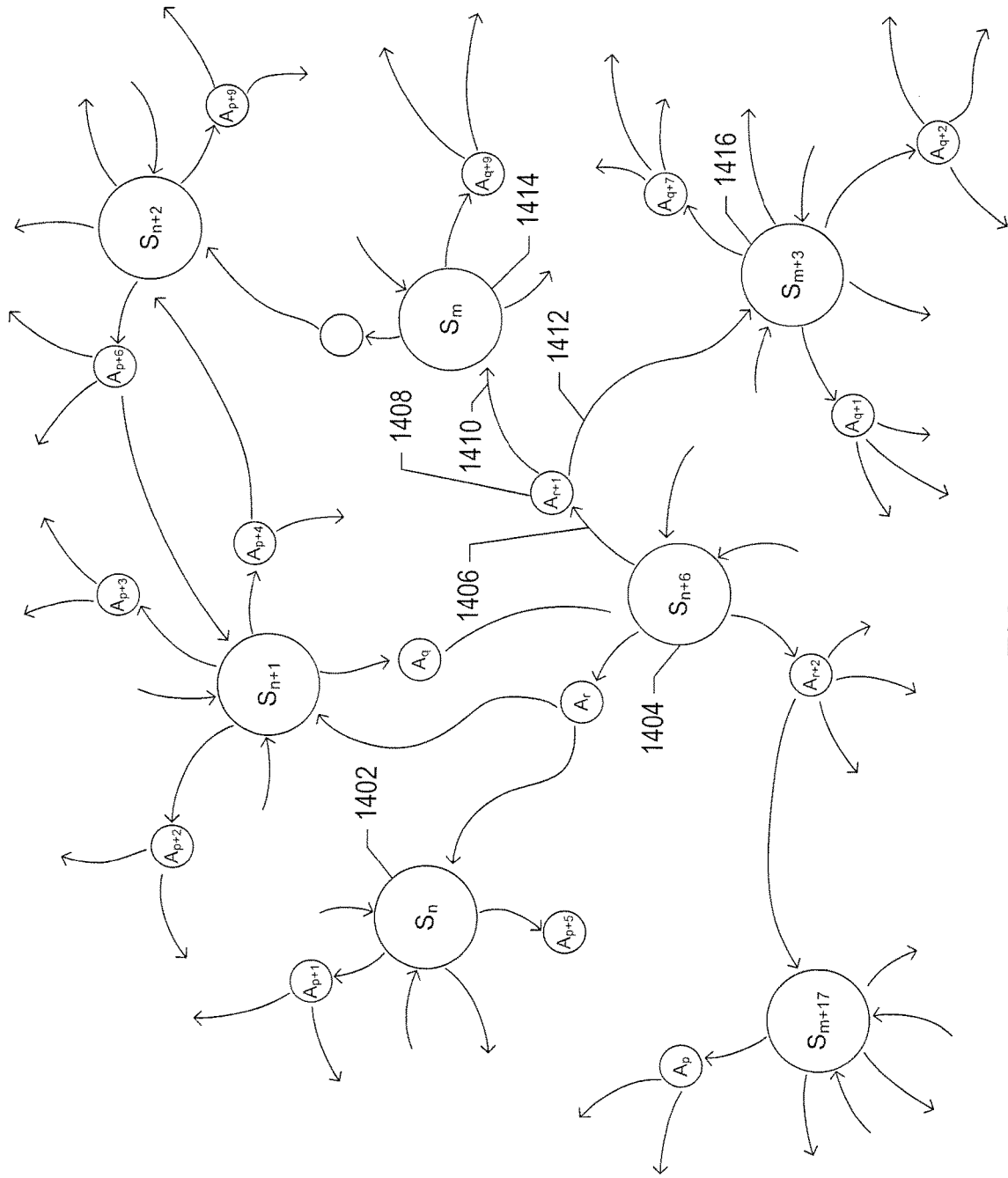
FIGS. 14A-B illustrate states of the environment.
Figure 14B:
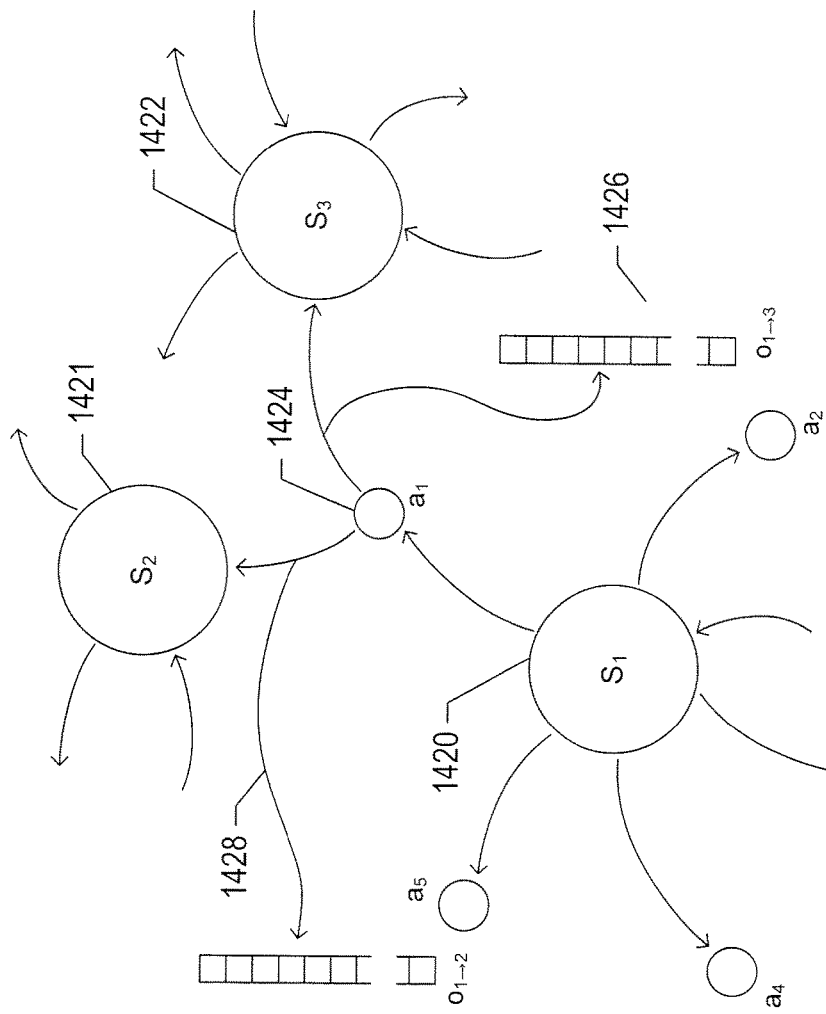

FIGS. 14A-B illustrate states of the environment. In the reinforcement-learning approach, the environment is considered to inhabit a particular state at each point in time. The state may be represented by one or more numeric values or character-string values, but generally is a function of hundreds, thousands, millions, or more different variables. The observations generated by the environment and transmitted to the manager reflect the state of the environment at the time that the observations are made. The possible state transitions can be described by a state-transition diagram for the environment. FIG. 14A illustrates a portion of a state-transition diagram. Each of the states in the portion of the state-transition diagram shown in FIG. 14A are represented by large, labeled disks, such as disc 1402 representing a particular state $S_n$. The transition between one state to another state occurs as a result of an action, emitted by the manager, that is carried out within the environment. Thus, arrows incoming to a given state represent transitions from other states to the given state and arrows outgoing from the given state represent transitions from the given state to other states. For example, one transition from state 1404, labeled $S_{n+6}$, is represented by outgoing arrow 1406. The head of this arrow points to a smaller disc that represents a particular action 1408. This action node is labeled $A_{r+1}$. The labels for the states and actions may have many different forms, in different types of illustrations, but are essentially unique identifiers for the corresponding states and actions. The fact that outgoing arrow 1406 terminates in action 1408 indicates that transition 1406 occurs upon carrying out of action 1408 within the environment when the environment is in state 1404. Outgoing arrows 1410 and 1412 emitted by action node 1408 terminate at states 1414 and 1416, respectively. These arrows indicate that carrying out of action 1408 by the environment when the environment is in state 1404 results in a transition either to state 1414 or to state 1416. It should also be noted that an arrow emitted from an action node may return to the state from which the outgoing arrow to the action node was emitted. In other words, carrying out of certain actions by the environment when the environment is in a particular state may result in the environment maintaining that state. Starting at an initial state, the state-transition diagram indicates all possible sequences of state transitions that may occur within the environment. Each possible sequence of state transitions is referred to as a "trajectory."

FIG. 14B illustrates additional details about state-transition diagrams and environmental states and behaviors. FIG. 14B shows a small portion of a state-transition diagram that includes three state nodes 1420-1422. A first additional detail is the fact that, once an action is carried out, the transition from the action node to a resultant state is accompanied by the emission of an observation, by the environment, to the manager. For example, a transition from state 1420 to state 1422 as a result of action 1424 produces observation 1426, while transition from state 1420 to state 1421 via action 1424 produces observation 1428. A second additional detail is that each state transition is associated with a probability. Expression 1430 indicates that the probability of transitioning from state $s_1$ to state $s_2$ as a result of the environment carrying out action $a_1$, where s indicates the current state of the environment and s' indicates the next state of the environment following s, is output by the state-transition function T, which takes, as arguments, indications of the initial state, the final state, and the action. Thus, each transition from a first state through a particular action node to a second state is associated with a probability. The second expression 1432 indicates that probabilities are additive, so that the probability of a transition from state $s_1$ to either state $s_2$ or state $s_3$ as a result of the environment carrying out action $a_1$ is equal to the sum of the probability of a transition from state $s_1$ to state $s_2$ via action $a_1$ and the probability of a transition from state $s_1$ to state $s_3$ via action $a_1$. Of course, the sum of the probabilities associated with all of the outgoing arrows emanating from a particular state is equal to 1.0, for all non-terminal states, since, upon receiving an observation/reward pair following emission of a first action, the manager emits a next action unless the manager terminates. As indicated by expressions 1434, the function O returns the probability that a particular observation o is returned by the environment given a particular action and the state to which the environment transitions following execution of the action. In other words, in general, there are many possible observations o that might be generated by the environment following transition to a particular state through a particular action, and each possible observation is associated with a probability of occurrence of the observation given a particular state transition through a particular action.

Figure 15:
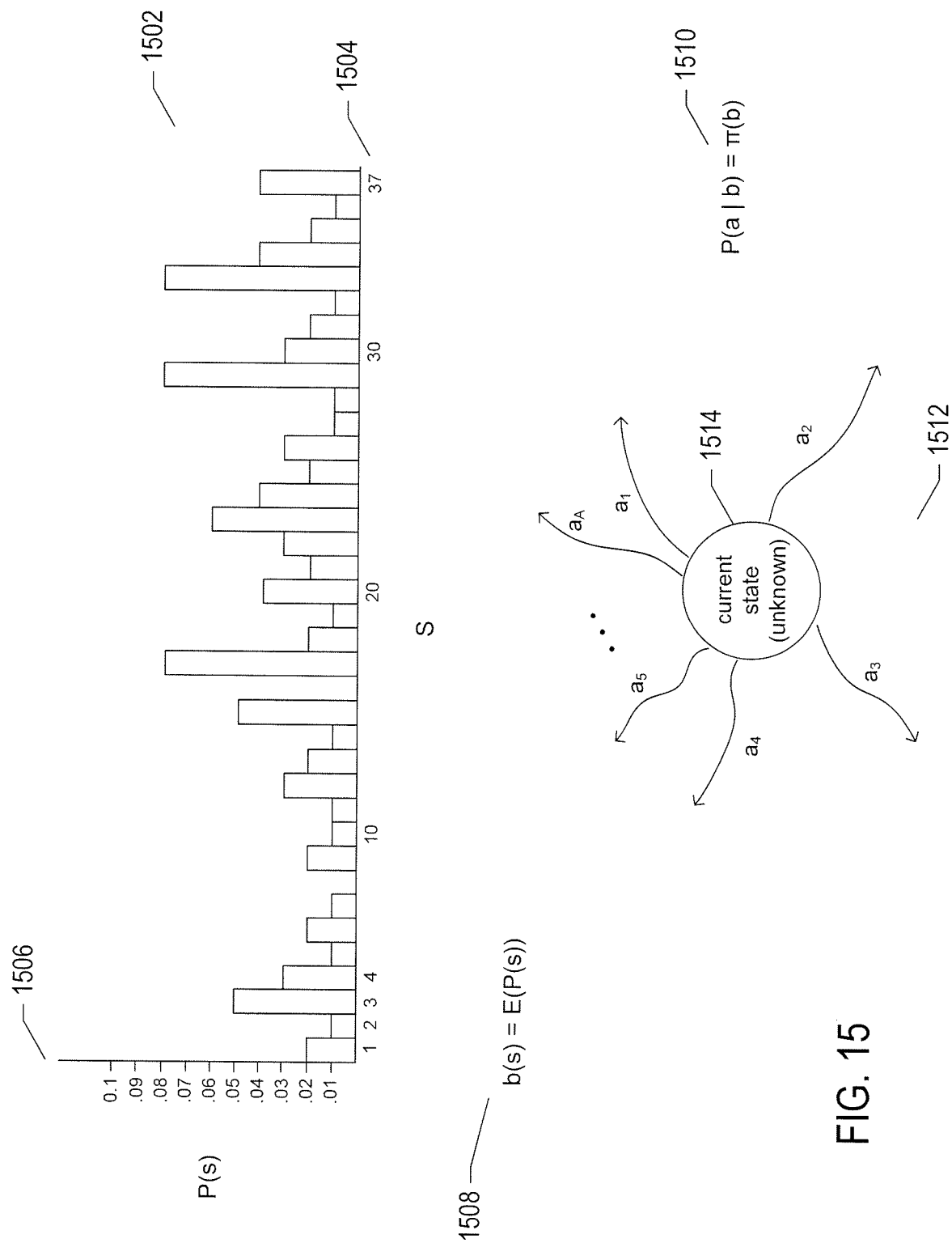
FIG. 15 illustrates the concept of belief.

FIG. 15 illustrates the concept of belief. At the top of FIG. 15, a histogram 1502 is shown. The horizontal axis 1502 represents 37 different possible states for a particular environment and the vertical axis 1506 represents the probability of the environment being in the corresponding state at some point in time. Because the environment must be in one state at any given point in time, the sum of the probabilities for all the states is equal to 1.0. Because the manager does not know the state of the environment, but instead only knows the values of the elements of the observation following the last executed action, the manager infers the probabilities of the environment being in each of the different possible states. The manager's belief b(s) is the expectation of the probability that the environment is in state s, as expressed by equation 1508. Thus, the belief b is a probability distribution which could be represented in a histogram similar to histogram 1502. Over time, the manager accumulates information regarding the current state of the environment and the probabilities of state transitions as a function of the belief distribution and most recent actions, as a result of which the probability distribution b shifts towards an increasingly non-uniform distribution with greater probabilities for the actual state of the environment. In a deterministic and fully observable environment, in which the manager knows the current state of the environment, the policy π maintained by the manager can be thought of as a function that returns the next action a to be emitted by the manager to the environment based on the current state of the environment, or, in mathematical notation, a=π(s). However, in the non-deterministic and non-transparent environment in which application managers operate, the policy π maintained by the manager determines a probability for each action based on the current belief distribution b, as indicated by expression 1510 in FIG. 15, and an action with the highest probability is selected by the policy π, which can be summarized, in more compact notation, by expression 1511. Thus, as indicated by the diagram of a state 1512, at any point in time, the manager does not generally certainly know the current state of the environment, as indicated by the label 1514 within the node representation of the current date 1512, as a result of which there is some probability, for each possible state, that the environment is currently in that state. This, in turn, generally implies that there is a non-zero probability that each of the possible actions that the manager can issue should be the next issued action, although there are cases in which, although the state of the environment is not known with certain, there is enough information about the state of the environment to allow a best action to be selected.

Figure 16A:
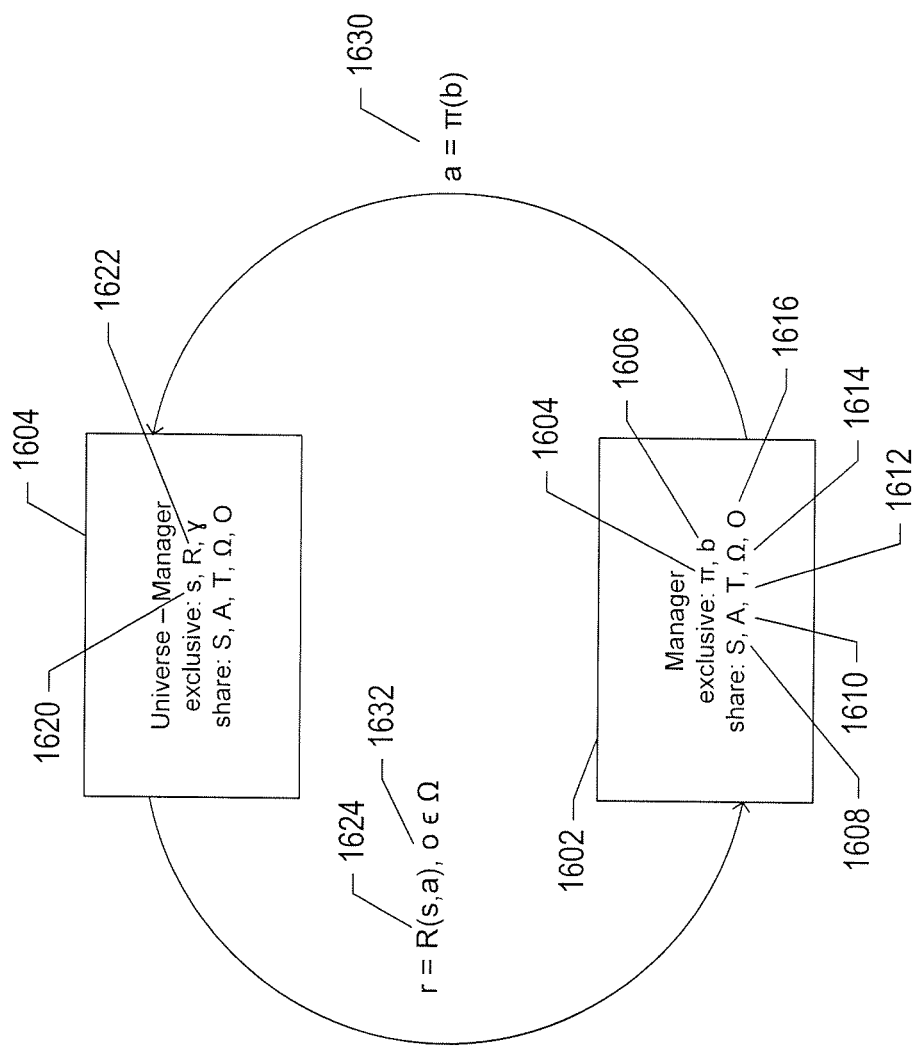
FIGS. 16A-B illustrate a simple flow diagram for the universe comprising the manager and the environment in one approach to reinforcement learning.
Figure 16B:
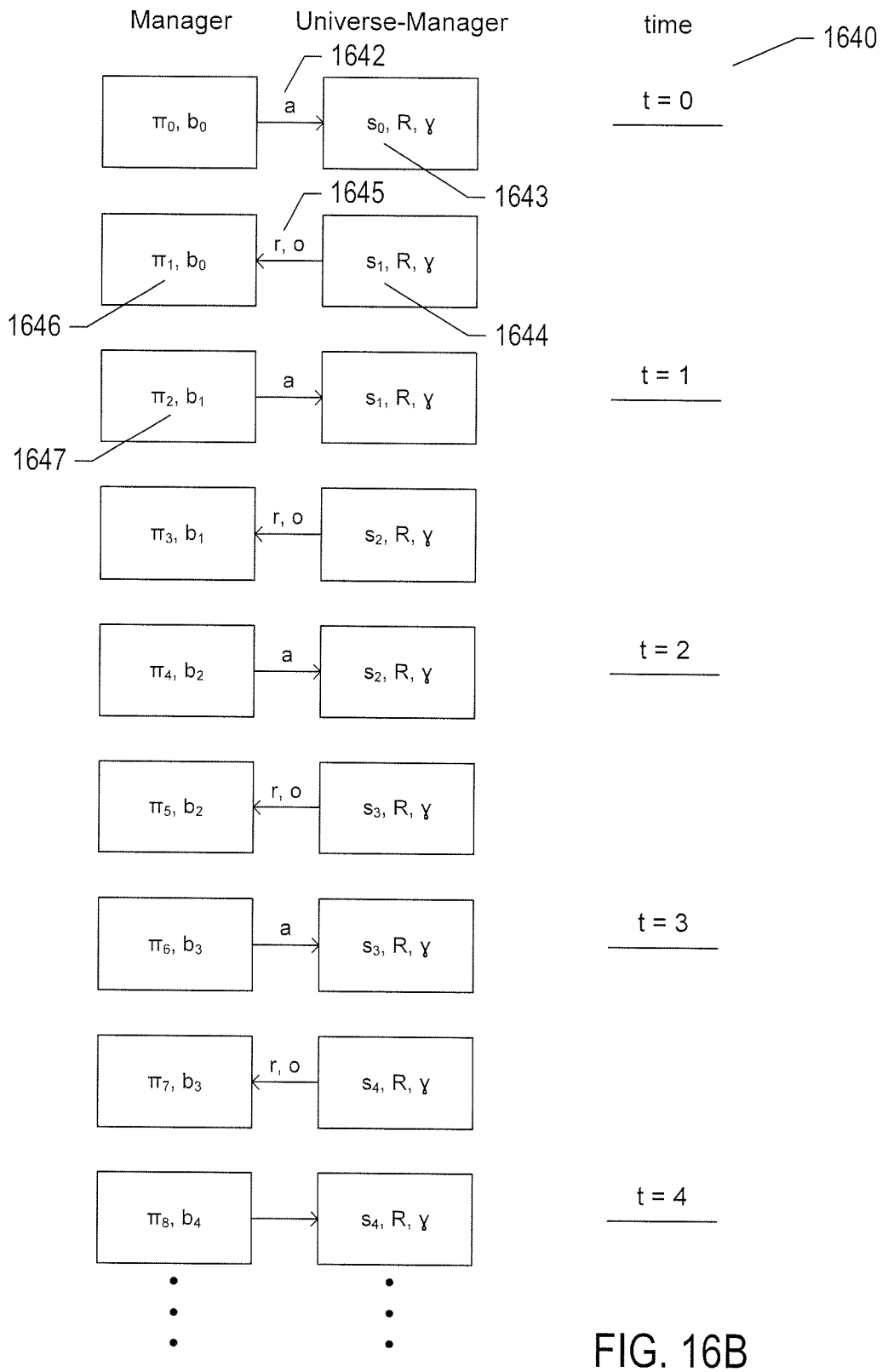

FIGS. 16A-B illustrate a simple flow diagram for the universe comprising the manager and the environment in one approach to reinforcement learning. The manager 1602 internally maintains a policy π 1604 and a belief distribution b 1606 and is aware of the set of environment states S 1608, the set of possible actions A 1610, the state-transition function T 1612, the set of possible observations Ω 1614 and, and the observation-probability function O 1616, all discussed above. The environment 1604 shares knowledge of the sets A, and Ω with the manager. Usually, the true state space S and the functions T and O are unknown and estimated by the manager. The environment maintains the current state of the environment s 1620, a reward function R 1622 that returns a reward r in response to an input current state s and an input action a received while in the current state 1624, and a discount parameter γ 1626, discussed below. The manager is initialized with an initial policy and belief distribution. The manager emits a next action 1630 based on the current belief distribution which the environment then carries out, resulting in the environment occupying a resultant state and then issues a reward 1624 and an observation o 1632 based on the resultant state and the received action. The manager receives the reward and observation, generally updates the internally stored policy and belief distribution, and then issues a next action, in response to which the environment transitions to a resultant state and emits a next reward and observation. This cycle continues indefinitely or until a termination condition arises.

It should be noted that this is just one model of a variety of different specific models that may be used for a reinforcement-learning agent and environment. There are many different models depending on various assumptions and desired control characteristics. In certain models which employ policy-gradient approaches, for example, a belief distribution may not be needed.

FIG. 16B shows an alternative way to illustrate operation of the universe. In this alternative illustration method, a sequence of time steps is shown, with the times indicated in a right-hand column 1640. Each time step consists of issuing, by the manager, an action to the environment and issuing, by the environment, a reward and observation to the manager. For example, in the first time step t=0, the manager issues an action a 1642, the environment transitions from state $s_0$ 1643 to $s_1$ 1644, and the environment issues a reward r and observation o 1645 to the manager. As a result, the manager updates the policy and belief distribution in preparation for the next time step. For example, the initial policy and belief distribution $\pi_0$ and $b_0$ 1646 are updated to the policy and belief distribution $\pi_1$ and $b_1$ 1647 at the beginning of the next time step t=1. The sequence of states $\{s_0, s_1, \ldots\}$ represents the trajectory of the environment as controlled by the manager. Each time step is thus equivalent to one full cycle of the control-flow-diagram-like representation discussed above with reference to FIG. 16A.

FIG. 17 provides additional details about the operation of the manager, environment, and universe. At the bottom of FIG. 17, a trajectory for the manager and environment is laid out horizontally with respect to the horizontal axis 1702 representing the time steps discussed above with reference to FIG. 16B. A first horizontal row 1704 includes the environment states, a second horizontal row 1706 includes the belief distributions, and a third horizontal row 1708 includes the issued rewards. At any particular state, such as circled state $s_4$ 1710, one can consider all of the subsequent rewards, shown for state $s_4$ within box 1712 in FIG. 17. The discounted return for state $s_4$, $G_4$, is the sum of a series of discounted rewards 1714. The first term in the series 1716 is the reward $r_5$ returned when the environment transitions from state $s_4$ to state $s_5$. Each subsequent term in the series includes the next reward multiplied by the discount rate γ raised to a power. The discounted reward can be alternatively expressed using a summation, as indicated in expression 1718. The value of a given state s, assuming a current policy π, is the expected discounted return for the state, and is returned by a value function $V^\pi(\ )$, as indicated by expression 1720. Alternatively, an action-value function returns a discounted return for a particular state and action, assuming a current policy, as indicated by expression 1722. An optimal policy π* provides a value for each state that is greater than or equal to the value provided by any possible policy π in the set of possible policies Π. There are many different ways for achieving an optimal policy. In general, these involve running a manager to control an environment while updating the value function $V^\pi()$ and policy $\pi$, either in alternating sessions or concurrently. In some approaches to reinforcement learning, when the environment is more or less static, once an optimal policy is obtained during one or more training runs, the manager subsequently controls the environment according to the optimal policy. In other approaches, initial training generates an initial policy that is then continuously updated, along with the value function, in order to track changes in the environment so that a near-optimal policy is maintained by the manager.

Figure 18:
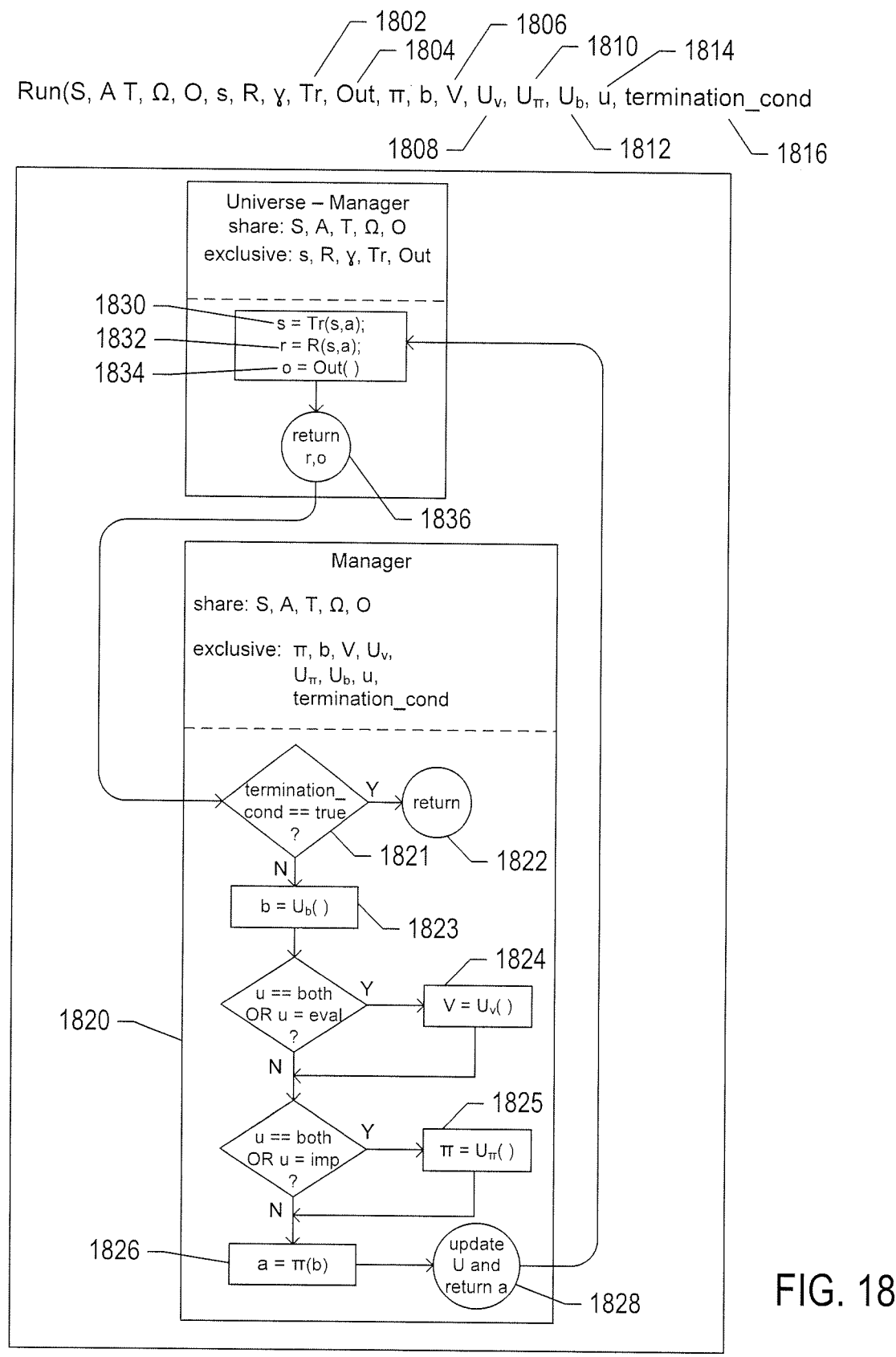
FIG. 18 provides a somewhat more detailed control-flow-like description of operation of the manager and environment than originally provided in FIG. 16A.

FIG. 18 provides a somewhat more detailed control-flow-like description of operation of the manager and environment than originally provided in FIG. 16A. The control-flow-like presentation corresponds to a run of the manager and environment that continues until a termination condition evaluates to TRUE. In addition to the previously discussed sets and functions, this model includes a state-transition function Tr 1802, an observation-generation function Out 1804, a value function V 1806, update functions $U_\nu$ 1808, $U_\pi$ 1810, and $U_b$ 1812 that update the value function, policy, and belief distribution, respectively, an update variable u 1814 that indicates whether to update the value function, policy, or both, and a termination condition 1816. The manager 1820 determines whether the termination condition evaluates to TRUE, in step 1821, and, if so, terminates in step 1822. Otherwise, the manager updates the belief, in step 1823 and updates one or both of the value function and policy, in steps 1824 and 1825, depending on the current value of the update variable u. In step 1826, the manager generates a new action and, in step 1828, updates the update variable u and issues the generated action to the environment. The environment determines a new state 1830, determines a reward 1832, and determines an observation 1834 and returns the generated reward and observation in step 1836.

Figure 19:
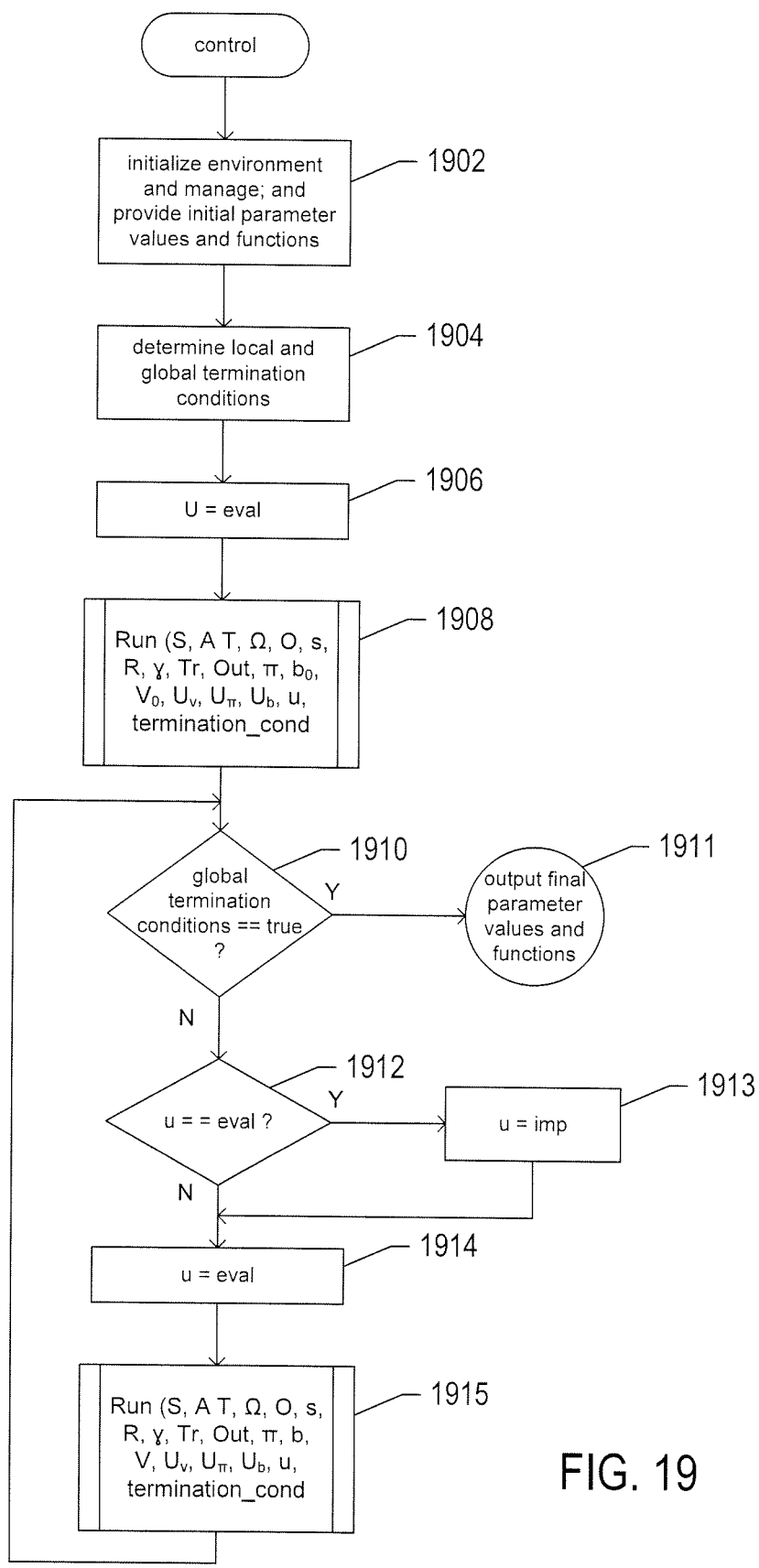
FIG. 19 provides a traditional control-flow diagram for operation of the manager and environment over multiple runs.

FIG. 19 provides a traditional control-flow diagram for operation of the manager and environment over multiple runs. In step 1902, the environment and manager are initialized. This involves initializing certain of the various sets, functions, parameters, and variables shown at the top of FIG. 18. In step 1904, local and global termination conditions are determined. When the local termination condition evaluates to TRUE, the run terminates. When the global termination condition evaluates to TRUE, operation of the manager terminates. In step 1906, the update variable u is initialized to indicate that the value function should be updated during the initial run. Step 1908 consists of the initial run, during which the value function is updated with respect to the initial policy. Then, additional runs are carried out in the loop of steps 1910-1915. When the global termination condition evaluates to TRUE, as determined in step 1910, operation of the manager is terminated in step 1911, with output of the final parameter values and functions. Thus, the manager may be operated for training purposes, according to the control-flow diagram shown in FIG. 19, with the final output parameter values and functions stored so that the manager can be subsequently operated, according to the control-flow diagram shown in FIG. 19, to control a live system. Otherwise, when the global termination condition does not evaluate to TRUE and when the update variable u has a value indicating that the value function should be updated, as determined in step 1912, the value stored in the update variable u is changed to indicate that the policy should be updated, in step 1913. Otherwise, the value stored in the update variable u is changed to indicate that the value function should be updated, in step 1914. Then, a next run, described by the control-flow-like diagram shown in FIG. 18, is carried out in step 1915. Following termination of this run, control flows back to step 1910 for a next iteration of the loop of steps 1910-1915. In alternative implementations, the update variable u may be initially set to indicate that both the value function and policy should be updated during each run and the update variable u is not subsequently changed. This approach involves different value-function and policy update functions than those used when only one of the value function and policy is updated during each run.

Figure 20:
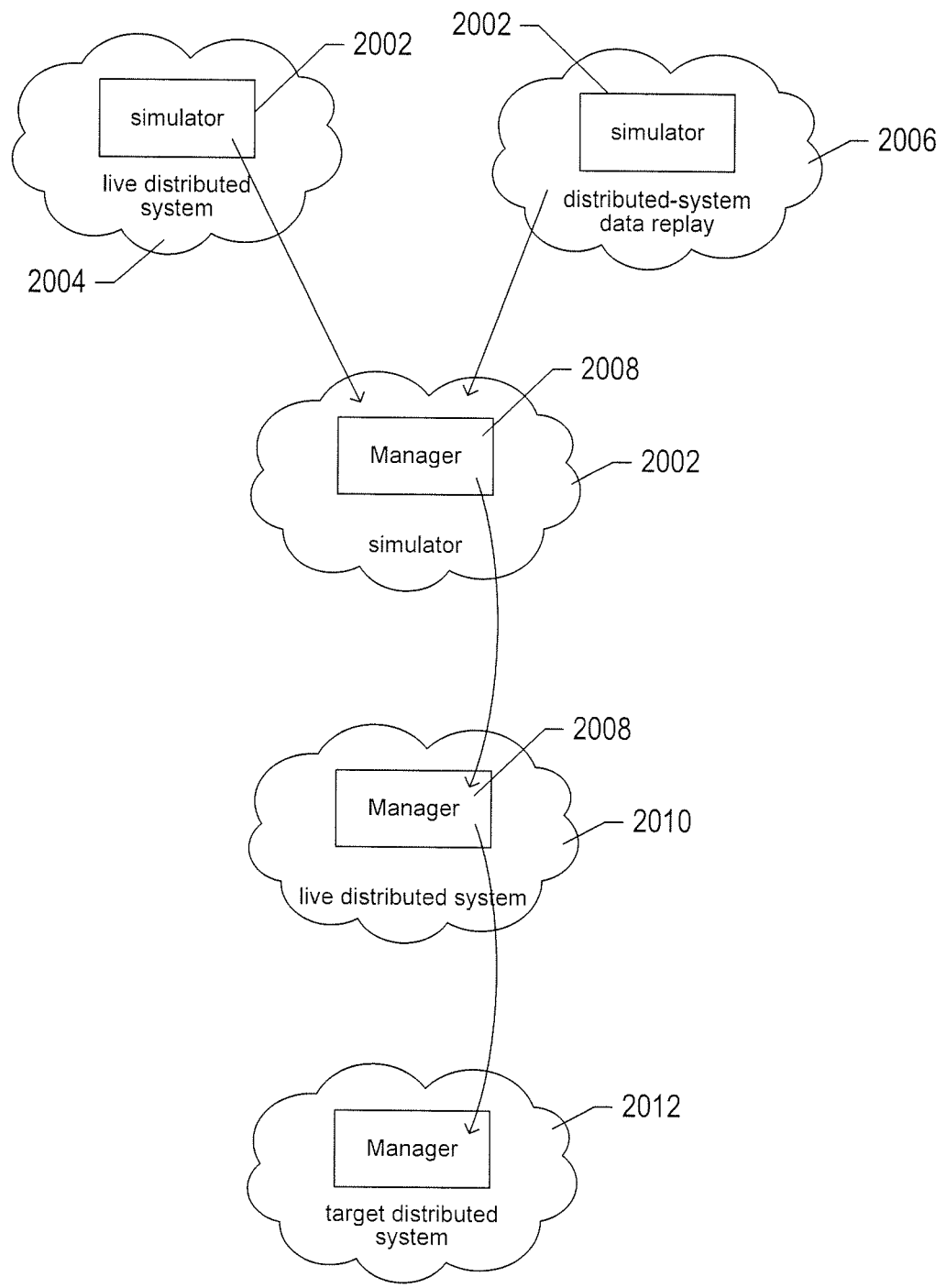
FIG. 20 illustrates one approach to using reinforcement learning to generate and operate an application manager.

FIG. 20 illustrates one approach to using reinforcement learning to generate and operate an application manager. First, reinforcement learning is used to train an environment simulator 2002 by one or both of operating the simulator against a live-distributed-system environment 2004 or against a simulated distributed-system environment that replays archived data generated by a live distributed system to the simulator 2006. Then, a manager 2008 is initially trained by controlling an environment consisting of the simulator 2002. The manager, once trained, is then operated for a time to control an environment comprising a live distributed system 2010. Once the manager has been trained both against the simulator and the live distributed system, it is ready to be deployed to manage an environment 2012 comprising a target live distributed system.

Figure 21:
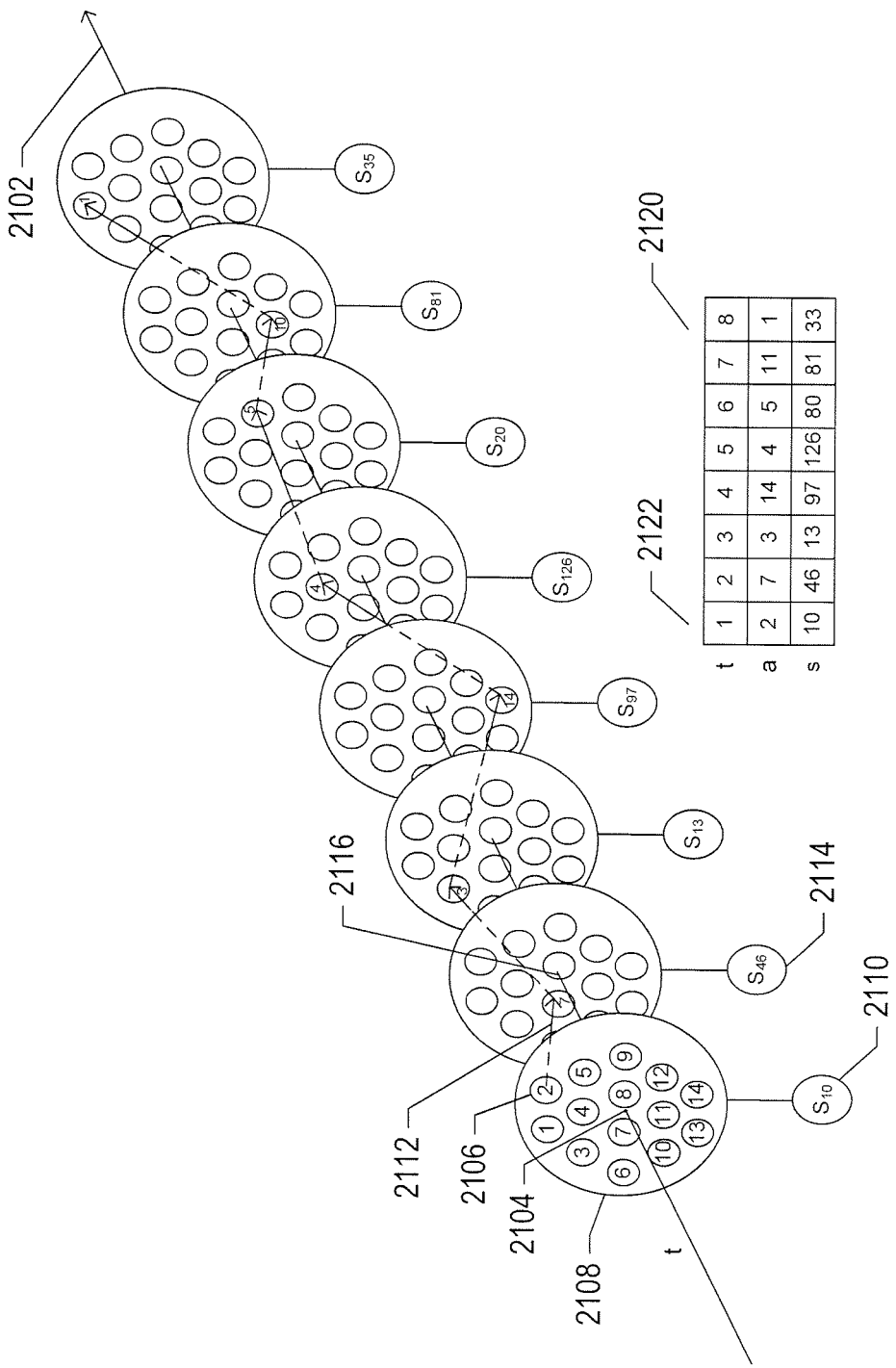
FIG. 21 illustrates an alternative view of a control trajectory comprising a sequence of executed of actions, each accompanied by a managed-environment state change.

FIG. 21 illustrates an alternative view of a control trajectory comprising a sequence of executed of actions, each accompanied by a managed-environment state change. In FIG. 21, arrow 2102 represents a timeline. At the beginning of each of multiple time intervals, a reinforcement-learning-based controller invokes the above-discussed policy $\pi$ to select a next action from a set of actions A. For example, at the time interval that begins with time 2104, the reinforcement-learning-based controller invokes the policy $\pi$ to select action 2106, represented as a circle inscribing a numerical label "2," from the set of possible actions A, represented by disk 2108, which contains 14 different possible actions represented by smaller circles that each inscribe a different numeric label. Of course, in real-world situations, there may be hundreds, thousands, tens of thousands, or more different possible actions. The state of the managed-environment, at time 2104, is represented by the circle 2110 inscribing the label "$s_{10}$" indicating the managed-environment state. When the reinforcement-learning-based controller executes the selected action, as represented by arrow 2112, the managed environment transitions to a new state 2114 at a next point in time 2116, where the process is repeated to produce a next action and next state transition. Thus, reinforcement-learning-based control can be thought of as a trajectory through a state/action space. In the simple example of FIG. 21, with both actions and states represented by integers, the state/action space can be imagined as a two-dimensional plane with two orthogonal coordinate axes corresponding to actions and states. A control trajectory can be represented as a table, such as table 2120 shown in FIG. 21, containing three-value columns, such as column 2122, that each includes a time value, an indication of an action, and an indication of the state. Again, as mentioned above, actions and states may be represented by integers, floating-point numbers, and other types of symbols and symbol strings, including character strings.

Figure 22:
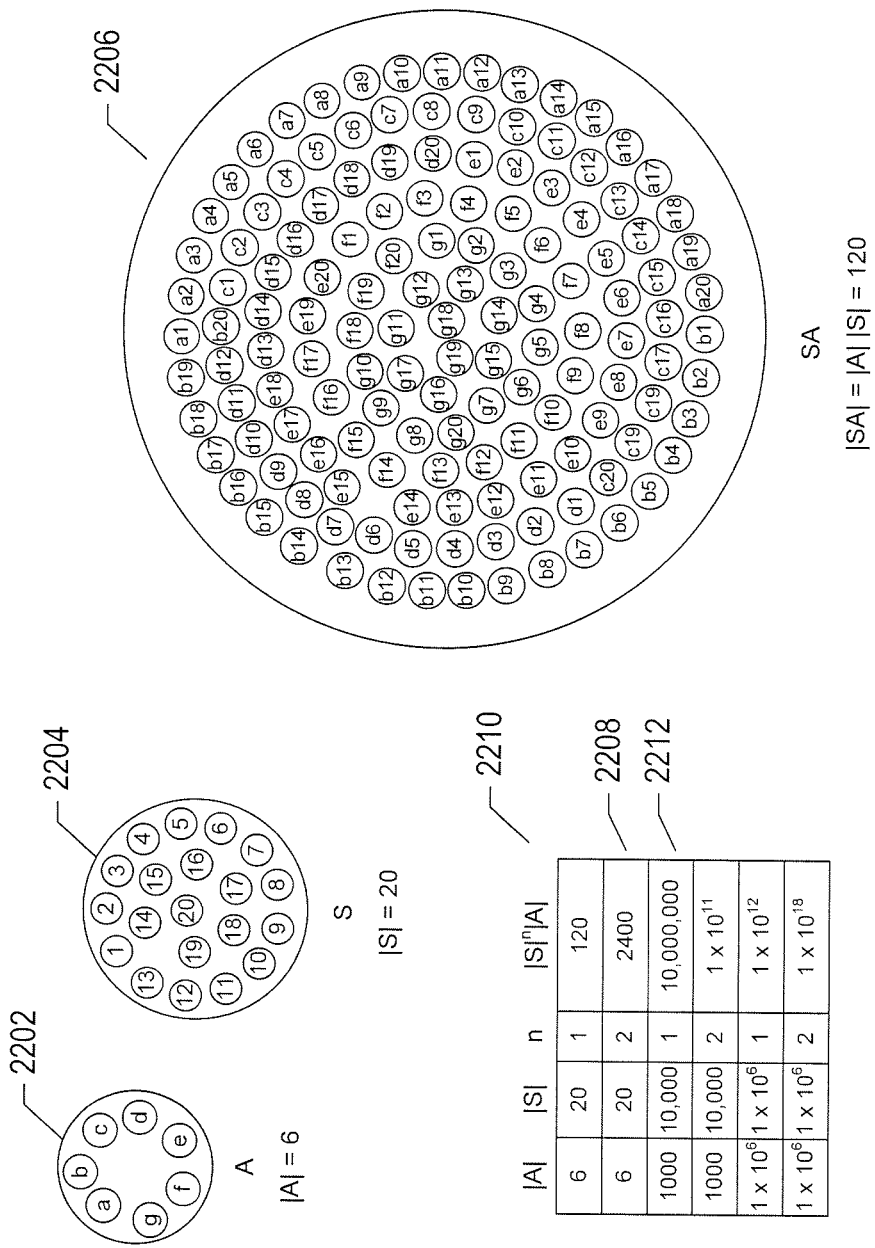
FIG. 22

FIG. 22 illustrates the potential sizes of the set of possible state/action pairs. Using similar illustration conventions as used in FIG. 21, FIG. 22 shows an illustration of a set of actions A 2202, with a cardinality of 6, and a set of states S 2204, with a cardinality of 20. In certain reinforcement-learning-based controller implementations, the policy $\pi$ is based on an assumed Markov model. In a Markov-model based policy, the policy π selects a next action based on the current managed-environment state or, when the state is unknown to the reinforcement-learning-based controller, on the belief distribution b for the current managed-environment state, as discussed above. The set of possible state/action pairs SA 2206 can be thought of as the set of all possible current-state/next-action control decisions that can be generated from the set of possible actions A and the set of possible states S. For a Markov-based reinforcement-learning-based controller, the number of possible state/action pairs is equal to the product of the cardinalities of the set of possible actions A and the set of possible states S. In the example shown in FIG. 22, the number of possible state/action pairs is 120, even though there are only 6 possible actions and 20 possible states. Other types of reinforcement-learning-based controllers may consider the current state and the preceding state in order to choose a next action. In this case, each possible action-selection decision can be considered to be a triple comprising an action and two states. In this case, the number of possible control decisions is equal to the product of the cardinality of the set of possible actions A and the square of the cardinality of the set of possible states S. In yet other types of reinforcement-learning-based controllers, the n most recent states, including the current state, of the managed environment are considered when making an action-selection decision. The most general expression for the number of possible control decisions is: $|S|^n|A|$. In the case that n equals 2, there are 2400 possible control decisions for the example shown in FIG. 22, as indicated in the second row 2208 of the table 2210 shown in FIG. 22. Of course, in real-world problem domains, there may be very large numbers of different possible actions and states. As shown in the third row 2212 of the table 2210, when there are 1000 possible actions and 10,000 possible states, a controller using a Markov policy, where n is equal to 1, includes 10,000,000 different possible control decisions. It would take on the order of many months of testing time for a controller, given these figures, to sample each possible control decision. For a controller using a policy based on a model for which n is equal to 2, with 1000 possible actions and 10,000 possible states, there are $10^{11}$ different possible control decisions, which would take many thousands of years for controller to sample once each. Thus, in practical, real-world situations, the number of possible control decisions, which represents the state space that a reinforcement-learning-based control system needs to explore in order to find an optimal policy, can be enormous.

Figure 23A:
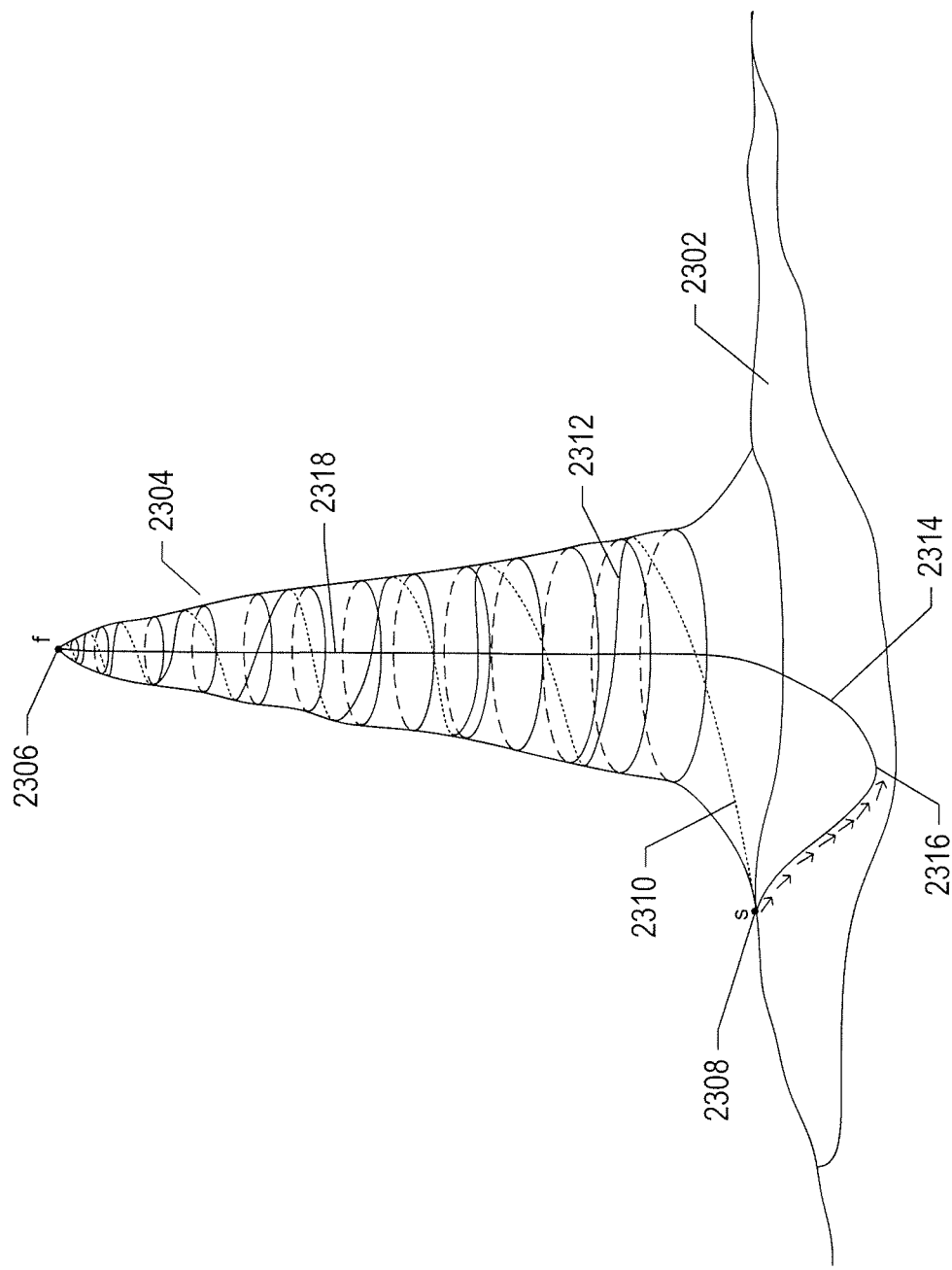
FIGS. 23A-B illustrate the need for state/action exploration by a reinforcement-learning-based controller.
Figure 23B:
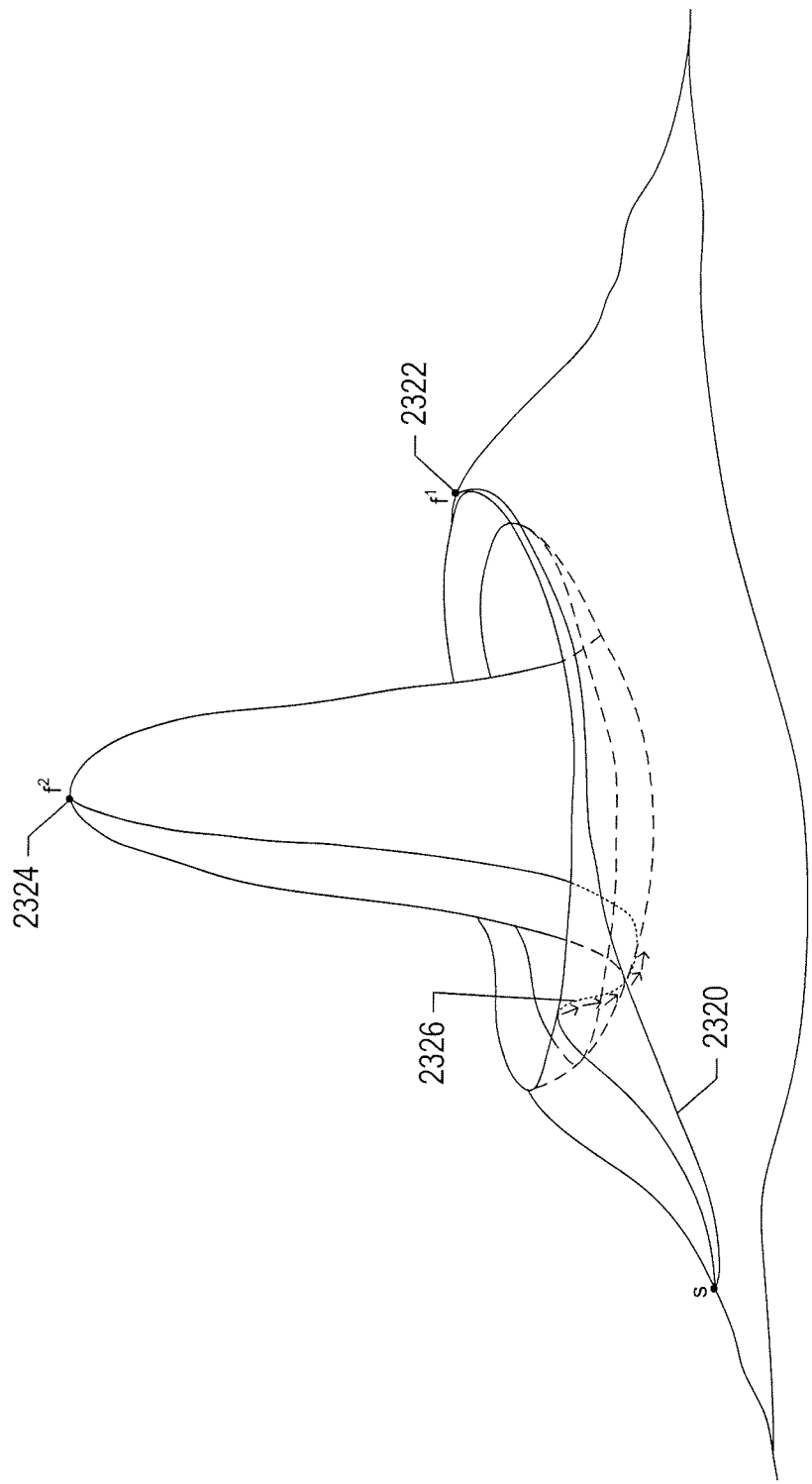

FIGS. 23A-B illustrate the need for state/action exploration by a reinforcement-learning-based controller. FIGS. 23A-B both use the same illustration conventions, next described with reference to FIG. 23A. A portion of a surface 2302 that represents the value or expected reward for state/action pairs includes a rather prominent peak 2304. The point at the summit of the surface 2306 represents a state/action pair that generates the greatest expected reward or value. In static environments, a reinforcement-learning-based controller, over time, seeks to obtain the maximum possible value by reaching point 2306, starting from an initial point 2308. Two different trajectories are shown in FIG. 23A. In non-static environments, the controller seeks to obtain a maximum discounted reward over the most recent window in time. A first trajectory 2310 gradually ascends the peak, initially ascending the back side of the peak, wrapping around to the front side of the peak 2312, and slowly spiraling upward, continuously reaching higher-valued state/action pairs until reaching point 2306. A second trajectory 2314 initially descends to a lower point on the surface 2316 and then directly and steeply ascends 2318 to point 2306. In this case, if the number of actions needed to be taken in order to reach the optimal control decision is a measure of the efficiency of the reinforcement-learning-based controller, the second trajectory 2314 is by far most efficient. However, the second trajectory involves initially carrying out locally suboptimal actions of decreasing value. Of course, this is a somewhat artificial example and illustration, since trajectories would not generally map to quasi-continuous curves and would normally not continuously increase in value, but is intended to show that, unless the reinforcement-learning-based controller carries out a certain amount of state/action space exploration, the reinforcement-learning-based controller cannot discover optimal policies π*. In other words, were the reinforcement-learning-based controller to always select the currently most valuable action, and thus follow a greedy policy, the reinforcement-learning-based controller would generally fail to find the most efficient trajectories. As shown in FIG. 23B, in a different example, a greedy policy may allow a reinforcement-learning-based controller to find a trajectory 2320 that results in discovery of a locally optimal state/action pair 2322, but would not allow the reinforcement-learning-based controller to find the global optimal 2324, since all trajectories leading to the global optimum involve a stretch of non-optimal action selections 2326.

Figure 24:
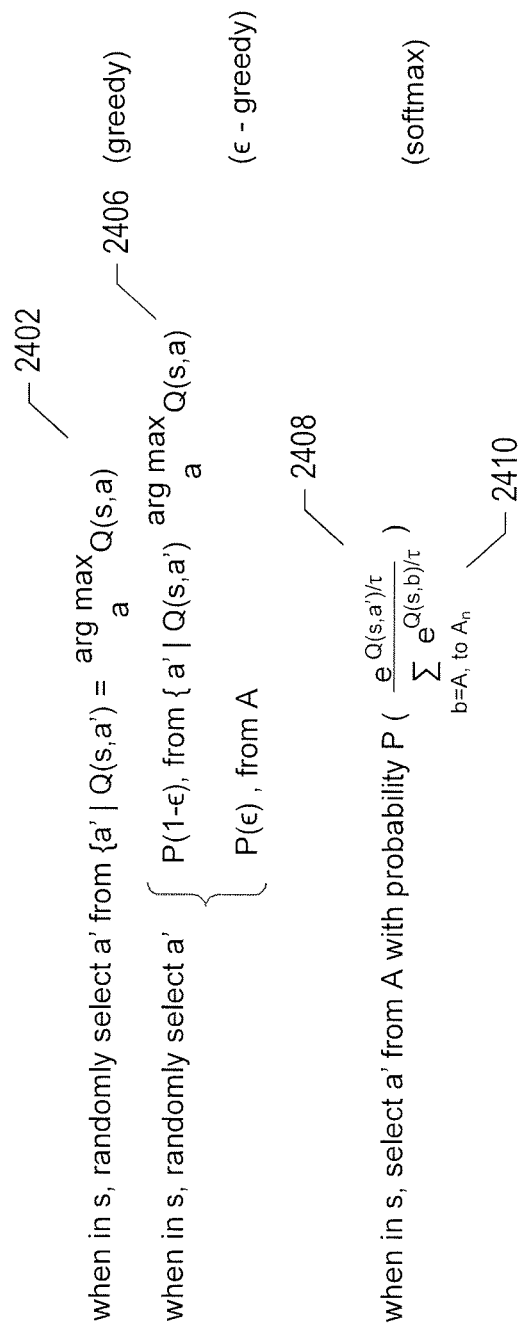
FIG. 24 provides expressions illustrating various types of policies.

FIG. 24 provides expressions illustrating various types of policies. As discussed above, an action-value function $Q^π$(s, a) (1722 in FIG. 17) returns a discounted return for a particular state and action, assuming a current policy π. A first expression 2402 represents the greedy policy. When the reinforcement-learning-based controller is in a state s, the greedy policy selects a next action a' for which the discounted expected return value is maximum among all possible actions a. As discussed above, the greedy policy generally does not allow a reinforcement-learning-based controller to efficiently find optimally efficient trajectories and optimal state/action pairs, and may not allow a reinforcement-learning-based controller to efficiently find optimally efficient trajectories regardless of the control/learning period during which the reinforcement-learning-based controller operates. The ϵ-greedy policy 2406 selects a next action a' according to the greedy policy with a probability of 1−ϵ and selects a next action randomly from A with a probability of ϵ. In general, ϵ as a relatively low value, such as 0.1 or 0.01, so that, most of the time, the ϵ-greedy policy selects a next action with the maximum discounted-return value. However, occasionally, the ϵ-greedy policy randomly selects a next action, so that, over time, the reinforcement-learning-based controller tries a wide variety of the many possible control decisions. By exploring the state/action space, the reinforcement-learning-based controller gradually learns to assign accurate discounted expected-return values to the various different state/action pairs so that the policy can be optimized. The SoftMax policy 2408 randomly selects a next action a' from A with the probability 2410, which corresponds to the Boltzmann distribution used in statistical mechanics. When the temperature factor τ has a low value, approaching 0, the probabilities of selection very dramatically with the estimated discounted return for the state/action, but when the temperature factor τ has a large value, the differences in the probabilities of selection diminish. Like the ϵ-greedy policy, the SoftMax policy favors selection of an action with the greatest estimated return value, but occasionally selects non-optimal actions in order to facilitate state/action space exploration.

Figure 25:
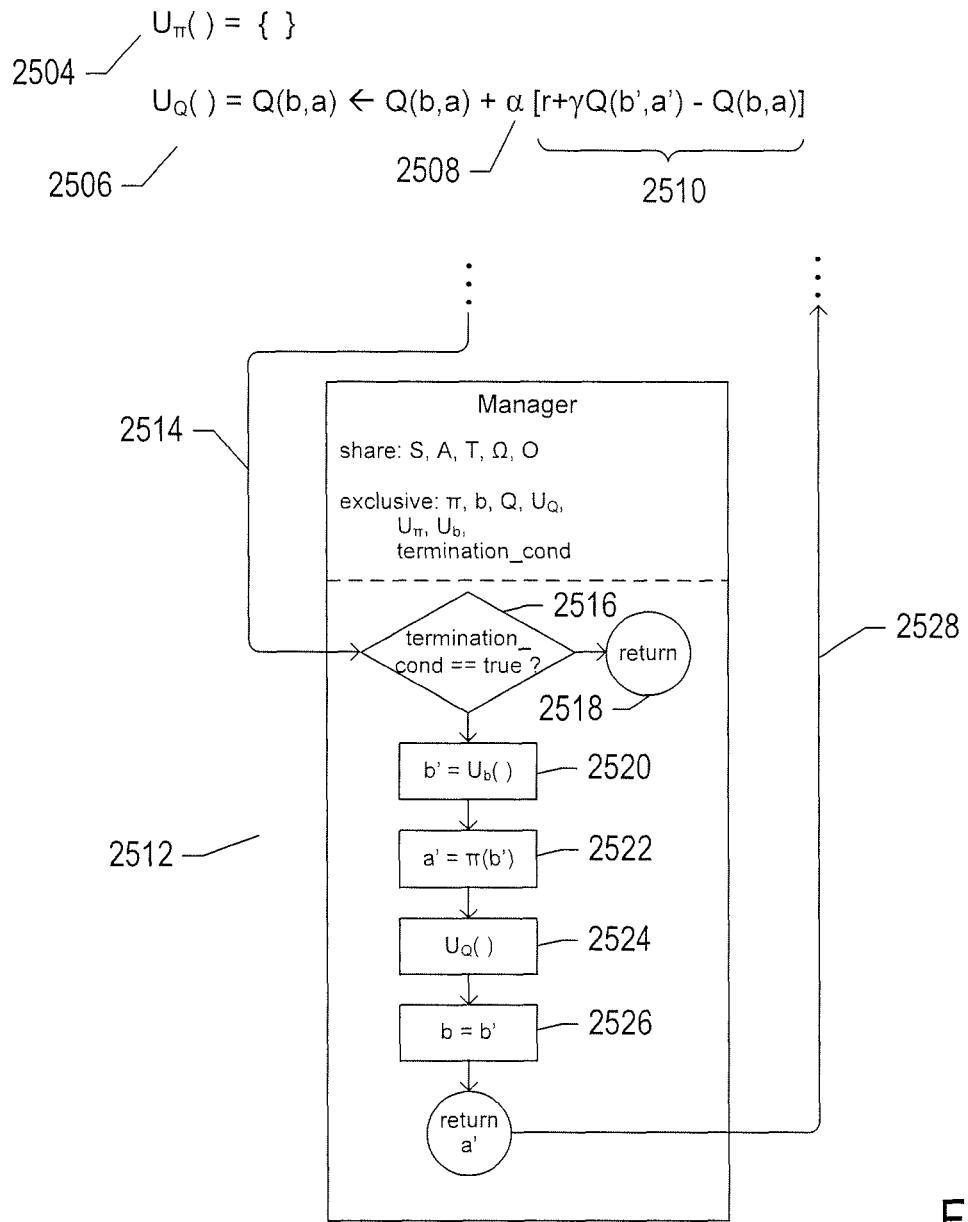
FIG. 25 illustrates one implementation of a reinforcement-learning-based application manager that employs state/action-space exploration via the above-discussed $\epsilon$-greedy policy.

FIG. 25 illustrates one implementation of a reinforcement-learning-based application manager that employs state/action-space exploration via the above-discussed ε-greedy policy. As indicated by expression 2502, the policy employed by this implementation, π(b), selects a next action a' with maximum estimated value with a probability of 1−ε and randomly selects the next action a' from A the probability of ε, and is therefore an ε-greedy policy. In this implementation, as indicated by expression 2504, there is no explicit policy-update function, unlike the case in the implementation illustrated in FIG. 18. Instead, a state/action-value update function $U_Q(\ )$ 2506 is employed. This function updates the state/action value Q(b,a) by adding to the state/action value Q(b,a) the product of a learning rate α 2508 and an estimate of the most recent return value 2510, where r is the reward received from executing action a, γ is the above-discussed discount rate, and b' and a' are the updated belief distribution and new selected action following execution of action a. Diagram 2512 illustrates the application manager logic that replaces the logic 1820 previously shown in FIG. 18. After execution of an action a, the universe returns the resulting reward r and observation vector o via path 2514. If the termination condition has occurred, as determined in step 2516, the application manager terminates, in step 2518. Otherwise, in step 2520, the application manager generates an updated belief distribution b' using the belief-distribution-update function that, in turn, considers the returned observation vector o returned by the managed environment, and, in step 2522, applies the policy (2502) to generate a next action a' using the updated belief distribution b'. Then, in step 2524, the application manager updates the discounted return value for the preceding action and belief distribution using the state/action-value update function 2506. In step 2526, the application manager stores the updated belief distribution as the current belief distribution and then returns the next action a' to the managed environment via path 2528.

As discussed above, for even modest numbers of possible actions and states, the state/action space can be enormous. In many real-world scenarios, there may be enormous numbers of possible actions and states, as a result of which the state/action space may be many tens of orders of magnitude larger than could possibly be practically exhaustively searched by exploration policies. Furthermore, there would be insufficient memory in even the largest distributed computing systems for maintaining current discounted values for each possible state/action pair. For these reasons, as indicated by expression 2530, the reinforcement-learning-based controller uses a parameterized function $Q_t(s,a)$ that returns, at any point in time t, an estimate of the value of the state/action pair s/a. The function $Q_t(s,a)$ is a function of n parameters contained in a parameter vector $\theta_t$. As indicated by expression 2532, the action-value update function $U_Q(\ )$ updates the parameter values via a gradient-descent method rather than updating a stored action value Q(b,a). Thus, at time t+1, the previous parameter vector $\theta_t$ is updated to parameter vector $\theta_{t+1}$.

Currently Disclosed Administrator-Monitored Reinforcement-Learning-Based Application Manager As discussed above, reinforcement-learning-based systems continuously explore the state/action space in order to improve the policy used to select actions. State/action space exploration is thus a vital component of reinforcement-learning-based systems. However, while in many applications of reinforcement learning, state/action space exploration does not represent a significant risk or downside to management of an environment, state/action space exploration carried out by reinforcement-learning-based application managers and other types of system managers and controllers is associated with significant and even prohibitive risks.

Figure 26:
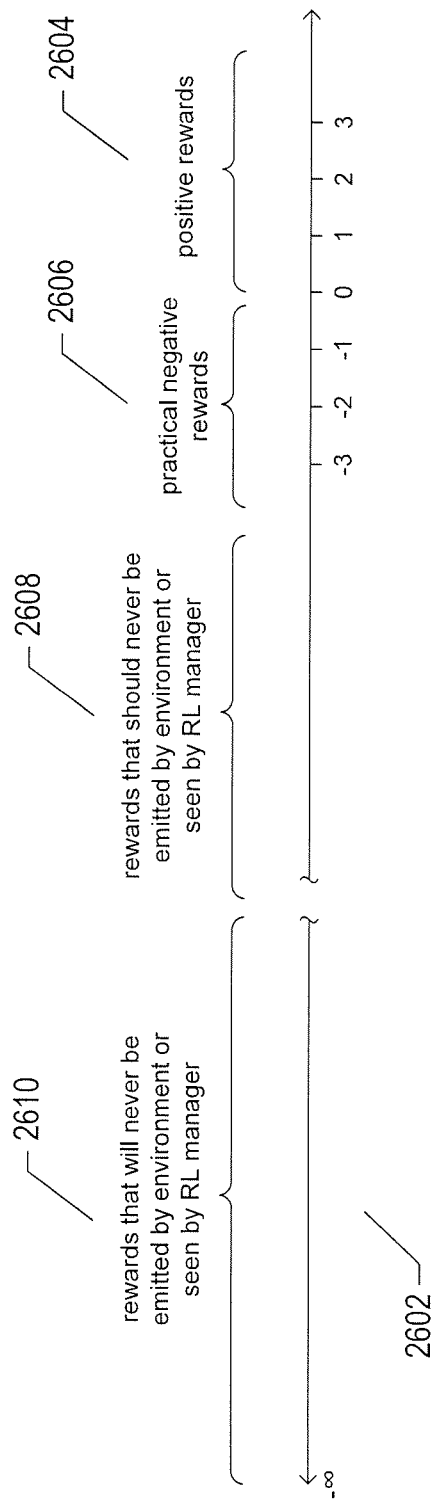
FIG. 26 illustrates the level of risk inherent in distributed-application management by reinforcement-learning-based application managers.

FIG. 26 illustrates the level of risk inherent in distributed-application management by reinforcement-learning-based application managers. In FIG. 26, a horizontal axis 2602 represents the range of reward values that can be returned by the environment to the reinforcement-learning-based application manager. In many implementations, there is a relatively small range 2604 of positive and neutral rewards. As one example, in many applications of reinforcement learning, only a single positive reward with value 1 and a neutral reward with value 0 are needed to steer the reinforcement-learning system to an optimal or near-optimal policy. There is also generally a relatively small range of practical negative rewards 2606. For example, actions taken by a reinforcement-learning-based application manager that decrease the computational efficiency of a distributed application may produce negative rewards in order to facilitate modification of the policy for action selection maintained by the reinforcement-learning-based application manager, and only a relatively small range of practical negative rewards are necessary for this purpose. However, in the case of distributed-application management, there may be an implicit additional range of negative rewards 2608 that should never need to be emitted by the environment, since they correspond to deleterious actions with sufficiently detrimental consequences that a practical and useful distributed-application-management system should avoid ever issuing such actions. An example of such a detrimental action would be for the application-management system to delete all copies of important data needed for correct subsequent function of the managed distributed application. There is an additional theoretical range 2610 of negative rewards that will never actually be encountered, since the environment will have been so severely compromised by executing the actions that would result in return of such negative rewards that one or both of the environment and the distributed-application-management system will not remain sufficiently functional to issue and/or process such rewards. An example of such actions might be an action that results in an unrecoverable corruption of critical data as well as disabling of the distributed application and the application-management system. Thus, while it is important for a reinforcement-learning-based application manager to continuously carry out state/action space exploration, it is also important that this exploration be sufficiently constrained to avoid control trajectories that cannot be properly forestalled by reward feedback from the managed environment.

Figure 27A:
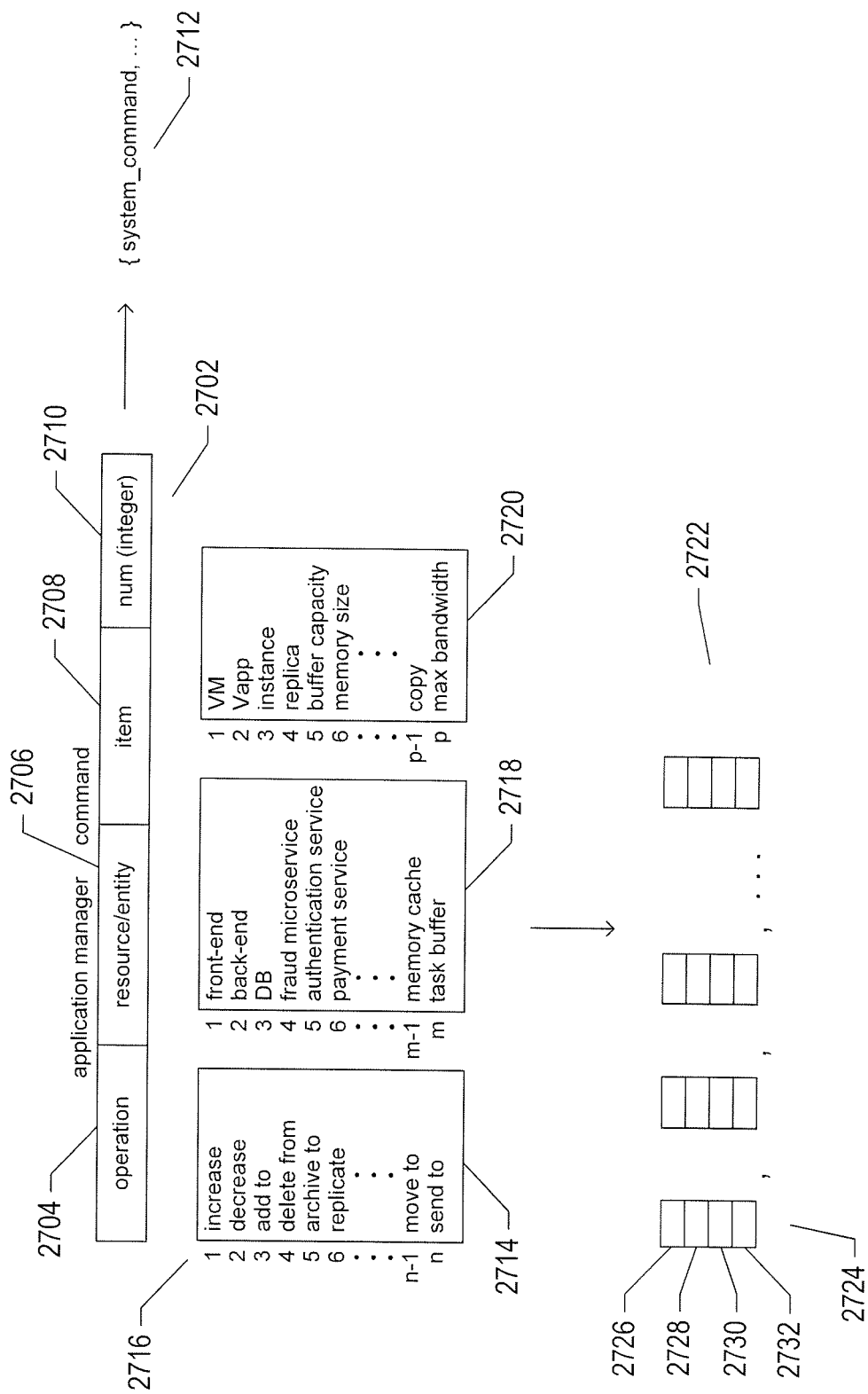
FIGS. 27A-B illustrate one view of the actions selected and issued by a reinforcement-learning-based application manager.
Figure 27B:
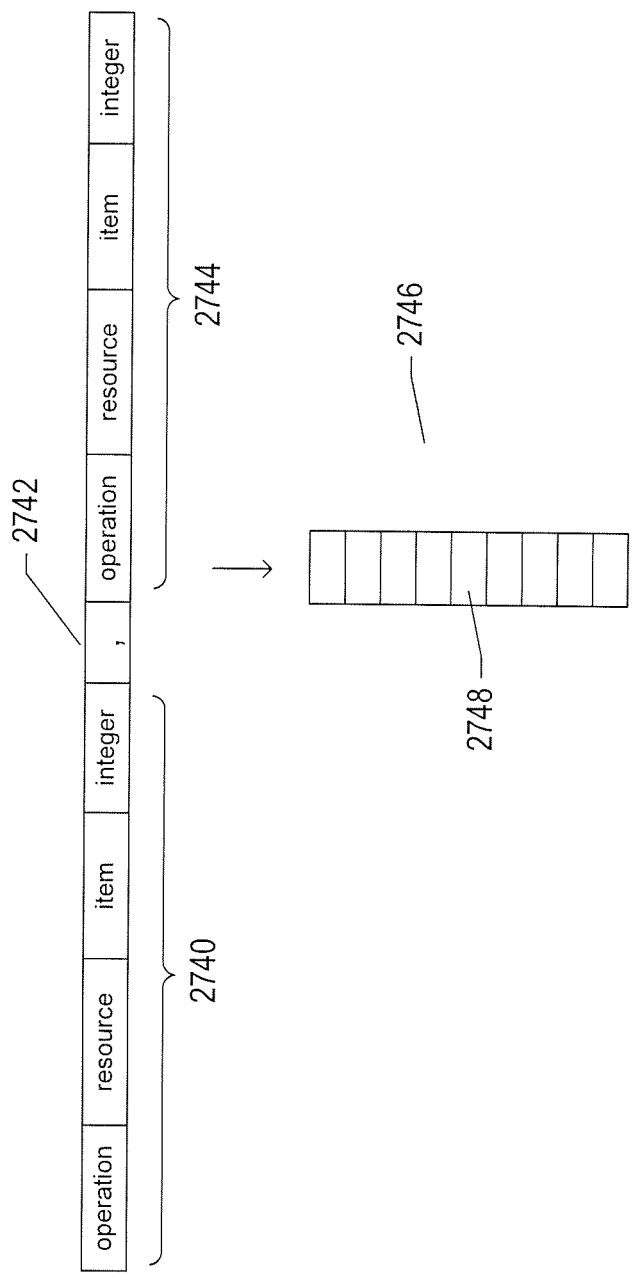

FIGS. 27A-B illustrate one view of the actions selected and issued by a reinforcement-learning-based application manager. In this view, application-manager commands, which correspond to the actions in the set of available actions A, may be encoded 2702 according to one or a small number of basic patterns. In the example shown in FIG. 27A, the application-manager commands include a first field 2704 that indicates the operation, or opcode, a second field 2706 that indicates the computational resource or entity to which the operation is applied, a third field 2708 that indicates a subset or component of the computational resource or entity to which the command is applied, and a fourth field 2710 that contains a numerical argument. Encoded management commands are transformed into a set of system commands and other types of commands 2712 by the distributed application and/or by other computational entities to which the reinforcement-learning-based application manager issues commands. Various of the different possible types of operations are shown in box 2714. The operations may increase or decrease the numbers or capacities of a computational resource or entity, move an entity from one place to another, copy the contents of one entity to another, and carry out other such operations. As indicated by the column of indices 2716, there are, in the example shown, n different operations. Various of the different types of computational resources and entities to which operations can be directed shown in box 2718. There are m different types of computational resources and entities. Various different types of items or components of computational resources and entities are shown in box 2720. There are p different types of items or components. Finally, as shown by the series of vectors 2722 of the bottom of FIG. 27A, each different command can be viewed as a vector with four integer elements, such as vector 2724. The first element 2726 includes an integer in the range [1, n] corresponding to the opcode. The second element 2728 includes an integer in the range [1, m] indicating a particular computational resource or entity. The third element 2730 is an integer in the range [1, p] indicating the component or subcomponent of the computational resource or entity indicated by the second element. Finally, the fourth element 2732 is an integer argument. As shown in FIG. 27B, an application-manager command may include a first four-field-encoded command 2740 followed by conjunctive punctuation 2742 and then a second four-field-encoded command 2744. This application-manager command can be encoded as a nine-element vector 2746 as discussed above with reference to FIG. 27A, with the fifth element 2748 encoding the conjunctive punctuation symbol 2742. There may be many different types and patterns of application-manager-command encodings but, in general, it is possible to view application-manager commands as vectors of integers and floating-point values. In the current discussion, for simplicity of description and illustration, it is assumed that application-manager commands are encoded as vectors of integers. However, in general, floating-point values are most commonly used in real-world implementations. Moreover, a given action issued by issued by a reinforcement-learning-based application manager may affect multiple subcomponents and/or multiple components of the managed system, and such actions may be encoded with explicit indications of the affected components or subcomponents, in certain cases, or, in other cases, the affected components may be implicit or may be determined dynamically, as the action is carried out, based, in part, on stored parameters and data and/or on computations launched during execution of the action.

Figure 28:
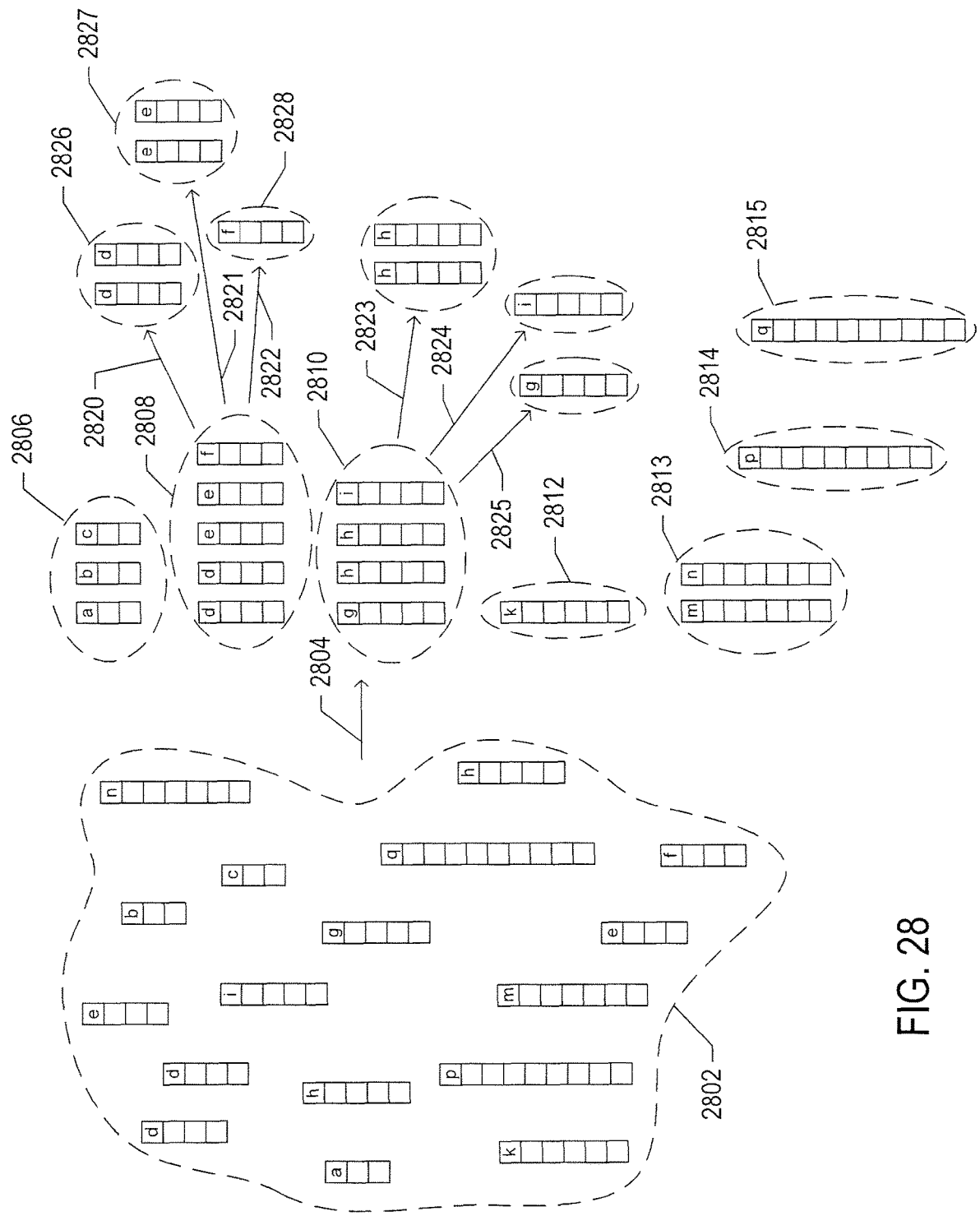
FIG. 28 illustrates partitioning of application-manager commands, represented as vectors of integers, into application-manager-command subsets with smaller cardinalities than the cardinality of the set of all application-manager commands.

FIG. 28 illustrates partitioning of application-manager commands, represented as vectors of integers, into application-manager-command subsets with smaller cardinalities than the cardinality of the set of all application-manager commands. The left-hand set 2802 includes a variety of different types of application-manager commands represented by integer vectors of various different lengths. A lower-case letter is shown in the first element of each of these vectors to indicate the opcode. This set can be thought of the set of all possible management commands, although, of course, in real-world implementations, this set might have hundreds, thousands, tens of thousands, or more different commands.

It may be desirable, for various reasons, to partition the full set of application-manager commands into smaller subsets. In one approach, a first partitioning can be obtained by grouping all application-manager commands represented by integer vectors of a particular length into a subset associated with that length. The first partitioning of the set of application-manager commands 2802, represented by arrow 2804, produces a subset 2806 of application-manager commands represented by three-element vectors, a subset 2808 of application manager commands represented by four-element vectors, a subset 2810 of application-manager commands represented by five-element vectors, and additional subsets 2812-2815 of application-manager commands represented by vectors of lengths 6, 7, 9, and 10, respectively. These initial subsets can be further partitioned based on the opcodes in the first element of the vector representations, as indicated by arrows 2820-2825. For example, the set of four-element-vector application-manager commands 2808 can be partitioned into three subsets 2826-2828 that includes commands corresponding to operations "d," "e," and "f," respectively. The subsets may be further partitioned based on the values of other of the elements in the vectors. In the implementations discussed below, the length-based and opcode-based partitioning discussed with reference to FIG. 28 are used to facilitate collecting acceptance and rejection statistics for management commands, or actions, proposed by the administrator-monitored reinforcement-learning-based application manager.

There are many possible approaches to attempting to constrain a reinforcement-learning-based application manager to select only actions that, when executed, result in corresponding rewards within the practical reward-value ranges 2604 and 2606 discussed above with reference to FIG. 26. Application-manager-command encodings may inherently constrain application managers by the fact that only a well-defined set of possible application-manager commands, or actions, can be issued by an application manager, and these commands are presumably constructed to avoid allowing application manager to output other potentially fatal or destructive commands that could be produced by combinations of various types of operating-system, virtualization-layer, and other types of commands. However, there still may be many different possible specific application-manager commands that can be formulated based on the types of encodings discussed above with reference to FIGS. 27A-B and that would be destructive or fatal if executed by the environment. For example, a reinforcement-learning-based application manager may be allowed to delete files generated by the distributed application, but were the reinforcement-learning-based application manager allowed to delete all copies of certain critical files, the distributed application would fail to continue to correctly operate. As another example, a reinforcement-learning-based application manager may be allowed to acquire and to configure additional virtual machines in a cloud-computing environment for a distributed application, but were the reinforcement-learning-based application manager, due to the ∈-greedy method discussed above, to randomly try to acquire and configure 10,000 virtual machines in one issued action, the distributed application may grind to a halt as the 10,000 new virtual machines are attempted to be configured and launched, and the overhead expenses for the distributed application would skyrocket. Certain constraints can be rationally devised by limiting the values of numeric parameters to reasonable ranges and by excepting certain types of computational resources and entities from application of application-management commands, but these types of approaches cannot be used to guarantee that a reinforcement-learning-based application manager is safe from randomly selecting deleterious or fatal commands during state/action space exploration.

Figure 29:
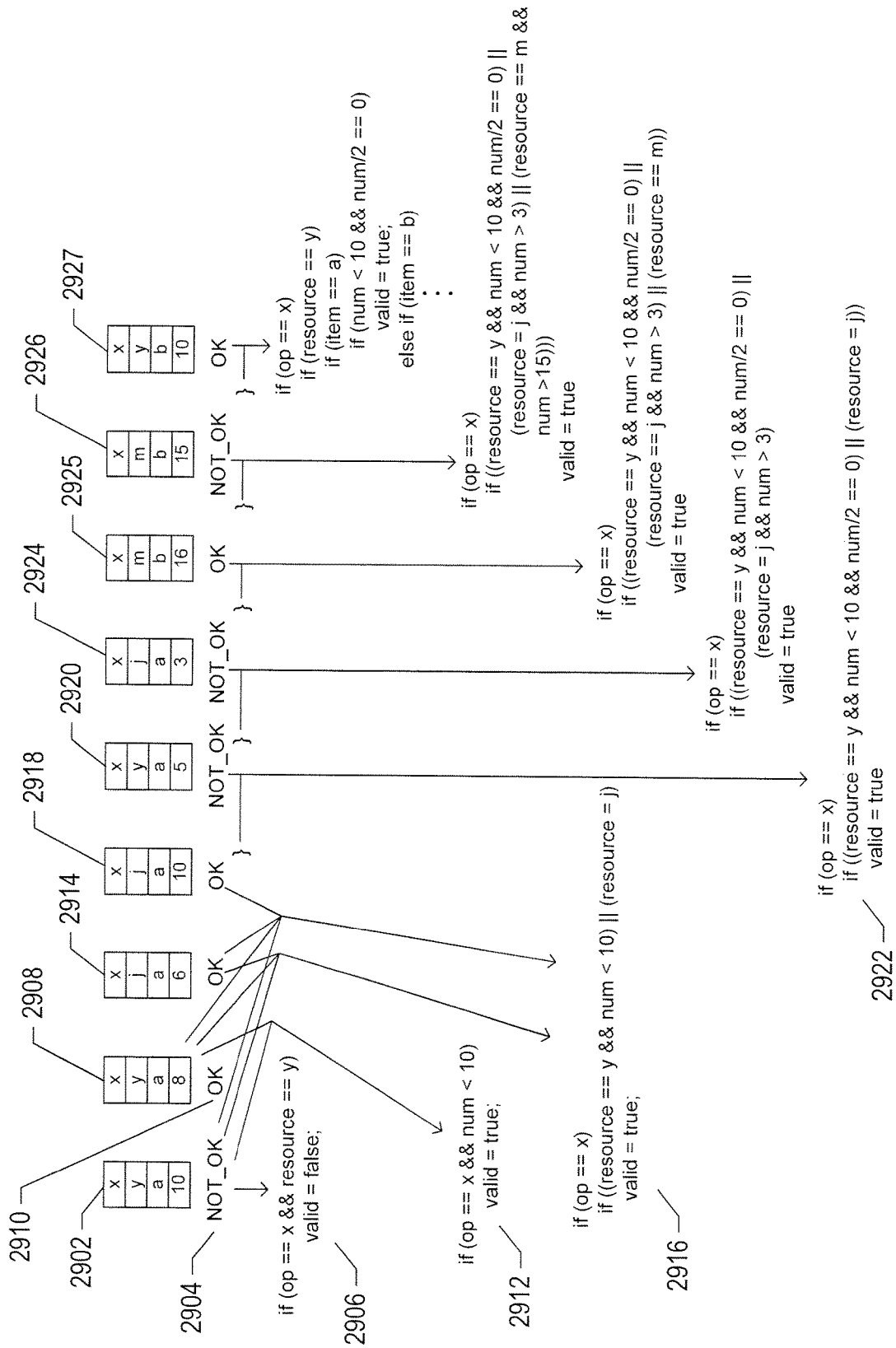
FIG. 29 illustrates why rule-based constraints on action selection by a reinforcement-learning-based application manager are not practical solutions to the problems associated with random selection of actions for state/action space exploration.

FIG. 29 illustrates why rule-based constraints on action selection by a reinforcement-learning-based application manager are not practical solutions to the problems associated with random selection of actions for state/action space exploration. FIG. 29 illustrates an approach where a series of 4-element application-manager commands are considered, with each different application-manager command in the series evaluated by a human administrator as being acceptable or not acceptable. A set of rules are attempted to be developed to encode the human administrator's knowledge of the acceptability and unacceptability of the various different application-manager commands. The set of rules are attempted to be developed based only on the acceptability indications provided for each command, as in the case of a machine-learning system that receives a set of commands and associated acceptability indications as a training data set. The first application-manager command 2902 is deemed unacceptable 2904 by the human administrator. There is insufficient data, at this point, to determine just why the command 2902 is unacceptable, but an initial rule 2906 is nonetheless formulated. The initial rule states that if the opcode is "x" and the resource=is "y," the command is invalid. This is, of course, just a guess, since the command may be invalid for many other reasons.

A second application-manager command 2908 is then evaluated. This command is deemed acceptable 2910. Therefore, it is clear that the first rule 2906 is invalid. A second rule 2912 is devised to be consistent with the two received data points. This rule states that if the opcode is "x" and the numerical argument has a value less than 10, the command is acceptable, or valid. A third command 2914 is then evaluated. This command is directed to the computational resource "j." Therefore, a new rule 2916 is developed to include this observation. When a fourth command 2918 is evaluated, it turns out that it, along with the 3 previously evaluated commands 2902, 2908, and 2914, is consistent with the third rule 2916. Thus, it appears that progress is being made. However, when a fifth command 2920 is evaluated, the set of evaluated commands is no longer consistent with the third rule, as a result of which a fourth rule 2922 is developed. This rule states that if the resource is "y," the numerical argument has a value less than 10, and the numerical argument is even, or if the resource is "j," the command is valid. With evaluation of each successive command 2924-2927, the rules become increasingly complex in order to be consistent with the observed data. Ultimately, the computational task of devising a rule that is consistent for all the observed data becomes increasingly difficult, if not impossible, and the rules become so complex, that computational overheads for evaluation of an application-manager command with respect to the rules becomes onerous or impractical. Worse, it may be the case that a particular command may be deemed acceptable in certain contexts and unacceptable in others, at which point the rules need to expand to consider the different contexts. The fundamental problem is that the many different criteria by which a human administrator evaluates commands for acceptability or unacceptability are practically impossible to encode as a set of logic rules.

Figure 30:
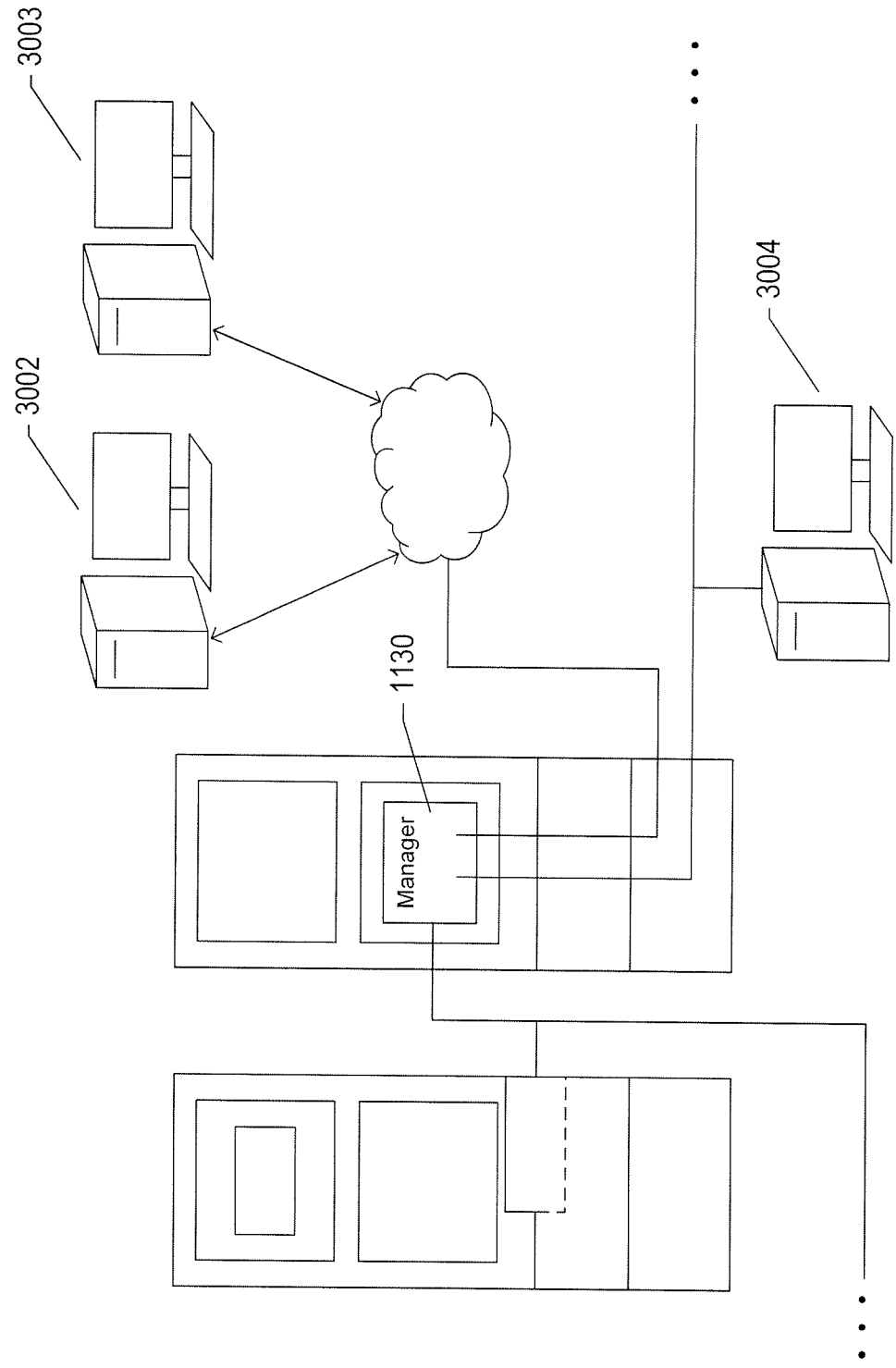
FIG. 30 illustrates an implementation basis for the administrator-monitored reinforcement-learning-based application manager to which the current document and claims are directed.

FIG. 30 illustrates an implementation basis for the administrator-monitored reinforcement-learning-based application manager to which the current document and claims are directed. FIG. 30 extends the distributed-application management system discussed above with reference to FIG. 11C. In addition to communicating with the various different application-management agents, the application manager 1130 also communicates with one or more administrator and/or user computers and other processor-controlled administrator and/or user devices 3002-3004. This allows the application manager to communicate through a graphical-user interfaces, text interfaces, and other electronic interfaces with human administrators, managers, and other types of users, all of which are referred to as "administrators" in the context of the currently disclosed administrator-monitored reinforcement-learning-based application manager.

Figure 31:
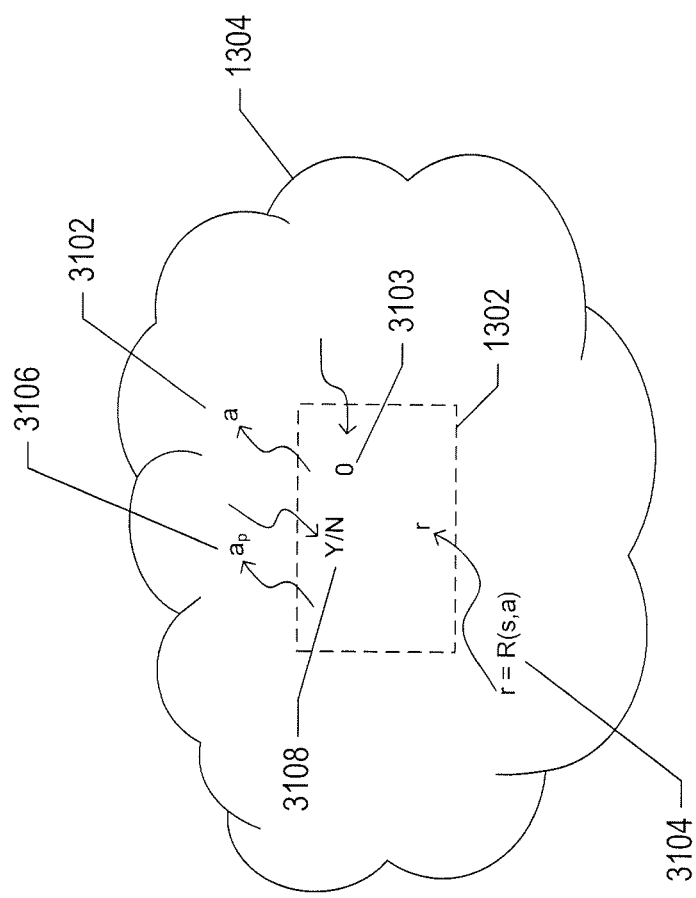
FIG. 31 illustrates, using illustration conventions used previously in FIG. 13, a fundamental enhancement of the above-described reinforcement-learning-based application manager that provides for administrator monitoring of reinforcement-learning-based application-manager control over one or more distributed applications.

FIG. 31 illustrates, using illustration conventions used previously in FIG. 13, a fundamental enhancement of the above-described reinforcement-learning-based application manager that provides for administrator monitoring of reinforcement-learning-based application-manager control over one or more distributed applications. As discussed above with reference to FIG. 13, the reinforcement-learning-based application manager 1302 issues actions, such as action 3102, to the environment 1304 and receives observations, such as observation 3103, and rewards, such as reward 3104, from the environment, where the reward is a function of the current state and the most recently executed action. The reward may be a function of not only the current state and the most recently executed action, but may additionally depend on one or more hidden states, multiple past states, random noise, and other factors, depending on the implementation. A fundamental enhancement that allows for administrator monitoring is that the reinforcement-learning-based application manager 1302 can first propose an action $a_p$ 3106 through an administrator's processor-controlled device to a human administrator and receive, in response, an indication of whether or not the proposed action is acceptable 3108. When the proposed action is indicated to be acceptable by the human administrator or, in some cases, when the administrator fails to respond to the proposed action, the reinforcement-learning-based application manager issues the action to the environment for execution. Thus, the reinforcement-learning-based application manager's action selections can be monitored by a human administrator to ensure that state/action space exploration does not result in issuance of unacceptable actions to the managed environment. In certain cases, the reinforcement-learning-based application manager may be allowed to issue, without review, certain types of actions that pass automated acceptability filters. For example, in some implementations, the reinforcement-learning-based application manager may be allowed to issue commands that increase or decrease the allocated computational resources by one computational-resource unit, since the rewards returned by the environment are known to be sufficient to prevent destructive or fatal patterns of allocation and/or deallocation. In other implementations, each selected action is proposed to a human administrator for review. In still other implementations, human monitoring is needed for actions until a sufficient amount of acceptance and rejection data is available for the action, after which that data can be incorporated into the policy.

Figure 32A:
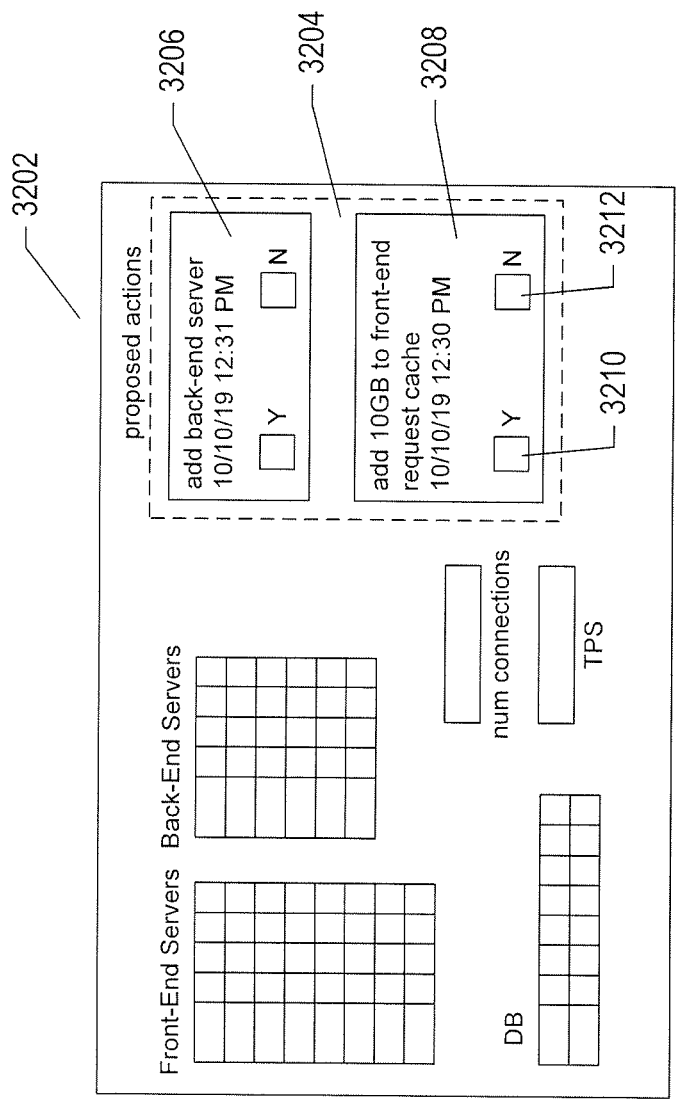
FIGS. 32A-B illustrate the types of action-proposal interfaces that may be employed by an administrator-monitored reinforcement-learning-based application manager to solicit human-administrator review of the proposed actions.
Figure 32B:
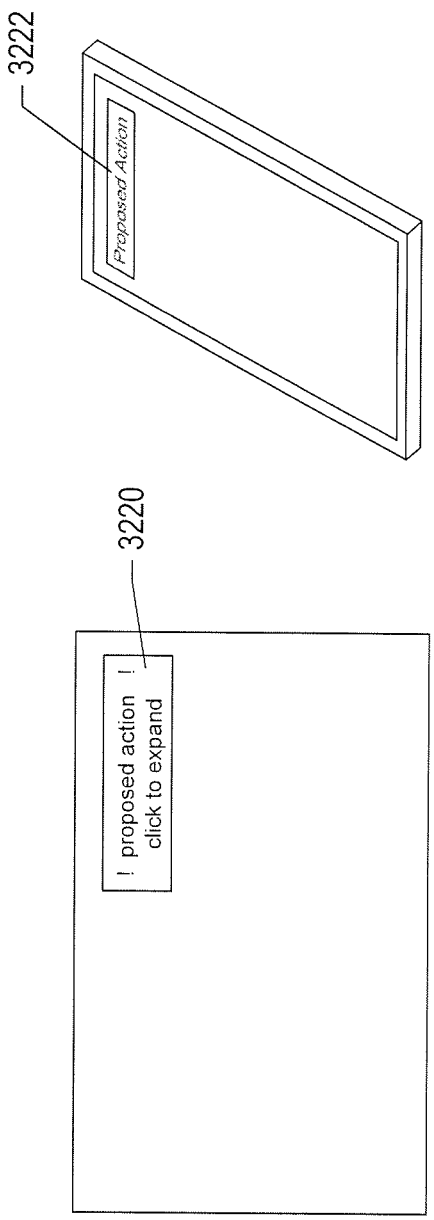

FIGS. 32A-B illustrate the types of action-proposal interfaces that may be employed by an administrator-monitored reinforcement-learning-based application manager to solicit human-administrator review of the proposed actions. FIG. 32A shows a dashboard graphical user interface 3202 that provides information about a distributed application, on a continuous basis, to allow a human administrator to monitor the distributed application and control of the distributed application by the reinforcement-learning-based application manager. This graphical user interface includes a section 3204 in which proposed actions are presented to the administrator, such as proposed actions 3206 and 3208 shown in FIG. 32A. The proposed actions include input features, such as input features 3210 and 3212, that allow the human administrator to either accept or decline the proposed action. The proposed actions are displayed for up to a maximum display time, after which they are removed and the proposed actions are considered to have not been responded to. As shown in FIG. 32B, proposed actions may be communicated to human administrators through clickable alerts, such as clickable alert 3220 presented on the screen of a laptop or tablet and clickable alert 3222 displayed on the screen of a smart phone. A human administrator may input a click or touch command to such features to expand alerts into information about proposed actions that the human in administrator may either accept or decline. Many other types of action-proposal interfaces are, of course, possible. When proposed actions are transmitted to multiple administrators and/or users, the first response may, in certain implementations, be accepted as the response by the administrator-monitored reinforcement-learning-based application manager. In alternative implementations, the administrator-monitored reinforcement-learning-based application manager may tabulate multiple responses as votes, selecting the majority response, a computed response based on weighted responses, or a default response, when there is no majority, as the response to the proposed action.

Figure 33:
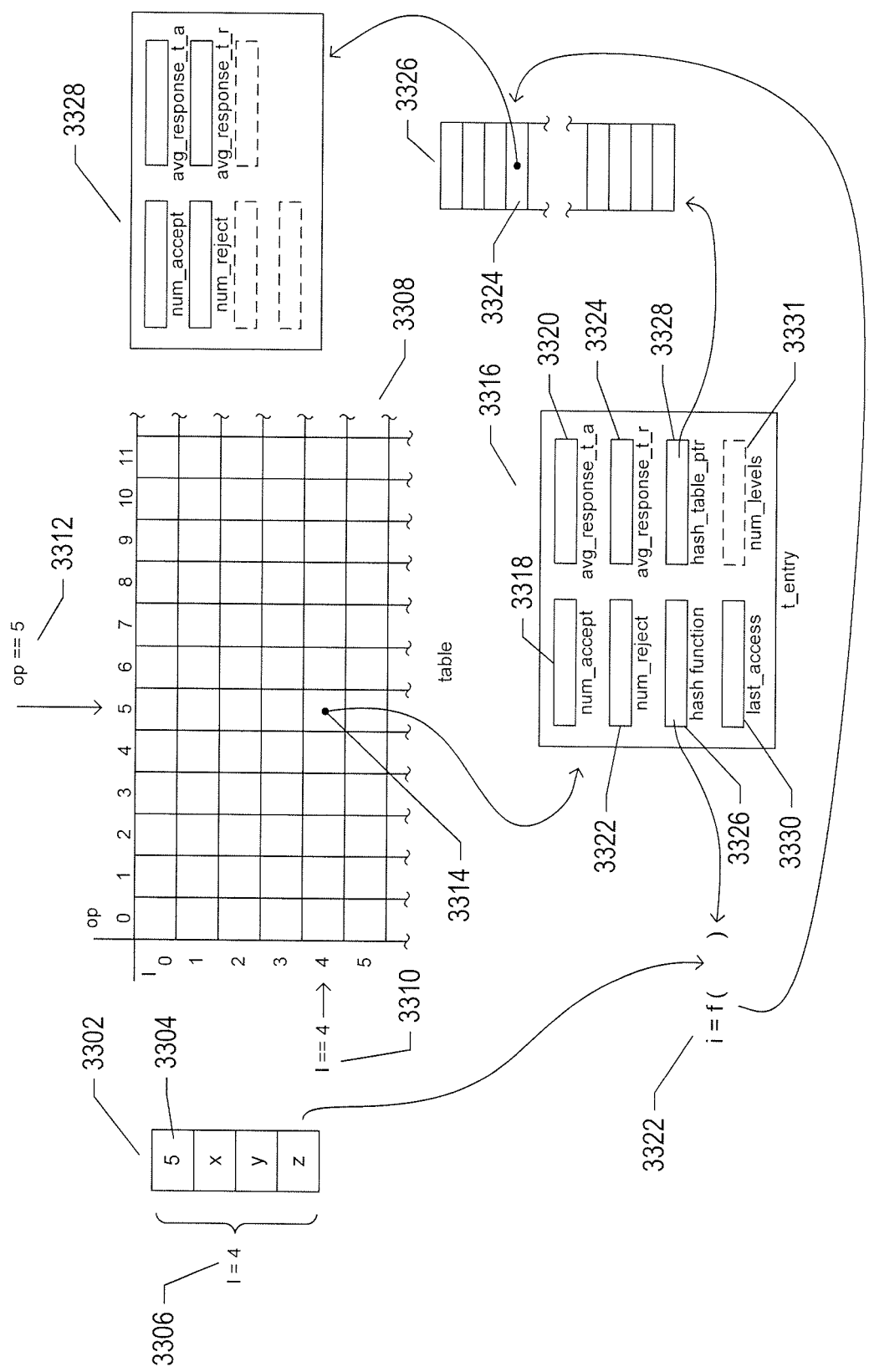
FIG. 33 illustrates data structures used in one implementation of the currently disclosed administrator-monitored reinforcement-learning-based application manager.

FIG. 33 illustrates data structures used in one implementation of the currently disclosed administrator-monitored reinforcement-learning-based application manager. These data structures are employed by the administrator-monitored reinforcement-learning-based application manager to keep track of the history of acceptances and rejections of commands by human administrators as well as average response times of human administrators with respect to particular proposed commands. A given application-management command, such as command 3302, is represented by a vector, as discussed above. Each command includes, as a first element 3304, an opcode and has a length l 3306. The opcode and length are used as indices into a command table 3308 to select a particular entry in the command table. In the example shown in FIG. 33, a length of 4 (3310) and an opcode with the value 5 (3312) are used as indices select an entry 3314 from a two-dimensional table command table. The entry includes a reference to a t_entry data structure 3316 or contains a null reference, when the command has not yet been proposed to an administrator. The t_entry data structure includes fields that store the number of acceptances 3318, the average response time prior to acceptance 3320, the number of projections 3322, the average response time prior to a rejection 3324, a hash function or reference to a hash function 3326, a pointer to a hash table 3328, and may include additional fields 3330-3331. The data stored in the t_entry data structure referenced from the command table, referred to as the "first t_entry data structure," pertains to all of the commands with opcode 5 and length 4. The hash function referenced by the pointer in field 3326 can be applied to the management command 3302 to generate an index i 3322 which can be used to access an entry 3324 within a hash table 3326 referenced by the hash-table pointer stored in field 3328 of t_entry 3316. The hash table entry 3324 contains a reference to a second t_entry data structure 3328. This data structure contains the acceptance and rejection information for the exact, particular command 3302. In more elaborate implementations, a series of t_entry data structures corresponding to finer and finer partitions of the set of commands corresponding to a particular length and opcode are employed, with the field 3331 containing an indication of the number of t_entry data structures in the series. However, in the current implementation, the acceptance and rejection data are collected for the management-command subsets containing all management commands with a particular opcode and having a particular length, such as subsets 2826-2828 in FIG. 28, discussed above, as well as for each individual distinct management command.

Figure 34:
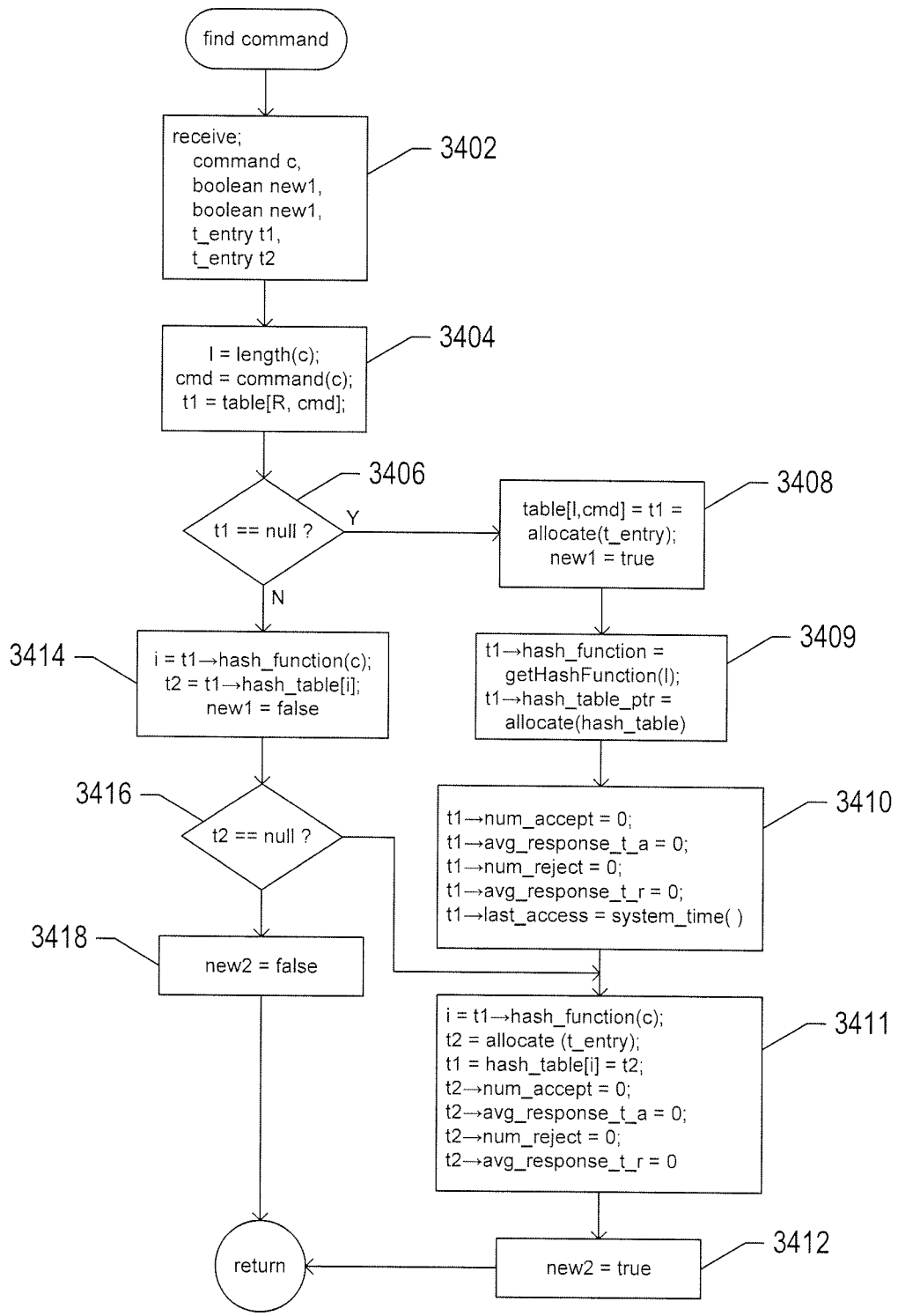
FIG. 34 provides a control-flow diagram for a routine "find command" that determines the two t_entry data structures for any particular management command.

FIG. 34 provides a control-flow diagram for a routine "find command" that determines the two t_entry data structures for any particular management command. In step 3402, the routine "find command" receives the command c, two Boolean variables new1 and new2, passed by reference, and two t_entry data-structure pointers t1 and t2, also passed by reference. In step 3404, the routine "find command" determines the length of the command, l, the opcode contained in the command, cmd, and sets the t_entry pointer t1 to point to the command-table entry indexed by the length and opcode. When t1 has a null value, as determined in step 3406, a command of length l and having opcode cmd has not been previously considered. Therefore, in steps 3408-3412, two new t_entry data structures are allocated an initialized, with a reference to the first of the two new t_entry data structures stored in the command table. The Boolean variables new1 and new2 are both set to true to indicate that the two t_entry data structures for the command contain no acceptance and rejection data. Otherwise, in step 3414, the routine "find command" generates an index for the received command using the hash function in the t_entry data structure pointed to by t_entry pointer t1, then sets the t_entry pointer t2 to point to the second t_entry data structure for the specific received command, and finally sets the Boolean variable new1 to false. When t2 has a null value, as determined in step 3416, a new second t_entry data structure is allocated and initialized and the Boolean variable new2 is set to true, in steps 3411-3412. Otherwise, in step 3418, the Boolean variable new2 is set to false. Thus, the routine "find command" finds the two t_entry data structures for an input management command and sets the 2 Boolean variables new1 and new2 to indicate whether or not these data structures contain acceptance and rejection information.

Figure 35A:
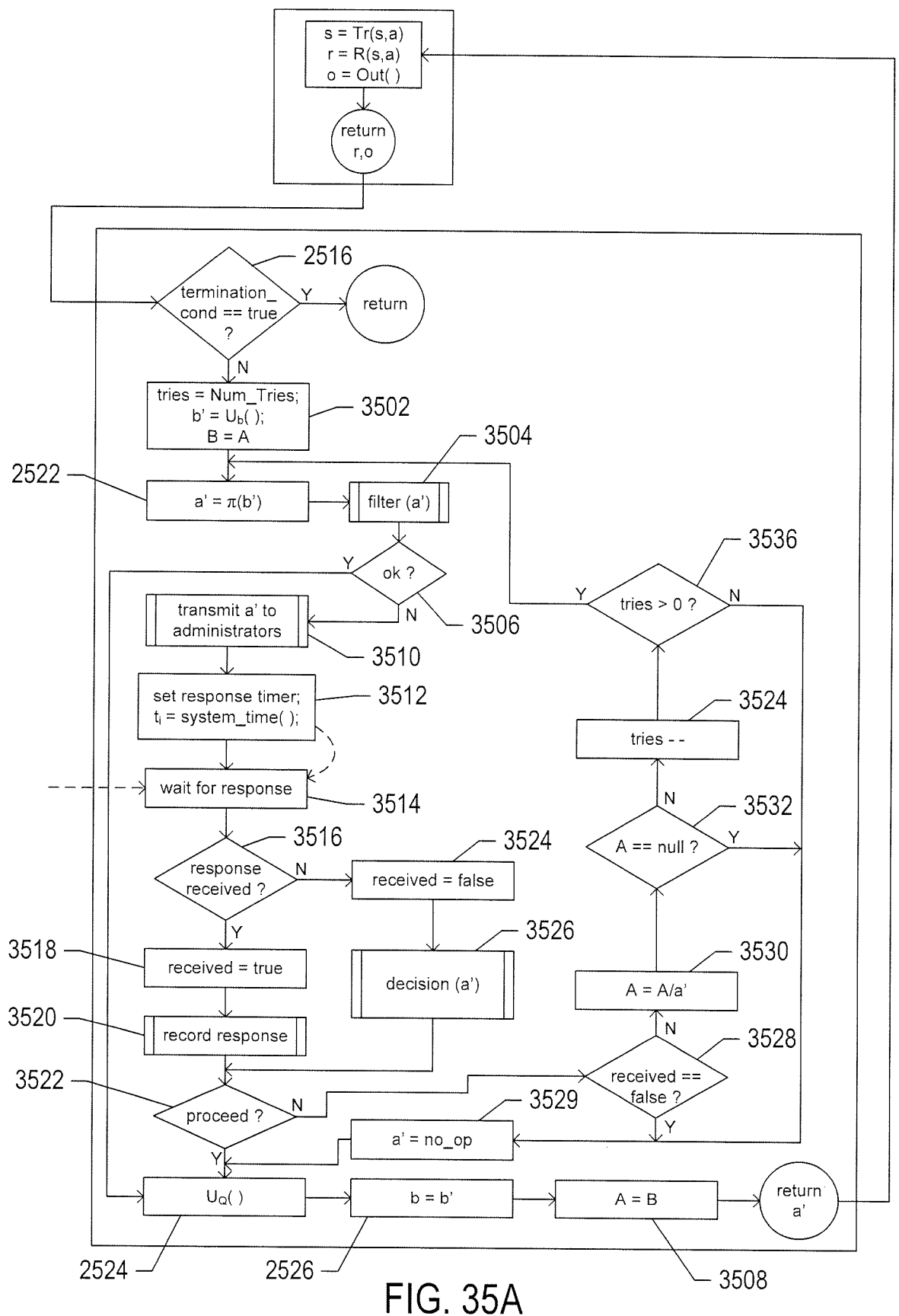
FIGS. 35A-C illustrate operation of the currently disclosed administrator-monitored reinforcement-learning-based application manager, using illustration conventions discussed above with reference to FIG. 25.
Figure 35B:
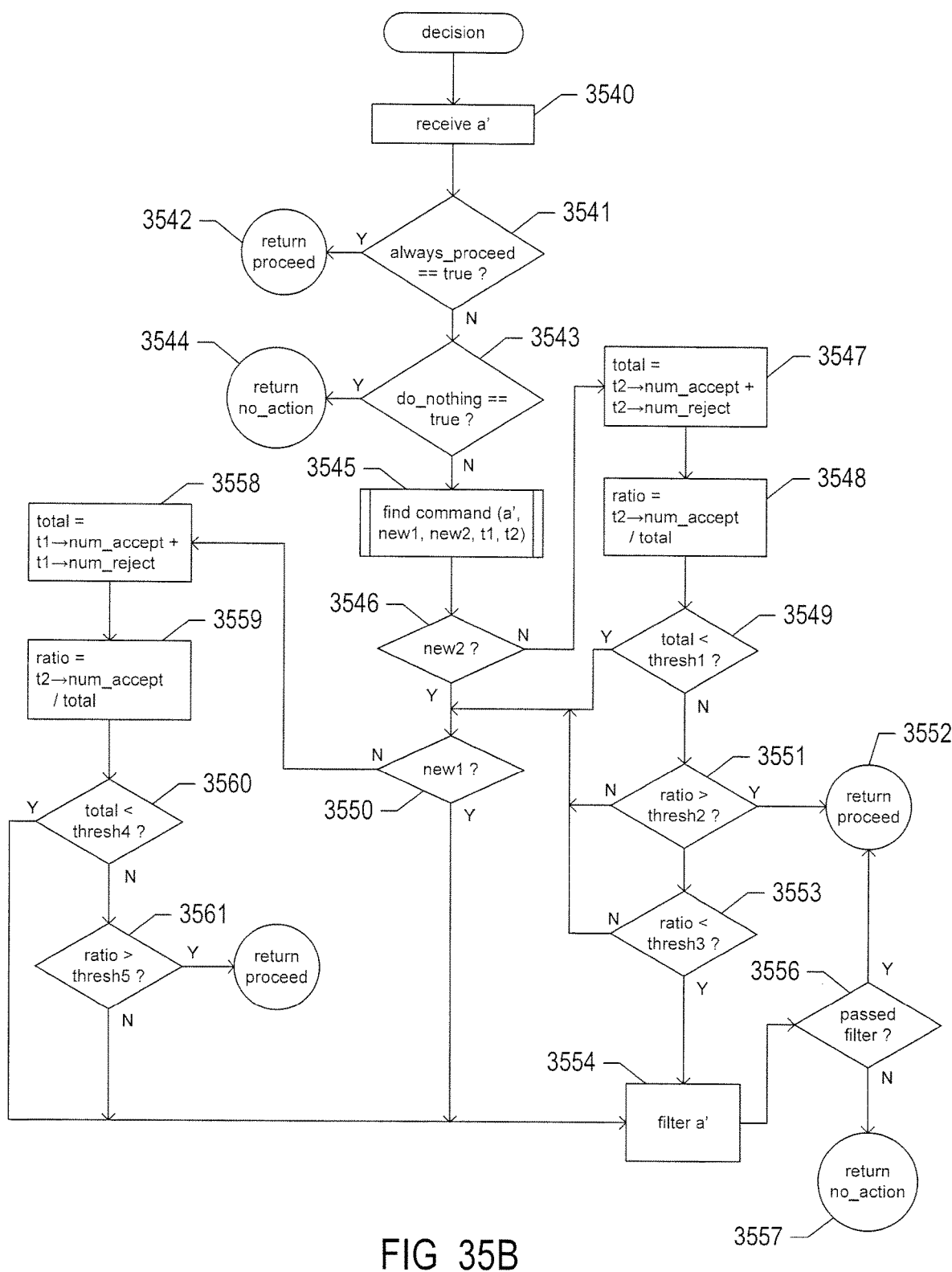
Figure 35C:
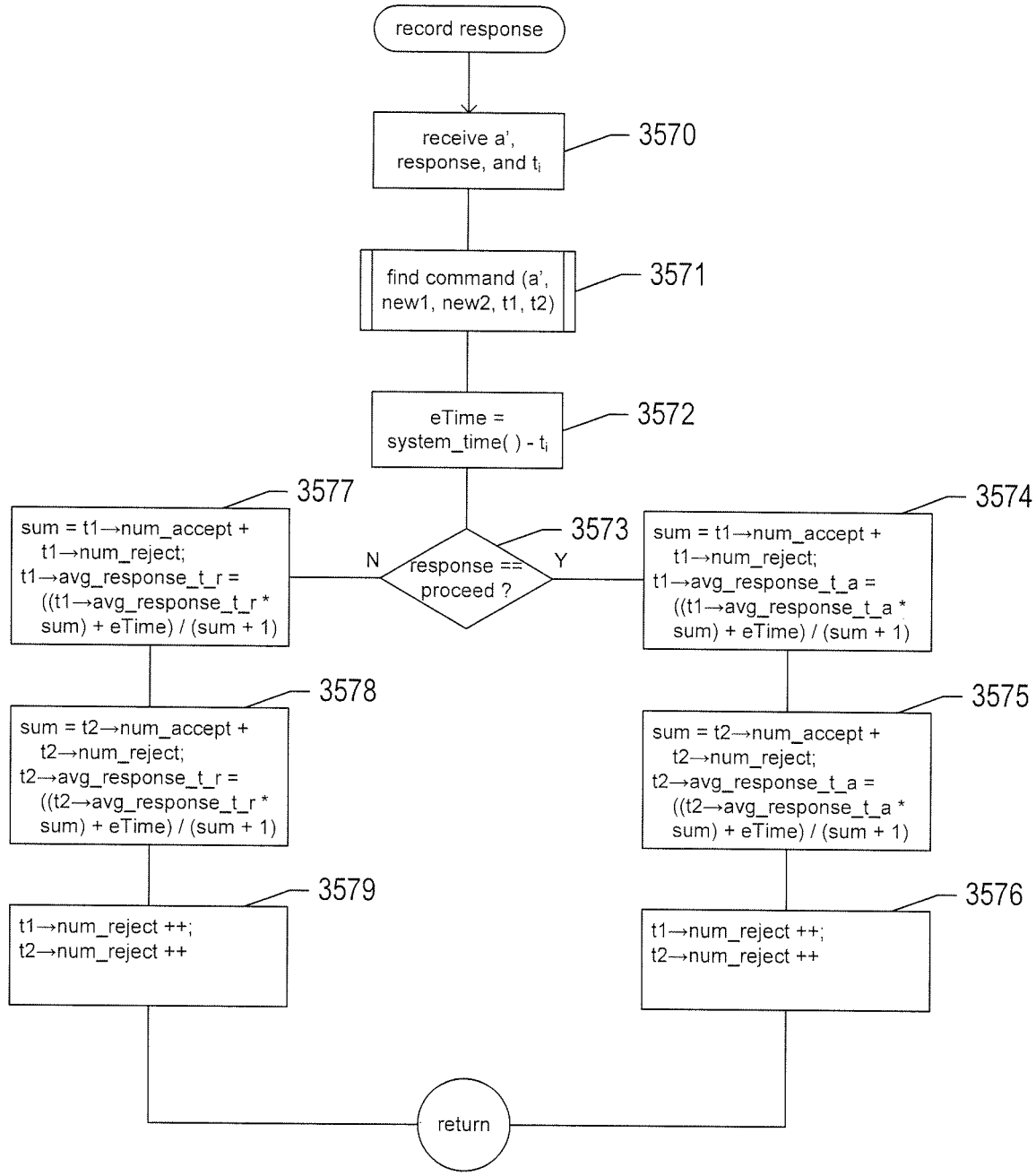

FIGS. 35A-C illustrate operation of the currently disclosed administrator-monitored reinforcement-learning-based application manager, using illustration conventions discussed above with reference to FIG. 25. Many of the steps and functional blocks shown in FIG. 35A are identical to steps and functional blocks shown in FIG. 25, and are not therefore redundantly described with reference to FIG. 35A. After evaluation of the termination condition by the administrator-monitored reinforcement-learning-based application manager, in step 2516, the administrator-monitored reinforcement-learning-based application manager sets a local variable tries to the number of attempts to make to issue a management command and sets the local set variable B to the same value as the set of actions A, in step 3502, along with generating a new belief distribution b', as in step 2520 of FIG. 25. After obtaining a new action a' from the policy, the administrator-monitored reinforcement-learning-based application manager, referred to below as "the manager," applies one or more logic filters to the new action in order to determine whether or not the new action should be proposed to a human administrator prior to issuance, in step 3504. The logic filters may apply a set of rules to the new action and return an indication of whether or not review by a human administrator is needed. As discussed above, certain implementations omit this step, and always propose actions. When a proposal is determined to not be needed, in step 3506, control flows to steps 2524 and 2526, following which step 3508 is executed to restore the set of actions A, prior to issuing action a' to the environment. However, when the new action needs to be proposed to a human illustrator, as determined in step 3506, the action is transmitted to one or more administrators in step 3510, as discussed above with reference to FIGS. 30-32B. In step 3512, a response timer is set and the system time is recorded. Then, in step 3514, the manager waits for a response to the proposal from a human administrator or for expiration of the response timer. When a response is received, as determined in step 3516, the local variable received is set to true, in step 3518 and the response is recorded, in step 3520. When the response indicates that the manager should proceed with issuing the action, as determined in step 3522, control flows to steps 2524, 2526, and 3508, discussed above. When a response is not received from the human administrator, as determined in step 3516, the local variable received is set to false, in step 3524 and a routine "decision" is called, in step 3526, to decide whether or not to issue the action. When it is decided to issue the action, as determined in step 3522, control flows to steps 2524, 2526, and 3508, discussed above. Otherwise, either when the human administrator rejected the action or when it was decided not to issue the action after the human administrator failed to respond, control flows to step 3528. When the local variable received has the value false, indicating that the human administrator failed to respond and that it was decided to not issue the action, the action a' is set to an indication of no action, in step 3529, and control flows to steps 2524, 2526, and 3508, discussed above. However, when the local variable received has the value true, as determined in step 3528, the rejected action a' is removed from the set of actions, in step 3530. When the set of actions is empty, as deter pined in step 3532, control flows to step 3529, discussed above. Otherwise, in step 3534, the local variable tries is decremented. When the local variable tries is greater than 0, control flows back to step 2522 to attempt to identify a new action for issuance. Otherwise, control flows to step 3529, discussed above, where an indication of no action to be executed is issued, which may take the form of a no-op or null action, in certain implementations. Thus, the administrator-monitored manager proposes actions to human administrators, when necessary, and does not issue proposed actions when the human administrator rejects them.

FIG. 35B provides a control-flow diagram for the routine "decision," called in step 3526 of FIG. 35A. In step 3540, the routine "decision" receives a management command. When a parameter is set to indicate that, when a human administrator fails to respond to a proposal to issue the command, the command should always be issued, as determined in step 3541, the routine "decision" returns an indication to proceed with issuance in step 3542. Otherwise, when a parameter is set to indicate that, when a human administrator fails to respond to a proposal to issue the command, the command should never be issued, as determined in step 3543, the routine "decision" returns an indication that no action should be issued in step 3544. Otherwise, in step 3545, the routine "find command" is called to find the t_entry data structures for the command. When there is relevant data in the second t_entry data structure, as determined in step 3546, the local variable total is set to the total number of acceptances and rejections of the command, in step 3547, and an acceptance ratio is computed, in step 3548. If the value stored in total is less than a first threshold value, as determined in step 3539, control flows to step 3550, since there is insufficient data from which to make a decision in the second t_entry data structure. Otherwise, when the acceptance ratio is greater than a second threshold value, as determined in step 3551, the routine "decision" returns an indication to proceed with issuance, in step 3552. Otherwise, when the ratio is not less than a third threshold, as determined in step 3553, control flows to step 3550, since the accumulated data does not point clearly to either acceptance or rejection. Otherwise, in step 3554, a filter is applied to the command to determine whether, despite no indication in the stored data that the command should be issued, the command is a type of command that should nevertheless be issued. When the command passes the filter, as determined in step 3556, an indication to proceed with issuance is returned, in step 3552. Otherwise, an indication to not issue the command is returned, in step 3557. When there is not relevant data in the second t_entry data structure, as determined in step 3546, control flows to step 3550, which determines whether or not there is relevant data in the first t_entry data structure. When there is relevant data, control flows to steps 3558-3561, which represent logic similar to steps 3547-3557, discussed above. However, since the acceptance and rejection data in the first t_entry data structure is accumulated for the entire set of commands with a common length and opcode, rather than the particular command received in step 3540, different, more stringent thresholds are used to determine whether or not to issue the command.

FIG. 35C provides a control-flow diagram for the routine "record response," called in step 3518 of FIG. 35A. In step 3570, a management command is received along with a response provided by a human administrator and the stored system time. In step 3571, the routine "find command" is used to identify the two t_entry data structures for the command. In step 3572, the local variable eTime is set to indicate the elapsed time for the response. Then, steps 3574-3576 are executed to update the acceptance and rejection information stored in the two t_entry data structures in the case that the command was accepted, as determined in step 3573, and, otherwise, steps 3577-3579 are executed to update the acceptance and rejection information stored in the two t_entry data structures.

Figure 36A:
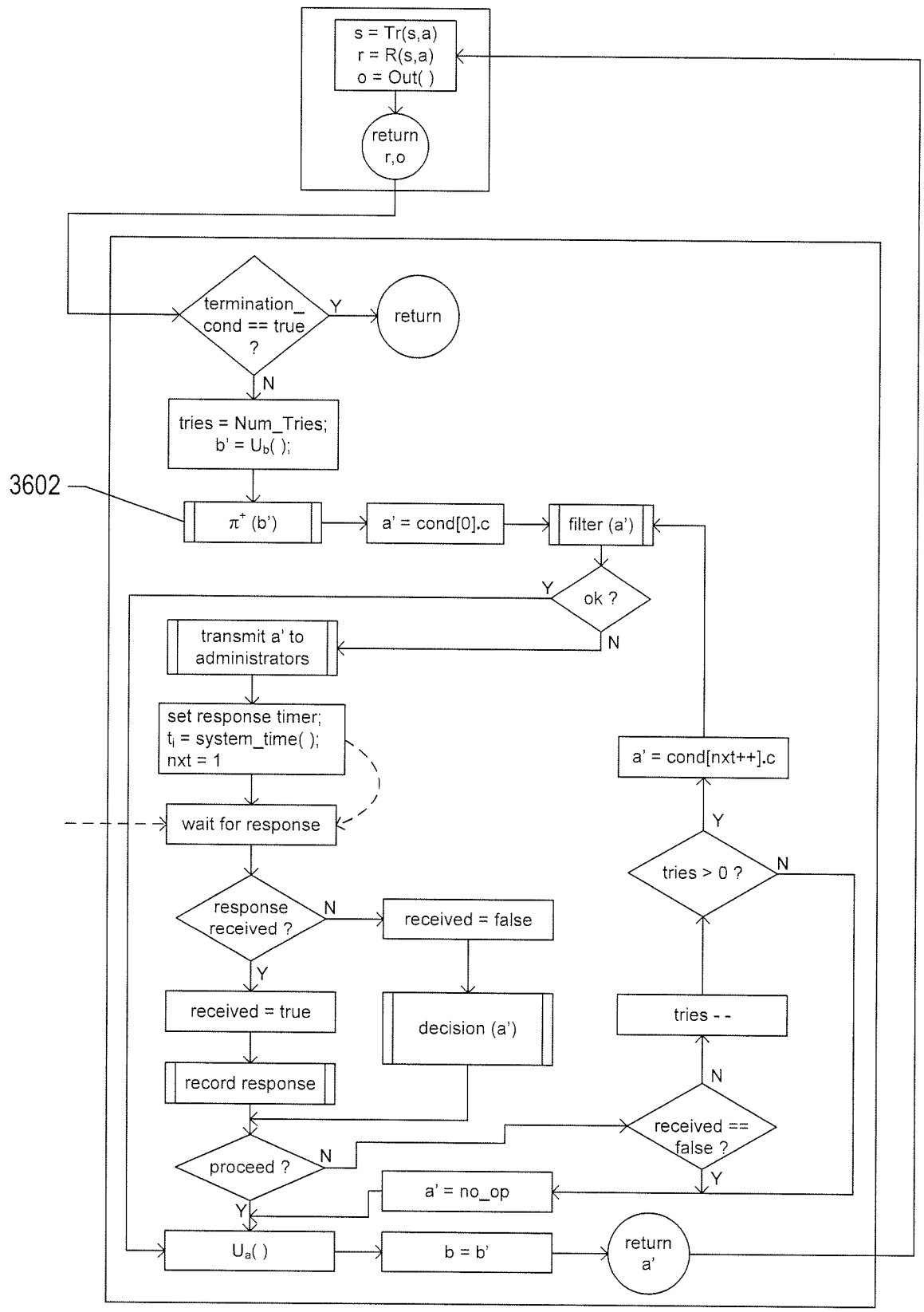
FIGS. 36A-C illustrate a second implementation of the administrator-monitored reinforcement-learning-based application.
Figure 36B:
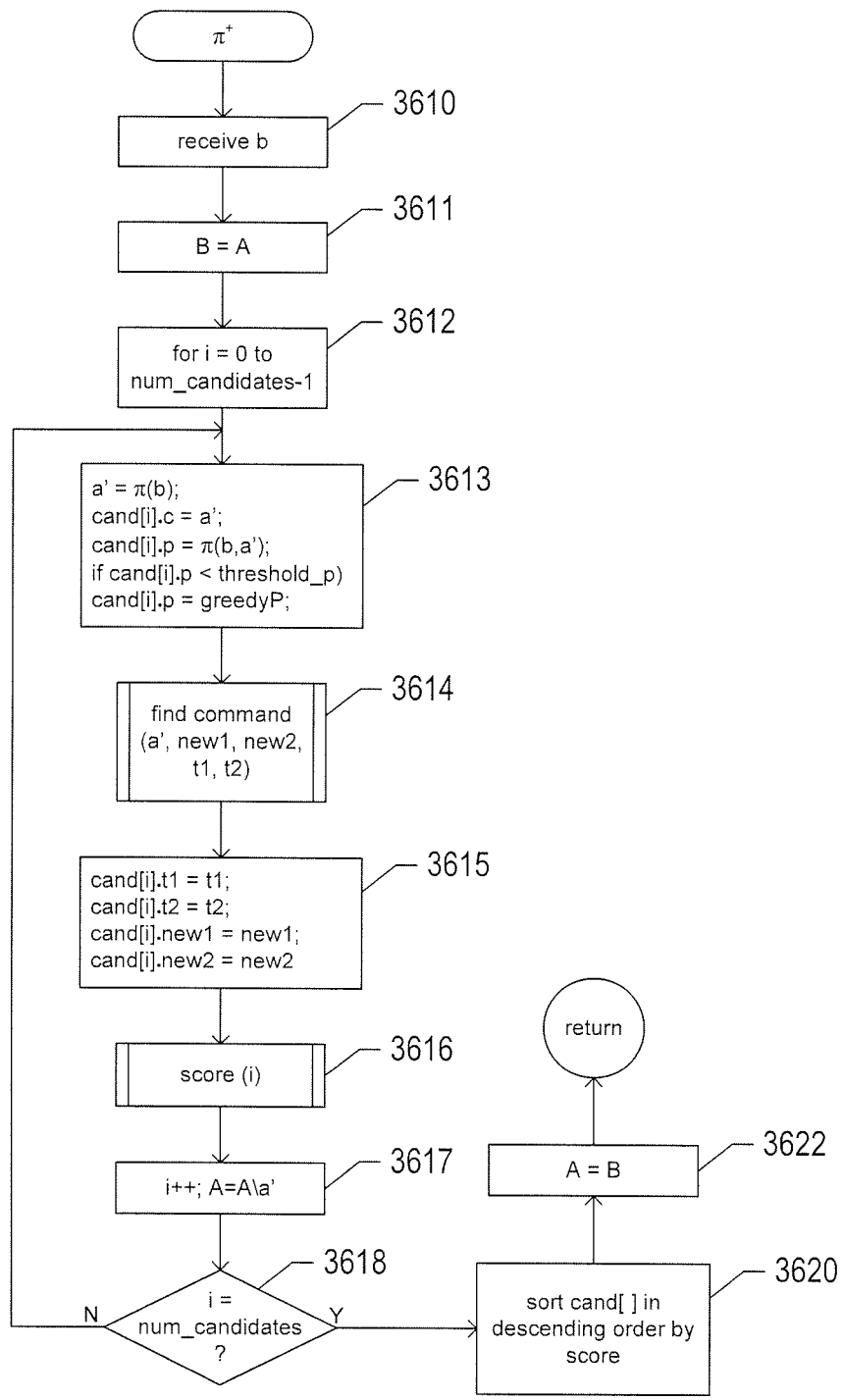
Figure 36C:
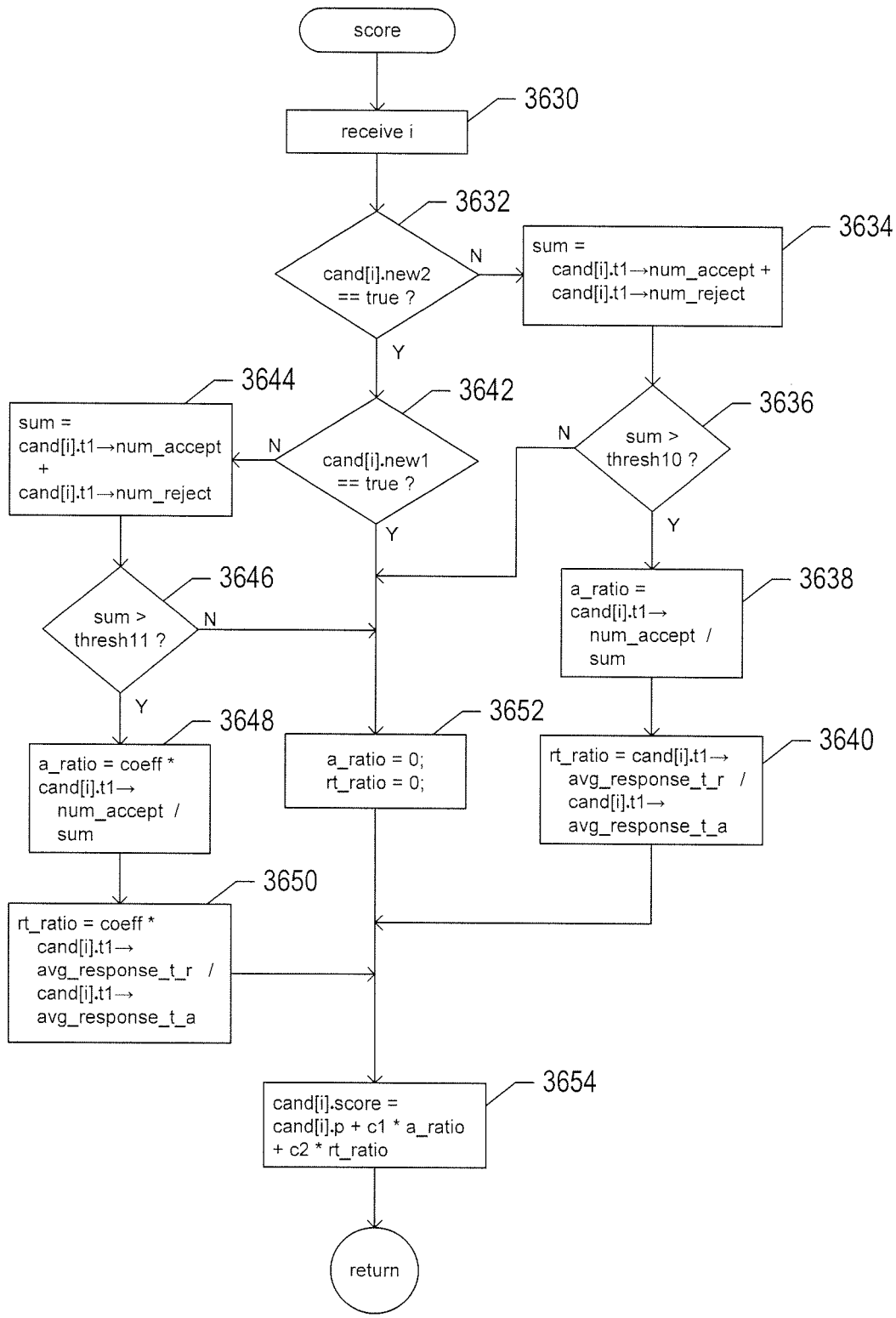

FIGS. 36A-C illustrate a second implementation of the administrator-monitored reinforcement-learning-based application. FIG. 36A uses illustration conventions similar to those used in FIGS. 25 and 35A, discussed above. The main difference in the second implementation with respect to the first implementation is that a new policy function is employed in step 3602. This policy function returns a set of possible actions for issuance in an array of candidate actions cand[ ]. When multiple attempts to issue a command are carried out, following human-administrator rejections, additional candidate actions are retrieved from the array of candidate actions rather than by repeatedly calling the previous policy function in step 2522 of FIGS. 25 and 35A.

FIG. 36B provides a flow diagram for the new policy function. In step 3610, the new policy function receives the current belief distribution b. In step 3611, the local set variable B is set to the value of the set of actions A. In the for-loop of steps 3612-3618, a set of candidate actions is determined and stored in the array of candidate actions cand[ ]. During each iteration of the for-loop of steps 3612-3618, a new candidate action is selected, in step 3613, and stored along with the probability associated with the action in the array of candidate actions cand[ ]. When the probability of selection is less than a threshold value, the probability of selection is set to the value greedyP, so that the state/action space exploration continues to be possible. In step 3614, the routine "find command" is called to identify the t_entry data structures for the new command. The information returned by the routine "find command" is stored in the array of candidate actions cand[ ] in step 3615. In step 3616, the routine "score" is called to generate and store a score for the new command. Following completion of the for-loop of steps 3612-3618, the candidate actions stored in the array of candidate actions cand[ ] are sorted in descending order by the score associated with each candidate action, computed in step 3616, in step 3620. Finally, in step 3622, the set of actions A is restored.

FIG. 36C provides a control-flow diagram for the routine "score," called in step 3616 of FIG. 36B. In step 3630, the routine "score" receives an index i of the candidate action in the candidate actions array cand[ ]. When the second t_entry data structure for the candidate action contains relevant information, as determined in step 3632, the number of acceptances and rejections is computed and stored in the local variable sum, in step 3634. When the value stored in the local variable sum is greater than a threshold value, as determined in step 3636, an acceptance ratio is computed for the candidate action in step 3638 and a response-time ratio is computed for the candidate in step 3640. Otherwise, when the first t_entry data structure for the candidate action contains relevant information, as determined in step 3642, and when the total number of acceptances and rejections in the first t_entry data structure, computed in step 3644, is greater than a threshold value, as determined in step 3646, an acceptance ratio and a response-time ratio are computed in steps 3648 and 3650. Otherwise, when there is no relevant stored information for the candidate action, both the acceptance ratio and the response-time ratio are set to 0 in step 3652. Finally, in step 3654, a candidate score is computed for the candidate action and stored in the candidate actions array cand[ ]. In this implementation, the score is the sum of the probability for selecting the action, determined in step 3613 of FIG. 36B, and the weighted sum of the acceptance ratio and response-time ratio. Many other types of score calculations, including nonlinear score calculations, can be carried out. The considerations made by computing the score function in step 3654 are that the candidate actions should, in general, be ranked according to the probability for selecting those actions, as was the case with the original policy function, but that when the stored data indicates that a candidate action is generally acceptable to human administrators, the score associated with that candidate action should be increased to favor that candidate action over candidate actions that may have been selected with a greater probability, but that are not generally acceptable to human administrators. The acceptability to human administrators is proportional to the acceptance ratio and inversely proportional to the ratio of the average response time for acceptances to the average response time for rejections. Again, however, many additional types of scores may be computed.

Although the present invention has been described in terms of particular embodiments, it is not intended that the invention be limited to these embodiments. Modification within the spirit of the invention will be apparent to those skilled in the art. For example, any of a variety of different implementations of the currently disclosed administrator-monitored reinforcement-learning application manager can be obtained by varying any of many different design and implementation parameters, including modular organization, programming language, underlying operating system, control structures, data structures, and other such design and implementation parameters. As discussed above, a variety of different approaches may be taken to proposing candidate actions and deciding whether or not to issue candidate actions for which responses to the proposals are not received. In addition, in the second implementation discussed above, many different types of scoring functions can be used to order candidate actions for proposing to human administrators. For It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated administrator-monitored reinforcement-learning-based application manager that manages one or more applications and a computing environment within which the one or more applications run, the computing environment comprising one or more of a distributed computing system having multiple computer systems interconnected by one or more networks, a standalone computer system, and a processor-controlled user device, the administrator-monitored reinforcement-learning based application manager comprising:
   one or more processors, one or more memories, and one or more communications subsystems;
   a control loop that iteratively receives a reward and an observation from the computing environment and, in response to the received reward and observation, consults an internally maintained policy $\pi$ to determine a next action to issue to the computing environment;
   an action-proposal subsystem through which the reinforcement-learning-based application manager, prior to issuing a next action to the computing environment, proposes the next action to a human administrator and through which the reinforcement-learning-based application manager receives a proposed-action result; and
   decision logic that uses the proposed-action result to determine to either issue the next action, determine an alternative action for issuance, or issue no action.

2. The automated administrator-monitored reinforcement-learning-based application manager of claim 1
   wherein each action is represented as a vector of values and specifies one or more actions to be carried out by the computing environment; and
   wherein the observations are represented as a vector of values that include metric values, configurations parameters, operational parameters, operation characteristics, and other values indicative of the current application and computing-environment state.

3. The automated administrator-monitored reinforcement-learning-based application manager of claim 2 wherein the administrator-monitored reinforcement-learning-based application manager maintains:
   the policy $\pi$;
   an action-value-update function; and
   termination conditions.

4. The automated administrator-monitored reinforcement-learning-based application manager of claim 2 wherein the control loop:
   continuously receives a reward and an observation vector from the computing environment;
generates a next action a' using the policy π;
determines whether the next action a' needs to be proposed;
when the next action a' needs to be proposed,
proposes the next action a' to a human administrator through the action-proposal subsystem,
receives, through the action-proposal subsystem, a proposed-action result, and
determines, from the proposed-action result, whether the next action a' needs to be modified, and
when the next action a' needs to be modified, as determined from the proposed-action result, modifies the next action a'; and
issues the next action a' to the computing environment.

5. The automated administrator-monitored reinforcement-learning-based application manager of claim 4 wherein the control loop determines whether the next action a' needs to be proposed by applying one or more filters to the next action a'.

6. The automated administrator-monitored reinforcement-learning-based application manager of claim 4 wherein, when the control loop proposes the next action a' to a human administrator through the action-proposal subsystem, the action-proposal subsystem solicits an acceptance or rejection from one or more human users through a solicitation transmitted to one or more processor-controlled devices.

7. The automated administrator-monitored reinforcement-learning-based application manager of claim 4 wherein the action-proposal subsystem, after soliciting an acceptance or rejection for the next action a', returns, to the control loop, one of:
an acceptance;
a rejection; and
an indication that the human administrator failed to respond to the solicitation.

8. The automated administrator-monitored reinforcement-learning-based application manager of claim 7 wherein the control loop determines whether the next action a' needs to be modified and modifies the next action a' by
when the action-proposal subsystem returns an acceptance, leaving the next action a' unmodified;
when the action-proposal subsystem returns a rejection,
when a different next action a" is available from the policy π, reexecuting the current iteration of the control loop beginning with determining whether the different next action a" needs to be proposed, and
when a different next action a" is unavailable from the policy π, modifying the next action a' to indicate that no action is to be performed; and
when the action-proposal subsystem returns an indication that the human administrator failed to respond,
using one or more parameter values and stored information with respect to previous acceptances and rejections received for action a' to determining whether to leave the next action a' unmodified or to modify the next action a' to indicate that no action is to be performed.

9. The automated administrator-monitored reinforcement-learning-based application manager of claim 1 wherein the action-proposal subsystem further comprises:
a communications subsystem through which the action-proposal subsystem transmits solicitations for acceptance or rejection of proposed actions and through which the action-proposal subsystem receives responses to the solicitations; and
a timer that the action-proposal subsystem set when transmitting a solicitation.

10. The automated administrator-monitored reinforcement-learning-based application manager of claim 9 wherein, when the action-proposal subsystem receives a response to a solicitation before the timer expires, the action-proposal subsystem returns the acceptance or rejection contained in the response, and
wherein, when the timer expires before the action-proposal subsystem receives a response to a solicitation, the action-proposal subsystem returns an indication that no response was received.

11. The automated administrator-monitored reinforcement-learning-based application manager of claim 9 wherein the action-proposal subsystem solicits acceptances or rejections of a proposed action from multiple administrators and returns one of:
an acceptance proposed-action result, computed from received acceptances and/or rejections;
a rejection proposed-action result, computed from received acceptances and/or rejections;
a tie proposed-action result; or
a no-response proposed-action result that indicates that no acceptances or rejections were received.

12. The automated administrator-monitored reinforcement-learning-based application manager of claim 4 wherein the decision logic that uses the proposed-action result to determine to either issue the next action, determine an alternative action for issuance, or issue no action further comprises:
for each action for which a proposed-action result has been previously received,
stored indications of the number of acceptance proposed-action results, the number of rejection proposed-action results, the average response time for acceptance proposed-action results, and the average response time for rejection proposed-action results; and
stored parameters that control the decision logic.

13. The automated administrator-monitored reinforcement-learning-based application manager of claim 12
wherein the decision logic determines that a proposed action should be issued when the proposed-action result is an acceptance;
wherein the decision logic determines that a proposed action should not be issued when the proposed-action result is a rejection;
wherein the decision logic determines that a proposed action should be issued when the proposed-action result is an indication of no response and when a stored parameter indicates that when no response is received, a proposed action should be issued,
wherein the decision logic determines that a proposed action should not be issued when the proposed-action result is an indication of no response and when a stored parameter indicates that when no response is received, a proposed action should not be issued.

14. The automated administrator-monitored reinforcement-learning-based application manager of claim 12 wherein, when the proposed-action result is an indication of no response and no stored parameter indicates a decision, the decision logic uses stored information with regard to past acceptances and rejections to determine whether or not to issue the proposed action.

15. The automated administrator-monitored reinforcement-learning-based application manager of claim 14 wherein the stored information with regard to past acceptances and rejections includes information with regard to past acceptances and rejections of various subsets of actions, including information with regard to past acceptances and rejections of specific individual commands, and wherein the decision logic uses the information with regard to past acceptances and rejections most specific to the proposed action.

16. The automated administrator-monitored reinforcement-learning-based application manager of claim 15 wherein the information with regard to past acceptances and rejections includes
an indication of the number of acceptances,
an indication of the number of rejections,
an indication of the average response time for acceptances, and
an indication of the average response times for rejections;

wherein the decision logic computes an acceptance ratio and a response time ratio from the information with regard to past acceptances and rejections;

wherein the decision logic computes an acceptance ratio and a response time ratio from the information with regard to past acceptances and rejections;

wherein the decision logic computes a score, for a given proposed action, from a probability associated with the action by the policy $\pi$, the acceptance ratio, and the response time ratio; and wherein the decision logic determines whether not to issue the proposed action based on the computed score.

17. The automated administrator-monitored reinforcement-learning-based application manager of claim 16 wherein the computed scores assigned to a set of candidate actions is additionally used to select a next action from among multiple candidate actions.

18. A method for constraining an automated reinforcement-learning-based application manager, which manages an environment that includes one or more applications and a computing system within which the one or more applications run, to issue safe actions, the method comprising:
including, in the automated reinforcement-learning-based application manager
an action-proposal subsystem through which the reinforcement-learning-based application manager, prior to issuing a next action to the computing environment, proposes the next action to a human administrator and through which the reinforcement-learning-based application manager receives a proposed-action result; and
decision logic that uses the proposed-action result to determine to either issue the next action, determine an alternative action for issuance, or issue no action; and
when the reinforcement-learning-based application manager receives a reward and an observation from the managed environment,
proposing a next action, specified by an internally maintained policy $\pi$, to a human administrator through the action-proposal subsystem,
receiving a response to the proposal from the action-proposal subsystem, and
based on the response, determining to
issue the proposed action to the managed environment,
issue an indication of no action to the managed environment, or
attempt to determine a different next action.

19. The method of claim 18
wherein the action-proposal subsystem returns an indication of acceptance, an indication or rejection, and an indication of no response; and
wherein the reinforcement-learning-based application manager uses stored acceptance and rejection information for previously proposed actions and uses the stored acceptance and rejection information to determine whether to issue a proposed action to the managed environment, issue an indication of no action to the managed environment, or attempt to determine a different next action when the action-proposal subsystem returns an indication of no response.

20. A physical data-storage device encoded with computer instructions that, when executed by one or more processors of a computer system that implements an automated reinforcement-learning-based application manager, controls the automated reinforcement-learning-based application manager to
include
an action-proposal subsystem through which the reinforcement-learning-based application manager, prior to issuing a next action to the computing environment, proposes the next action to a human administrator and through which the reinforcement-learning-based application manager receives a proposed-action result, and
decision logic that uses the proposed-action result to determine to either issue the next action, determine an alternative action for issuance, or issue no action; and
when the reinforcement-learning-based application manager receives a reward and an observation from the managed environment,
to propose a next action, specified by an internally maintained policy $\pi$, to a human administrator through the action-proposal subsystem,
receive a response to the proposal from the action-proposal subsystem, and
based on the response, to determine to
issue the proposed action to the managed environment,
issue an indication of no action to the managed environment, or
attempt to determine a different next action.

* * * * *